(12) United States Patent
Burnett et al.

(10) Patent No.: US 9,079,222 B2
(45) Date of Patent: Jul. 14, 2015

(54) SHALE SHAKER

(75) Inventors: George Alexander Burnett, Aberdeen (GB); Thomas Robert Larson, Montgomery, TX (US)

(73) Assignee: National Oilwell Varco, L.P., Houston, TX (US)

(\*) Notice: Subject to any disclaimer, the term of this patent is extended or adjusted under 35 U.S.C. 154(b) by 1211 days.

(21) Appl. No.: 12/771,201

(22) Filed: Apr. 30, 2010

(65) Prior Publication Data

US 2010/0270216 A1    Oct. 28, 2010

Related U.S. Application Data

(63) Continuation-in-part of application No. 12/490,492, filed on Jun. 24, 2009, now Pat. No. 8,556,083, which is a continuation-in-part of application No. 12/287,709, filed on Oct. 10, 2008, now Pat. No. 8,113,356.

(51) Int. Cl.
*B07B 1/28* (2006.01)
*B07B 1/46* (2006.01)
*B01D 33/03* (2006.01)
*B07B 13/16* (2006.01)

(52) U.S. Cl.
CPC .............. *B07B 1/46* (2013.01); *B01D 33/0376* (2013.01); *B07B 13/16* (2013.01); *B07B 2201/04* (2013.01); *B07B 2230/01* (2013.01)

(58) Field of Classification Search
CPC ............ B07B 1/46; B07B 1/00; B07B 13/16; B07B 2201/04; B07B 2230/01; B01D 33/41
USPC .......................... 209/258, 311, 314, 315, 360
See application file for complete search history.

(56) References Cited

U.S. PATENT DOCUMENTS

| 599,468 | A | 2/1898 | Cross |
| 865,185 | A | 9/1907 | Kerrigan |
| 1,344,747 | A | 1/1920 | Wright |
| 1,462,804 | A | 7/1923 | Evans |
| 1,822,298 | A | 9/1931 | Kerrigan |
| 1,830,792 | A | 11/1931 | Herrmann ..................... 209/401 |

(Continued)

FOREIGN PATENT DOCUMENTS

| DE | 4127929 A1 | 2/1993 |
| FR | 2 611 559 | 9/1988 |

(Continued)

OTHER PUBLICATIONS

U.S. Appl. No. 12/785,735 Office Action dated Dec. 9, 2011.

(Continued)

*Primary Examiner* — Joseph C Rodriguez
*Assistant Examiner* — Kalyanavenkateshware Kumar
(74) *Attorney, Agent, or Firm* — Amerson Law Firm, PLLC

(57) ABSTRACT

A shale shaker for separating solids from solids laden drilling fluid is disclosed as having a basket with a scalping screen deck, at least one first screen deck and at least one second screen deck. The basket further may have a flow tray arranged between said scalping screen deck and at least one first screen deck, and a plurality of first ducts and a plurality of second ducts, the plurality of first ducts for directing solids laden drilling fluid to the at least one first screen deck. The second plurality of second ducts are for directing solids laden drilling fluid to said second screen deck.

43 Claims, 37 Drawing Sheets

(56) References Cited

U.S. PATENT DOCUMENTS

| | | | |
|---|---|---|---|
| 1,885,154 A | 11/1932 | Strezynski et al. | |
| 1,886,174 A | 11/1932 | Hazeltine | 209/269 |
| 1,950,861 A | 3/1934 | O'Toole, Sr. | |
| 2,082,513 A | 6/1937 | Roberts | 210/76 |
| 2,089,548 A | 8/1937 | Frantz et al. | 210/389 |
| 2,112,784 A | 3/1938 | McNiff | 99/105 |
| 2,341,169 A | 2/1944 | Wilson et al. | 73/51 |
| 2,418,529 A | 4/1947 | Stern | 51/309 |
| 2,578,456 A | 12/1951 | Smith | 233/7 |
| 2,653,521 A | 9/1953 | Einarsson | 209/70 |
| 2,711,854 A | 6/1955 | Kjellgren | 494/53 |
| 2,716,493 A | 8/1955 | Hutchison | 209/269 X |
| 2,750,043 A | 6/1956 | Thompson | 210/149 |
| 2,895,669 A | 7/1959 | Bobo | 494/10 |
| 2,919,898 A | 1/1960 | Marwil et al. | 255/1.8 |
| 2,928,546 A | 3/1960 | Church | 210/319 |
| 2,938,393 A | 5/1960 | Dunn et al. | 74/61 |
| 2,942,731 A | 6/1960 | Soldini | 209/293 |
| 2,955,753 A | 10/1960 | O'Conor et al. | 494/5 |
| 2,961,154 A | 11/1960 | Bergey | 494/1 |
| 3,012,674 A | 12/1961 | Hoppe | 209/401 |
| 3,053,379 A | 9/1962 | Roder et al. | 198/220 |
| 3,064,806 A | 11/1962 | Tapani | 209/17 |
| 3,070,291 A | 12/1962 | Bergey | 494/1 |
| 3,219,107 A | 11/1965 | Brown et al. | 166/8 |
| 3,226,989 A | 1/1966 | Robins | 74/87 |
| 3,268,159 A | 8/1966 | Kern | 233/7 |
| 3,302,720 A | 2/1967 | Brandon | 166/42 |
| 3,498,393 A | 3/1970 | West et al. | 175/48 |
| 3,605,919 A | 9/1971 | Bromell et al. | 175/27 |
| 3,629,859 A | 12/1971 | Copland et al. | 340/172.5 |
| 3,640,344 A | 2/1972 | Brandon | 166/307 |
| 3,659,465 A | 5/1972 | Oshima et al. | 74/61 |
| 3,726,136 A | 4/1973 | McKean et al. | 73/155 |
| 3,795,361 A | 3/1974 | Lee | 233/7 |
| 3,796,299 A | 3/1974 | Musschoot | 198/220 |
| 3,855,380 A | 12/1974 | Gordon et al. | 264/97 |
| 3,874,733 A | 4/1975 | Poundstone et al. | 299/17 |
| 3,885,734 A | 5/1975 | Lee | 233/3 |
| 3,900,393 A | 8/1975 | Wilson | 209/399 |
| 3,934,792 A | 1/1976 | High et al. | 233/7 |
| 3,955,411 A | 5/1976 | Lawson, Jr. | 73/155 |
| 3,968,033 A | 7/1976 | Illemann et al. | 209/403 |
| 3,993,146 A | 11/1976 | Poundstone et al. | 175/206 |
| 4,000,074 A | 12/1976 | Evans | 210/369 |
| 4,019,987 A | 4/1977 | Krasnow | |
| 4,022,596 A | 5/1977 | Pedersen | |
| 4,033,865 A | 7/1977 | Derrick, Jr. | 209/275 |
| 4,038,152 A | 7/1977 | Atkins | 201/2.5 |
| 4,082,657 A | 4/1978 | Gage | 209/311 |
| 4,085,888 A | 4/1978 | Jager | 233/7 |
| 4,115,507 A | 9/1978 | Pico et al. | 264/267 |
| 4,116,288 A | 9/1978 | Love | 175/66 |
| 4,192,743 A | 3/1980 | Bastgen et al. | 210/712 |
| 4,208,906 A | 6/1980 | Roberts, Jr. | 73/155 |
| 4,212,731 A | 7/1980 | Wallin et al. | 209/366.5 |
| 4,222,988 A | 9/1980 | Barthel | 422/309 |
| 4,224,821 A | 9/1980 | Taylor et al. | 73/32 R |
| 4,228,949 A | 10/1980 | Jackson | 233/7 |
| 4,233,181 A | 11/1980 | Goller et al. | 252/425.3 |
| 4,240,578 A | 12/1980 | Jackson | 233/7 |
| 4,297,225 A | 10/1981 | Hartley | 210/779 |
| 4,298,160 A | 11/1981 | Jackson | 233/7 |
| 4,298,162 A | 11/1981 | Hohne | 233/7 |
| 4,298,572 A | 11/1981 | Moffet et al. | 422/68 |
| 4,306,974 A | 12/1981 | Harry | 210/388 |
| 4,319,482 A | 3/1982 | Bunner | 73/153 |
| 4,319,991 A | 3/1982 | Crone, Jr. et al. | 209/255 |
| 4,322,288 A * | 3/1982 | Schmidt | 209/356 |
| 4,339,072 A | 7/1982 | Hiller | 233/7 |
| 4,350,591 A | 9/1982 | Lee | 210/384 |
| 4,369,915 A | 1/1983 | Oberg et al. | 494/8 |
| 4,378,906 A | 4/1983 | Epper et al. | 494/54 |
| 4,411,074 A | 10/1983 | Daly | 34/32 |
| 4,432,064 A | 2/1984 | Barker et al. | 364/550 |
| 4,446,022 A | 5/1984 | Harry | 210/388 |
| 4,459,207 A | 7/1984 | Young | 209/269 |
| 4,482,459 A | 11/1984 | Shiver | 210/639 |
| 4,495,065 A | 1/1985 | DeReamer et al. | 209/243 |
| 4,526,687 A | 7/1985 | Nugent | 210/202 |
| 4,536,286 A | 8/1985 | Nugent | 210/202 |
| 4,546,783 A | 10/1985 | Lott | 134/109 |
| 4,549,431 A | 10/1985 | Soeiinah | 73/152.49 |
| 4,553,429 A | 11/1985 | Evans et al. | 73/152.21 |
| 4,573,115 A | 2/1986 | Halgrimson | 364/138 |
| 4,575,336 A | 3/1986 | Mudd et al. | 432/72 |
| 4,606,415 A | 8/1986 | Gray, Jr. et al. | 175/24 |
| 4,624,417 A | 11/1986 | Gangi | 241/17 |
| 4,634,535 A | 1/1987 | Lott | 210/780 |
| 4,635,735 A | 1/1987 | Crownover | 175/48 |
| 4,639,258 A | 1/1987 | Schellstede et al. | 95/260 |
| 4,650,687 A | 3/1987 | Willard et al. | 426/438 |
| 4,668,213 A | 5/1987 | Kramer | 494/8 |
| 4,685,329 A | 8/1987 | Burgess | 73/151 |
| 4,696,353 A | 9/1987 | Elmquist et al. | 175/206 |
| 4,696,751 A | 9/1987 | Eifling | 210/780 |
| 4,729,548 A | 3/1988 | Sullins | 266/44 |
| 4,743,226 A | 5/1988 | Day et al. | 494/53 |
| 4,751,887 A | 6/1988 | Terry et al. | 110/246 |
| 4,770,711 A | 9/1988 | Deal, III et al. | 134/18 |
| 4,783,057 A | 11/1988 | Sullins | 266/44 |
| 4,791,002 A | 12/1988 | Baker et al. | 426/641 |
| 4,793,421 A | 12/1988 | Jasinski | 175/27 |
| 4,795,552 A | 1/1989 | Yun et al. | 209/319 |
| 4,799,987 A | 1/1989 | Sullins | 156/425 |
| 4,805,659 A | 2/1989 | Gunnewig et al. | 137/118 |
| 4,807,469 A | 2/1989 | Hall | 73/155 |
| 4,809,791 A | 3/1989 | Hayatdavoudi | 175/40 |
| 4,832,853 A | 5/1989 | Shiraki et al. | 210/781 |
| 4,844,106 A | 7/1989 | Hunter et al. | 134/73 |
| 4,846,352 A | 7/1989 | Bailey | 209/399 |
| 4,857,176 A | 8/1989 | Derrick et al. | 209/392 |
| 4,882,054 A | 11/1989 | Derrick et al. | 210/389 |
| 4,889,733 A | 12/1989 | Willard et al. | 426/438 |
| 4,889,737 A | 12/1989 | Willard et al. | 426/550 |
| 4,892,767 A | 1/1990 | Freissle | |
| 4,895,665 A | 1/1990 | Colelli et al. | 210/710 |
| 4,895,731 A | 1/1990 | Baker et al. | 426/641 |
| 4,896,835 A | 1/1990 | Fahrenholz | 241/74 |
| 4,911,834 A | 3/1990 | Murphy | 210/167 |
| 4,915,452 A | 4/1990 | Dibble | 299/17 |
| 4,940,535 A | 7/1990 | Fisher et al. | 209/250 |
| 4,942,929 A | 7/1990 | Malachosky et al. | 175/66 |
| 4,961,722 A | 10/1990 | Taylor et al. | 494/36 |
| 5,010,966 A | 4/1991 | Stokley et al. | 175/66 |
| 5,053,082 A | 10/1991 | Flanigan et al. | 134/25.1 |
| 5,066,350 A | 11/1991 | Sullins | 156/187 |
| 5,080,721 A | 1/1992 | Flanigan et al. | 134/26 |
| 5,107,874 A | 4/1992 | Flanigan et al. | 134/60 |
| 5,109,933 A | 5/1992 | Jackson | 175/66 |
| 5,129,469 A | 7/1992 | Jackson | 175/66 |
| 5,131,271 A | 7/1992 | Haynes et al. | 73/290 |
| 5,145,256 A | 9/1992 | Wiemers et al. | 366/336 |
| 5,147,277 A | 9/1992 | Shapiro | 494/53 |
| 5,156,749 A | 10/1992 | Williams | 210/770 |
| 5,156,751 A | 10/1992 | Miller | 210/787 |
| 5,181,578 A | 1/1993 | Lawler | 175/424 |
| 5,190,645 A | 3/1993 | Burgess | 210/144 |
| 5,200,372 A | 4/1993 | Kuroyama et al. | 501/96 |
| 5,203,762 A | 4/1993 | Cooperstein | 494/7 |
| 5,211,291 A | 5/1993 | Kelley et al. | |
| 5,221,008 A | 6/1993 | Derrick, Jr. et al. | 209/269 |
| 5,226,546 A | 7/1993 | Janssens et al. | 209/319 |
| 5,227,057 A | 7/1993 | Lundquist | 210/174 |
| 5,229,018 A | 7/1993 | Forrest | 252/8.551 |
| 5,232,099 A | 8/1993 | Maynard | 209/311 |
| 5,253,718 A | 10/1993 | Lawler | 175/20 |
| 5,265,730 A | 11/1993 | Norris et al. | 209/326 |
| 5,273,112 A | 12/1993 | Schultz | 166/374 |
| 5,278,549 A | 1/1994 | Crawford | 340/853.2 |
| 5,314,058 A | 5/1994 | Graham | 198/753 |
| 5,319,972 A | 6/1994 | Oblak et al. | 73/290 |
| 5,329,465 A | 7/1994 | Arcella et al. | 364/551.01 |
| 5,332,101 A | 7/1994 | Bakula | 209/403 |

(56) References Cited

U.S. PATENT DOCUMENTS

| | | | |
|---|---|---|---|
| 5,337,966 A | 8/1994 | Francis et al. | 241/46.06 |
| 5,378,364 A | 1/1995 | Welling | 210/512.1 |
| 5,385,669 A | 1/1995 | Leone, Sr. | 210/488 |
| 5,392,925 A | 2/1995 | Seyffert | 209/405 |
| 5,400,376 A | 3/1995 | Trudeau | 377/21 |
| 5,403,260 A | 4/1995 | Hensley | 494/53 |
| 5,454,957 A | 10/1995 | Roff | 210/768 |
| 5,465,798 A | 11/1995 | Edlund et al. | 175/24 |
| 5,474,142 A | 12/1995 | Bowden | 175/27 |
| 5,488,104 A | 1/1996 | Schulz | 536/86 |
| 5,489,204 A | 2/1996 | Conwell et al. | 432/153 |
| 5,494,584 A | 2/1996 | McLachlan et al. | 210/739 |
| 5,516,348 A | 5/1996 | Conwell et al. | 51/309 |
| 5,534,207 A | 7/1996 | Burrus | 264/150 |
| 5,547,479 A | 8/1996 | Conwell et al. | 51/309 |
| 5,566,889 A | 10/1996 | Preiss | 241/19 |
| 5,567,150 A | 10/1996 | Conwell et al. | 432/14 |
| 5,570,749 A | 11/1996 | Reed | 175/66 |
| 5,597,042 A | 1/1997 | Tubel et al. | 166/250.01 |
| 5,632,714 A | 5/1997 | Leung et al. | 494/53 |
| 5,638,960 A | 6/1997 | Beuermann et al. | 209/397 |
| 5,641,070 A | 6/1997 | Seyffert | 209/314 |
| 5,643,169 A | 7/1997 | Leung et al. | 494/53 |
| 5,653,674 A | 8/1997 | Leung | 494/53 |
| 5,662,165 A | 9/1997 | Tubel et al. | 166/250.01 |
| 5,669,941 A | 9/1997 | Peterson | 51/295 |
| 5,681,256 A | 10/1997 | Nagafuji | 494/9 |
| D386,874 S | 11/1997 | Glaun | D34/29 |
| D387,534 S | 12/1997 | Glaun | D34/29 |
| D388,583 S | 12/1997 | Glaun | D34/29 |
| 5,695,442 A | 12/1997 | Leung et al. | 494/37 |
| 5,699,918 A | 12/1997 | Dunn | 209/397 |
| D388,924 S | 1/1998 | Glaun | D34/29 |
| 5,706,896 A | 1/1998 | Tubel et al. | 166/313 |
| 5,730,219 A | 3/1998 | Tubel et al. | 166/250.01 |
| 5,732,776 A | 3/1998 | Tubel et al. | 166/250.01 |
| 5,732,828 A | 3/1998 | Littlefield, Jr. | 209/365.1 |
| 5,771,601 A | 6/1998 | Veal et al. | 34/314 |
| 5,772,573 A | 6/1998 | Hao | 494/15 |
| 5,791,494 A | 8/1998 | Meyer | 209/368 |
| 5,793,705 A | 8/1998 | Gazis et al. | 367/98 |
| 5,811,003 A | 9/1998 | Young et al. | 210/388 |
| 5,814,230 A | 9/1998 | Willis et al. | 210/710 |
| 5,816,413 A | 10/1998 | Boccabella et al. | 209/399 |
| 5,819,952 A | 10/1998 | Cook et al. | 209/400 |
| 5,839,521 A | 11/1998 | Dietzen | 100/37 |
| 5,857,955 A | 1/1999 | Phillips et al. | 494/7 |
| 5,861,362 A | 1/1999 | Mayeux et al. | 507/104 |
| 5,868,125 A | 2/1999 | Maoujoud | 125/15 |
| 5,896,998 A | 4/1999 | Bjorklund et al. | 209/326 |
| 5,899,844 A | 5/1999 | Eberle, Sr. | 494/37 |
| 5,913,767 A | 6/1999 | Feldkamp et al. | 494/4 |
| 5,919,123 A | 7/1999 | Phillips | 494/7 |
| 5,942,130 A | 8/1999 | Leung | 210/784 |
| 5,944,197 A | 8/1999 | Baltzer et al. | 209/400 |
| 5,948,256 A | 9/1999 | Leung | 210/374 |
| 5,948,271 A | 9/1999 | Wardwell et al. | 210/739 |
| 5,952,569 A | 9/1999 | Jervis et al. | 73/152.01 |
| 5,955,666 A | 9/1999 | Mullins | 73/152.18 |
| 5,958,235 A | 9/1999 | Leung | 210/374 |
| 5,971,159 A | 10/1999 | Leone et al. | 209/399 |
| 5,971,307 A | 10/1999 | Davenport | 241/259.1 |
| 5,975,204 A | 11/1999 | Tubel et al. | 166/250.15 |
| 5,992,519 A | 11/1999 | Ramakrishnan et al. | 166/250.15 |
| 6,012,016 A | 1/2000 | Bilden et al. | 702/12 |
| 6,013,158 A | 1/2000 | Wootten | 202/99 |
| 6,021,377 A | 2/2000 | Dubinsky et al. | 702/9 |
| 6,024,228 A | 2/2000 | Williams | 209/272 |
| 6,045,070 A | 4/2000 | Davenport | 241/60 |
| 6,062,070 A | 5/2000 | Maltby et al. | 73/61.49 |
| 6,063,292 A | 5/2000 | Leung | 210/739 |
| 6,089,380 A | 7/2000 | Hazrati et al. | 210/411 |
| 6,102,310 A | 8/2000 | Davenport | 241/21 |
| 6,105,689 A | 8/2000 | McGuire et al. | 175/48 |
| 6,109,452 A | 8/2000 | Leung et al. | 210/369 |
| 6,110,096 A | 8/2000 | Leung et al. | 494/53 |
| 6,123,656 A | 9/2000 | Michelsen | 494/54 |
| 6,138,834 A | 10/2000 | Southall | 209/17 |
| 6,143,183 A | 11/2000 | Wardwell et al. | 210/739 |
| 6,145,669 A | 11/2000 | Leung | 210/374 |
| 6,155,428 A | 12/2000 | Bailey et al. | 209/315 |
| 6,161,700 A | 12/2000 | Bakula | 209/401 |
| 6,165,323 A | 12/2000 | Shearer | 162/251 |
| 6,170,580 B1 | 1/2001 | Reddoch | 175/66 |
| 6,173,609 B1 | 1/2001 | Modlin et al. | 73/293 |
| 6,176,323 B1 | 1/2001 | Weirich et al. | 175/40 |
| 6,179,128 B1 | 1/2001 | Seyffert | 209/405 |
| 6,192,742 B1 | 2/2001 | Miwa et al. | 73/40 |
| 6,192,980 B1 | 2/2001 | Tubel et al. | 166/65.1 |
| 6,217,830 B1 | 4/2001 | Roberts et al. | 422/140 |
| 6,223,906 B1 | 5/2001 | Williams | 210/400 |
| 6,233,524 B1 | 5/2001 | Harrell et al. | 702/9 |
| 6,234,250 B1 | 5/2001 | Green et al. | 166/250.03 |
| 6,237,404 B1 | 5/2001 | Crary et al. | 73/152.03 |
| 6,267,250 B1 | 7/2001 | Leung et al. | 210/369 |
| 6,279,471 B1 | 8/2001 | Reddoch | 100/37 |
| D448,488 S | 9/2001 | Chaffiotte et al. | D24/219 |
| 6,283,302 B1 | 9/2001 | Schulte et al. | 209/399 |
| 6,290,636 B1 | 9/2001 | Hiller, Jr. et al. | 494/53 |
| 6,308,787 B1 | 10/2001 | Alft | 175/48 |
| 6,315,894 B1 | 11/2001 | Wiemers et al. | 210/96.1 |
| 6,333,700 B1 | 12/2001 | Thomeer et al. | 340/854.8 |
| 6,346,813 B1 | 2/2002 | Kleinberg | 324/303 |
| 6,349,834 B1 | 2/2002 | Carr et al. | 209/366.5 |
| 6,352,159 B1 | 3/2002 | Loshe | 209/268 |
| 6,356,205 B1 | 3/2002 | Salvo et al. | 340/853.3 |
| 6,367,633 B1 | 4/2002 | Douglas | 209/311 |
| 6,368,264 B1 | 4/2002 | Phillips et al. | 494/5 |
| 6,371,301 B1 | 4/2002 | Schulte et al. | 209/405 |
| 6,378,628 B1 | 4/2002 | McGuire et al. | 175/48 |
| 6,393,363 B1 | 5/2002 | Wilt et al. | 702/6 |
| 6,399,851 B1 | 6/2002 | Siddle | 203/87 |
| 6,408,953 B1 | 6/2002 | Goldman et al. | 175/39 |
| 6,412,644 B1 | 7/2002 | Crabbe et al. | 209/309 |
| 6,429,653 B1 | 8/2002 | Kruspe et al. | 324/303 |
| 6,438,495 B1 | 8/2002 | Chau et al. | 702/9 |
| 6,439,391 B1 | 8/2002 | Seyffert | 209/238 |
| 6,461,286 B1 | 10/2002 | Beatley | 494/8 |
| 6,474,143 B1 | 11/2002 | Herod | 73/54.01 |
| 6,484,088 B1 | 11/2002 | Reimer | 701/123 |
| 6,484,885 B1 | 11/2002 | Lilie et al. | |
| 6,485,640 B2 | 11/2002 | Fout et al. | 210/188 |
| 6,505,682 B2 | 1/2003 | Brockman | 166/250.15 |
| 6,506,310 B2 | 1/2003 | Kulbeth | 210/780 |
| 6,510,947 B1 | 1/2003 | Schulte et al. | 210/388 |
| 6,513,664 B1 | 2/2003 | Logan et al. | 209/367 |
| 6,517,733 B1 | 2/2003 | Carlson | 210/785 |
| 6,519,568 B1 | 2/2003 | Harvey et al. | 705/1 |
| 6,530,482 B1 | 3/2003 | Wiseman | 209/253 |
| 6,536,540 B2 | 3/2003 | deBoer | 175/70 |
| 6,553,316 B2 | 4/2003 | Bary et al. | 702/16 |
| 6,553,336 B1 | 4/2003 | Johnson et al. | 702/188 |
| 6,575,304 B2 | 6/2003 | Cudahy | 209/365.3 |
| 6,581,455 B1 | 6/2003 | Berger et al. | 73/152.55 |
| 6,600,278 B1 | 7/2003 | Bretzius | 318/34 |
| 6,601,709 B2 | 8/2003 | Schulte et al. | 209/397 |
| 6,605,029 B1 | 8/2003 | Koch et al. | 494/53 |
| 6,662,952 B2 | 12/2003 | Adams et al. | 209/319 |
| 6,669,027 B1 | 12/2003 | Mooney et al. | 209/405 |
| 6,679,385 B2 | 1/2004 | Suter et al. | 209/367 |
| 6,691,025 B2 | 2/2004 | Reimer | 701/123 |
| 6,693,553 B1 | 2/2004 | Ciglenec et al. | 340/853.1 |
| 6,715,612 B1 | 4/2004 | Krystof | 209/331 |
| 6,722,504 B2 | 4/2004 | Schulte et al. | 209/359 |
| 6,746,602 B2 | 6/2004 | Fout et al. | 210/188 |
| 6,763,605 B2 | 7/2004 | Reddoch | 34/58 |
| 6,766,254 B1 | 7/2004 | Bradford et al. | 702/9 |
| 6,769,550 B2 | 8/2004 | Adams et al. | 209/399 |
| 6,780,147 B2 | 8/2004 | Koch et al. | 494/53 |
| 6,783,088 B1 | 8/2004 | Gillis et al. | 241/19 |
| 6,783,685 B2 | 8/2004 | Huang | 210/690 |
| 6,790,169 B2 | 9/2004 | Koch et al. | 494/53 |
| 6,793,814 B2 | 9/2004 | Fout et al. | 210/188 |
| 6,808,626 B2 | 10/2004 | Kulbeth | 210/241 |

(56) References Cited

U.S. PATENT DOCUMENTS

| | | | |
|---|---|---|---|
| 6,827,223 B2 | 12/2004 | Colgrove et al. | 209/365.3 |
| 6,838,008 B2 | 1/2005 | Fout et al. | 210/780 |
| 6,860,845 B1 | 3/2005 | Miller et al. | 494/1 |
| 6,863,183 B2 | 3/2005 | Schulte et al. | 209/405 |
| 6,863,809 B2 | 3/2005 | Smith et al. | 210/202 |
| 6,868,920 B2 | 3/2005 | Hoteit et al. | 175/25 |
| 6,868,972 B2 | 3/2005 | Seyffert et al. | 209/254 |
| 6,873,267 B1 | 3/2005 | Tubel et al. | 340/853.3 |
| 6,892,812 B2 | 5/2005 | Niedermayr et al. | 166/250.15 |
| 6,896,055 B2 | 5/2005 | Koithan | 166/250.15 |
| 6,899,178 B2 | 5/2005 | Tubel | 166/313 |
| 6,905,452 B1 | 6/2005 | Kirsch | 494/8 |
| 6,907,375 B2 | 6/2005 | Guggari et al. | 702/113 |
| 6,926,101 B2 | 8/2005 | deBoer | 175/70 |
| 6,932,169 B2 | 8/2005 | Wylie et al. | 175/66 |
| 6,932,757 B2 | 8/2005 | Beattey | 494/55 |
| 6,971,982 B1 | 12/2005 | Kirsch | 494/8 |
| 6,981,940 B2 | 1/2006 | Rafferty | 494/7 |
| 7,001,324 B2 | 2/2006 | Hensley et al. | 494/53 |
| 7,018,326 B2 | 3/2006 | Koch et al. | 494/53 |
| 7,041,044 B2 | 5/2006 | Gilbert | 494/53 |
| D524,825 S | 7/2006 | Koch et al. | D15/21 |
| 7,093,678 B2 | 8/2006 | Risher et al. | 175/66 |
| 7,144,516 B2 | 12/2006 | Smith | 210/803 |
| 7,175,027 B2 | 2/2007 | Strong et al. | 209/405 |
| 7,195,084 B2 | 3/2007 | Burnett et al. | 175/66 |
| 7,198,156 B2 | 4/2007 | Schulte et al. | 209/309 |
| 7,216,767 B2 | 5/2007 | Schulte et al. | 209/309 |
| 7,228,971 B2 | 6/2007 | Mooney et al. | 209/396 |
| 7,264,125 B2 | 9/2007 | Lipa | 209/397 |
| 7,284,665 B2 | 10/2007 | Fuchs | 209/270 |
| 7,303,079 B2 | 12/2007 | Reid-Robertson et al. | 209/405 |
| 7,306,057 B2 | 12/2007 | Strong et al. | 175/66 |
| 7,316,321 B2 | 1/2008 | Robertson et al. | 209/400 |
| 7,337,860 B2 | 3/2008 | McIntyre | 175/66 |
| 7,373,996 B1 | 5/2008 | Martin et al. | 175/206 |
| 7,387,602 B1 | 6/2008 | Kirsch | 494/8 |
| 7,514,011 B2 | 4/2009 | Kulbeth | 210/780 |
| 7,540,837 B2 | 6/2009 | Scott et al. | 494/7 |
| 7,540,838 B2 | 6/2009 | Scott et al. | 494/7 |
| 7,581,569 B2 | 9/2009 | Beck | 139/425 R |
| 7,703,612 B2 * | 4/2010 | Browne et al. | 209/311 |
| 7,770,665 B2 | 8/2010 | Eia et al. | 175/66 |
| 2001/0032815 A1 | 10/2001 | Adams et al. | 210/388 |
| 2002/0000399 A1 | 1/2002 | Winkler et al. | 209/399 |
| 2002/0018399 A1 | 2/2002 | Schultz et al. | 361/81 |
| 2002/0033278 A1 | 3/2002 | Reddoch | 175/57 |
| 2002/0033358 A1 | 3/2002 | Bakula | 209/331 |
| 2002/0035551 A1 | 3/2002 | Sherwin et al. | 705/412 |
| 2002/0065698 A1 | 5/2002 | Schick et al. | 705/8 |
| 2002/0112888 A1 | 8/2002 | Leuchtenberg | 175/48 |
| 2002/0134709 A1 | 9/2002 | Riddle | 209/238 |
| 2003/0015351 A1 | 1/2003 | Goldman et al. | 175/39 |
| 2003/0038734 A1 | 2/2003 | Hirsch et al. | 340/853.1 |
| 2003/0109951 A1 | 6/2003 | Hsiung et al. | 700/108 |
| 2003/0220742 A1 | 11/2003 | Niedermayr et al. | 702/9 |
| 2004/0040746 A1 | 3/2004 | Niedermayr et al. | 175/38 |
| 2004/0051650 A1 | 3/2004 | Gonsoulin et al. | 340/853.1 |
| 2004/0156920 A1 | 8/2004 | Kane | 424/725 |
| 2004/0245155 A1 | 12/2004 | Strong et al. | 209/405 |
| 2005/0103689 A1 | 5/2005 | Schulte, Jr. et al. | 209/405 |
| 2005/0236305 A1 | 10/2005 | Schulte, Jr. et al. | 209/403 |
| 2005/0255186 A1 | 11/2005 | Hiraga | 425/542 |
| 2006/0019812 A1 | 1/2006 | Stalwick | 494/42 |
| 2006/0034988 A1 | 2/2006 | Bresnahan et al. | 426/502 |
| 2006/0081508 A1 | 4/2006 | Astleford et al. | 209/309 |
| 2006/0102390 A1 | 5/2006 | Burnett et al. | 175/66 |
| 2006/0105896 A1 | 5/2006 | Smith et al. | 494/7 |
| 2006/0144779 A1 | 7/2006 | Bailey | 210/330 |
| 2007/0108105 A1 | 5/2007 | Burnett | |
| 2007/0108106 A1 | 5/2007 | Burnett | 209/325 |
| 2007/0131592 A1 | 6/2007 | Browne et al. | 209/399 |
| 2008/0078697 A1 | 4/2008 | Carr | 209/49 |
| 2008/0078702 A1 | 4/2008 | Carr et al. | 209/326 |
| 2008/0078704 A1 | 4/2008 | Carr et al. | 209/399 |
| 2008/0093269 A1 | 4/2008 | Timmerman et al. | 209/405 |
| 2008/0179090 A1 | 7/2008 | Eia et al. | 175/5 |
| 2008/0179096 A1 | 7/2008 | Eia et al. | 175/66 |
| 2008/0179097 A1 | 7/2008 | Eia et al. | 175/66 |
| 2009/0071878 A1 | 3/2009 | Bosse | 209/391 |
| 2009/0105059 A1 | 4/2009 | Dorry et al. | 494/37 |
| 2009/0178978 A1 | 7/2009 | Beebe et al. | 210/747 |
| 2009/0242466 A1 | 10/2009 | Burnett et al. | 209/555 |
| 2009/0286098 A1 | 11/2009 | Yajima et al. | 428/507 |
| 2009/0316084 A1 | 12/2009 | Yajima et al. | 349/96 |
| 2010/0084190 A1 | 4/2010 | Eia et al. | 175/5 |
| 2010/0119570 A1 | 5/2010 | Potter et al. | 424/422 |
| 2010/0237024 A1 * | 9/2010 | Carr et al. | 210/780 |

FOREIGN PATENT DOCUMENTS

| | | |
|---|---|---|
| FR | 2 636 669 | 3/1990 |
| GB | 1 526 663 | 9/1978 |
| GB | 2 030 482 A | 4/1980 |
| GB | 1 578 948 | 11/1980 |
| GB | 2 176 424 | 12/1986 |
| GB | 2 327 442 A | 1/1999 |
| GB | 2 408 006 B | 4/2007 |
| JP | 55112761 | 8/1980 |
| JP | 59069268 | 4/1984 |
| JP | 63003090 | 1/1988 |
| JP | 63283860 | 11/1988 |
| JP | 63290705 | 11/1988 |
| JP | 02127030 | 5/1990 |
| JP | 02167834 | 6/1990 |
| JP | 03240925 | 10/1991 |
| JP | 03264263 | 11/1991 |
| JP | 04093045 | 3/1992 |
| JP | 04269170 | 9/1992 |
| JP | 05043884 | 2/1993 |
| JP | 05301158 | 11/1993 |
| JP | 06063499 | 3/1994 |
| JP | 07304028 | 11/1995 |
| JP | 08039428 | 2/1996 |
| JP | 08270355 | 10/1996 |
| JP | 09109032 | 4/1997 |
| JP | 10337598 | 12/1998 |
| WO | WO96/08301 | 3/1996 |
| WO | WO96/33792 | 10/1996 |
| WO | WO98/10895 | 3/1998 |
| WO | WO98/16328 | 4/1998 |
| WO | WO2004/110589 A1 | 12/2004 |
| WO | WO2005/107963 A2 | 11/2005 |
| WO | WO 2008/042844 A1 | 4/2008 |
| WO | WO2009/048783 A2 | 4/2009 |

OTHER PUBLICATIONS

U.S. Appl. No. 12/490,492 Office Action dated Oct. 7, 2011.
U.S. Appl. No. 12/321,358 Final Office Action dated Jan. 18, 2012.
U.S. Appl. No. 12/321,358 Office Action dated Aug. 29, 2011.
U.S. Appl. No. 12/287,716 Office Action dated Jun. 17, 2011.
U.S. Appl. No. 12/287,709 Office Action dated Mar. 29, 2011.
U.S. Appl. No. 12/231,293 Office Action dated Sep. 13, 2011.
U.S. Appl. No. 12/228,670 Office Action dated Jun. 20, 2011.
U.S. Appl. No. 12/227,462 Final Office Action dated May 26, 2011.
U.S. Appl. No. 12/008,980 Office Action dated Aug. 31, 2011.
U.S. Appl. No. 12/008,980 Office Action dated Apr. 5, 2011.
U.S. Appl. No. 12/001,479 Final Office Action dated Oct. 31, 2011.
U.S. Appl. No. 12/001,479 Office Action dated Jun. 8, 2011.
U.S. Appl. No. 11/897,975 Office Action dated Jun. 8, 2012.
U.S. Appl. No. 11/897,975 Final Office Action dated Aug. 12, 2011.
U.S. Appl. No. 11/897,975 Office Action dated Mar. 1, 2011.
U.S. Appl. No. 11/637,615 Final Office Action dated Nov. 16, 2011.
U.S. Appl. No. 11/637,615 Office Action dated Jul. 21, 2011.
International Search Report and Written Opinion from PCT/GB2010/051050 dated Jan. 30, 2012.
EP Application No. 07 733 775.6 EPC Communication dated Dec. 9, 2010.
Adams et al., "The Advanced Technology Linear Separator Model ATL-1000," Drexel Oilfield Services, STC 03, 18 pages (1991).

(56) References Cited

OTHER PUBLICATIONS

AMS 2000 Description, Thule Rigtech, Rig Technology, 18 pages (2000).
Automated Chemical Additive System, Thule Rigtech, Rig Technology Ltd., 4 pages (2000).
Brandt Automated Shaker Control, Varco, 1 page (2002).
Brandt®, A Varco Company, King Cobra Series, Installation, Operation, and Maintenance Manual, M12444 R5, 65 pages (2003).
Brandt®, A Varco Company, LCM-2D LP Installation and Operation Manual, 84 pages (1998).
Brandt et al., Mud Equipment Manual—Handbook 3: Shale Shakers, Gulf Pub. Co., 18 pages (1982).
The Derrick LP Sandwich Shaker, Derrick Equipment Company, 4 pages (1981).
Fluid Systems Inc., The Prodigy Series I™ Dynamic Control Shaker, 2 pages (Apr. 27, 2004).
Sweco® Oilfield Services, LM-3 Full-Flo™ Shale Shaker, 4 pages (1991).
U.S. Appl. No. 12/481,959 Final Office Action dated Oct. 27, 2010.
U.S. Appl. No. 12/481,959 Office Action dated Jun. 7, 2010.
U.S. Appl. No. 12/469,851 Final Office Action dated Nov. 9, 2010.
U.S. Appl. No. 12/469,851 Office Action dated Jun. 28, 2010.
U.S. Appl. No. 12/227,462 Office Action dated Nov. 15, 2010.
U.S. Appl. No. 11/897,976 Final Office Action dated Sep. 1, 2010.
U.S. Appl. No. 11/897,976 Office Action dated Apr. 1, 2010.
U.S. Appl. No. 11/897,975 Final Office Action dated Jul. 21, 2010.
U.S. Appl. No. 11/897,975 Office Action dated Feb. 19, 2010.
U.S. Appl. No. 11/637,615 Final Office Action dated Aug. 2, 2010.
U.S. Appl. No. 11/637,615 Office Action dated Mar. 2, 2010.
Polyamide 6/6—Nylon 6/6—PA 6/6 60% Glass Fibre Reinforced, Data Sheet [online], AZoM™, The A to Z of Materials and AZojomo, The "AZo Journal of Materials Online" [retrieved on Nov. 23, 2005] (2005) (Retrieved from the Internet: <URL: http://web.archive.org/web/20051123025735/http://www.azom.com/details.asp?ArticleID=493>.
International Search Report from PCT/GB2011/050975 dated Nov. 15, 2012.
Related U.S. Appl. No. 12/321,358 Office Action dated Feb. 5, 2015.

\* cited by examiner

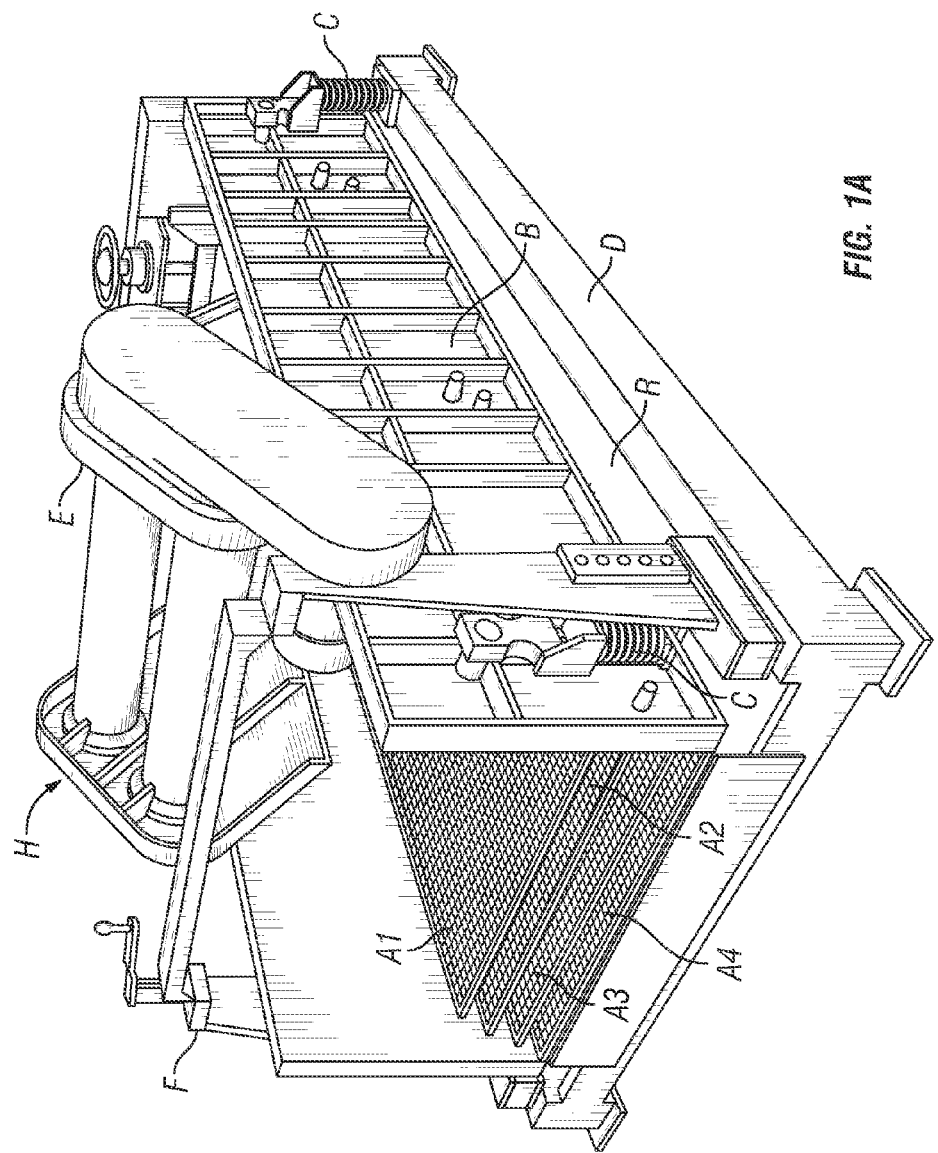

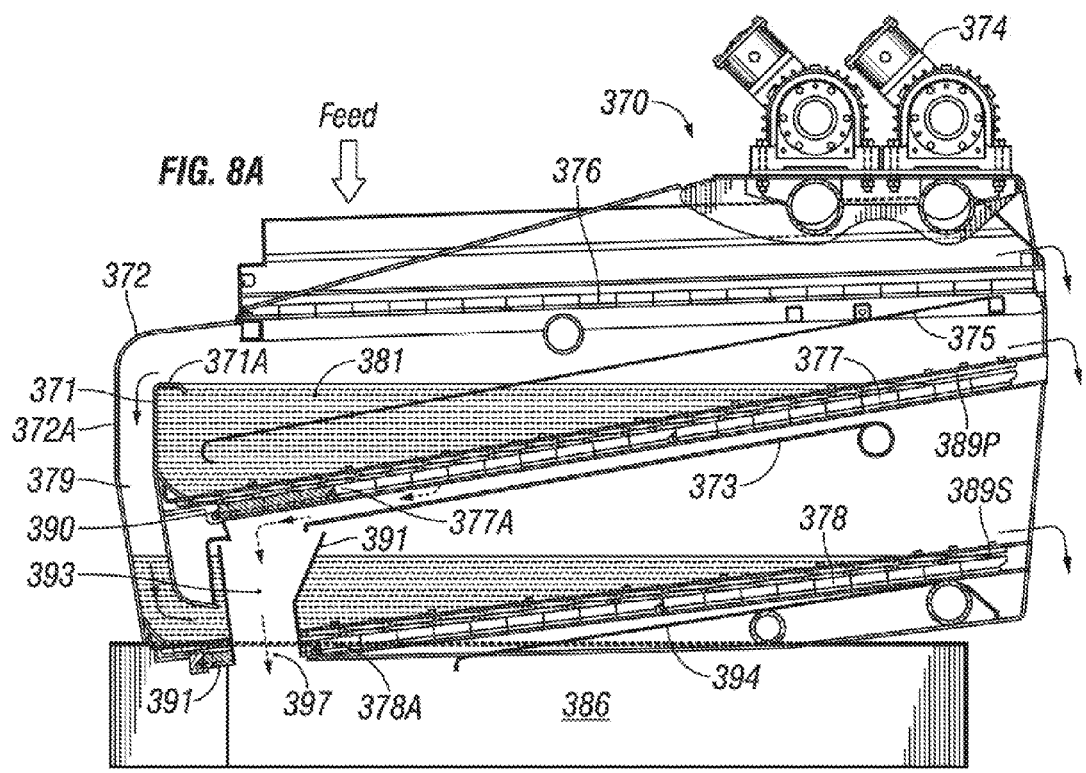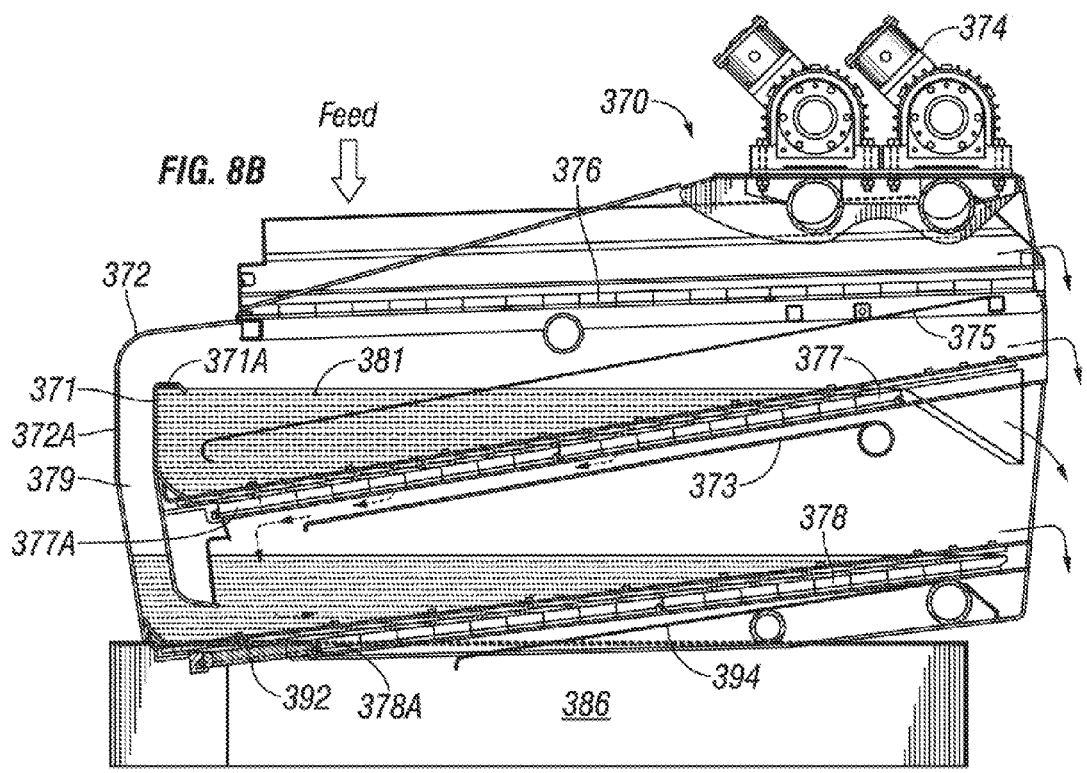

SHALE SHAKER

CROSS-REFERENCE TO RELATED APPLICATIONS

This Application is a continuation-in-part of Ser. No. 12/490,492 filed on Jun. 24, 2009 now U.S. Pat. No. 8,556,083 entitled "Shale Shaker flow Diverter", which is a continuation-in-part of U.S. application Ser. No. 12/287,709 filed on Oct. 10, 2008 now U.S. Pat. No. 8,113,356 entitled "Systems and Methods For the Recovery of Lost Circulation and Similar Material" both of which are incorporated by reference herein for all they disclose.

BACKGROUND OF THE INVENTION

1. Field of the Invention

The present invention is directed to drilling fluid processing systems; shale shakers; to methods for using these things; and, in certain particular aspects, to shale shakers with structure for converting shaker fluid flow paths from series to parallel, and vice versa.

2. Description of the Related Art

In the oil and gas industries, shale shakers use screens to treat drilling fluid contaminated with undesirable solids. Typically such apparatuses have a basket, deck, or other screen holding or mounting structure mounted in or over a receiving receptacle or tank and vibrating apparatus for vibrating one or more screens. Material to be treated is introduced to the screen(s) either by flowing it directly onto the screen(s) or by flowing it into a container, tank, or "possum belly" from which it then flows to the screen(s). Often, the screen or screens used to treat material is sealed in place on a screen deck, in a screen basket, or on screen mounting structure.

In the drilling of a borehole in the construction of an oil or gas well, a drill bit is arranged on the end of a drill string, which is rotated to bore the borehole through a formation. A drilling fluid known as "drilling mud" is pumped through the drill string to the drill bit to lubricate the drill bit. The drilling mud is also used to carry the cuttings produced by the drill bit and other solids to the surface through an annulus formed between the drill string and the borehole. The density of the drilling mud is closely controlled to inhibit the borehole from collapse and to ensure that drilling is carried out optimally. The density of the drilling mud affects the rate of penetration of the drill bit. By adjusting the density of the drilling mud, the rate of penetration changes at the possible detriment of collapsing the borehole. The drilling mud may also carry lost circulation materials for sealing porous sections of the borehole. The acidity of the drilling mud may also be adjusted according to the type of formation strata being drilled through. The drilling mud contains inter alia expensive synthetic oil-based lubricants and it is normal therefore to recover and re-use the used drilling mud, but this requires inter alia the solids to be removed from the drilling mud. This is achieved by processing the drilling mud. The first part of the process is to separate the solids from the solids laden drilling mud. This is at least partly achieved with a vibratory separator, such as those shale shakers disclosed in U.S. Pat. No. 5,265,730, WO 96/33792 and WO 98/16328. Further processing equipment such as centrifuges and hydrocyclones may be used to further clean the mud of solids. The solids are covered in contaminates and residues. It is not uncommon to have 30 to 100 m3 of drilling fluid in circulation in a borehole.

The resultant solids, known herein as "drill cuttings" are processed to remove substantially all of the residues and contaminates from the solids. The solids can then be disposed of in a landfill site or by dumping at sea in the environment from which the solids came. Alternatively, the solids may be used as a material in the construction industry or have other industrial uses.

Shale shakers generally comprise an open bottomed basket having one open discharge end and a solid walled feed end. A number of rectangular screens are arranged over the open bottom of the basket. The screens may be substantially planar or have a slight crown. The basket is arranged on springs above a receptor for receiving recovered drilling mud. A skip or ditch is provided beneath the open discharge end of the basket. A motor is fixed to the basket, which has a drive rotor provided with an offset clump weight. In use, the motor rotates the rotor and the offset clump weight, which causes the basket and the screens fixed thereto to shake. Solids laden mud is introduced at the feed end of the basket on to the screens. The shaking motion induces separation of the drilling mud from the solids, the drilling mud passing through the screens and the solids above the screens. The shaking motion also induces the solids to move along the screens towards the open discharge end. The recovered drilling mud is received in the receptor for further processing and the solids pass over the discharge end of the basket into the ditch or skip.

The rectangular screens may be arranged at an angle to horizontal, such as a seven degrees incline from the feed end to the discharge end of the shale shaker. The angle may be adjustable. The screens are generally fixed in the basket and the basket is adjustable to adjust the angle of the screens relative to horizontal. The flow of solids laden drilling fluid may form a pool on the inclined screens. The action of the vibratory mechanism induces solids to climb the inclined screens to the discharge end of the shaker and into the ditch or skip.

Generally, a vibratory mechanism inducing a circular vibration will tend to throw solids from the screen into the air in random directions. A vibratory mechanism inducing an elliptical motion will induce the solids to move in a direction of the longest chord of the ellipse. A shale shaker having a vibratory mechanism inducing a very thin ellipse is known as a linear shale shaker and induces fast movement of solids along the screen, although the screen tends to suffer fast degradation due to sudden deceleration of the solids as they meet the screen.

The screens are generally of one of two types: hook-strip; and pre-tensioned.

The hook-strip type of screen comprises several rectangular layers of mesh in a sandwich, usually comprising one or two layers of fine grade mesh and a supporting mesh having larger mesh holes and heavier gauge wire. The layers of mesh are joined at each side edge by a strip which is in the form of an elongate hook. In use, the elongate hook is hooked on to a tensioning device arranged along each side of a shale shaker. The shale shaker further comprises a crowned set of supporting members, which run along the length of the basket of the shaker, over which the layers of mesh are tensioned. An example of this type of screen is disclosed in GB-A-1,526,663. The supporting mesh may be provided with or replaced by a panel having apertures therein. The pre-tensioned type of screen comprises several rectangular layers of mesh, usually comprising one or two layers of fine grade mesh and a supporting mesh having larger mesh holes and heavier gauge wire. The layers of mesh are pre-tensioned on a rigid support comprising a rectangular angle iron frame and adhered thereto. The screen is then inserted into C-channel rails arranged in a basket of a shale shaker. An example of this type of screen is disclosed in GB-A-1,578,948 and an example of a shale shaker suitable for receiving the pre-tensioned type screens is disclosed in GB-A-2,176,424.

A problem associated with shale shakers is that screens used therein tend to blind, especially when the solids are gummy, such as clay, or of a size close to the size of the mesh size of the screen. The latter type of blinding is known as near-sized particle blinding. A number of solutions have been proposed to tackle this problem, such as disclosed in GB-A-1,526,663 in which a screen assembly using two layers of screening material in a sandwich and allowing the layers of screening material to move independently to dislodge any near sized particles lodged in one of the screens.

It is advantageous to use fine-meshed filters to filter very small particles, for example of a size in the range of 50-200μ or more, without the filtering device clogging up with the small particles. However, it is the fine-meshed filters in particular that are prone to such undesired clogging.

It is also advantageous to have a simple reliable separator to inhibit down-time for maintenance and repair.

It is preferable in certain circumstances to retain particles, for example of a particle size in the range of 50-60μ or larger, by means of a filter.

In the past it has been common to use multiple screens at multiple levels in a shale shaker to process drilling fluid, e.g., screens at one, two or three levels. "Lost circulation" of drilling fluid occurs when, in drilling a wellbore, the circulation of drilling fluid to and then away from the drill bit ceases due to the porosity of the formation and/or due to fracturing of the formation through which the wellbore is being drilled. When lost circulation occurs, drilling fluid is pumped into the fractured formation rather than being returned to the surface. Often circulation is lost at some specific depth where the formation is "weak", and that the fracture extends horizontally away from the borehole. Expressions used to describe rocks that are susceptible to lost returns include terms like vugular limestone, unconsolidated sand, "rotten" shale, and the like.

A wide variety of "lost circulation materials" ("LCM") have been pumped into wellbores to fill or seal off a porous formation or to fill or seal off a wellbore fracture so that a proper route for drilling fluid circulation is re-established. Often lost circulation materials are generally divided into fibres, flakes, granules, and mixtures. Often it is also desirable to recover and retain the lost circulation material in the drilling mud system during continuous circulation. Screening the drilling mud for removal of undesired particulate matter can also result in removal of the lost circulation material and, therefore, require continuous introduction of new lost circulation material to the drilling mud downstream of the mud screening operation. The addition of lost circulation material compounds the separating problems because it, like the drilling fluid, is preferably cleaned and recirculated. Exiting the well is the drilling fluid of small size, the lost circulation material of a large size, and the undesirable material of a size there-between, with the largest and smallest of the materials, and/or materials larger than the lost circulation material, to be re-circulated.

One proposed solution to this separation problem is a conventional two step screening process as shown in U.S. Pat. No. 4,116,288. There the exiting mixture of drilling fluid, lost circulation material and undesirable material is first subjected to a coarse screening to separate the lost circulation material from the drilling fluid and undesirable material which drops to a second finer screen there-below to separate the drilling fluid from the undesirable material. The drilling fluid and lost circulation material are then reunited for recirculation into the well. This system is susceptible to height restrictions and fine screen problems. The lost circulation material can be coated with undesirable material which will not go through a first screen, moves over and exits off of the top side of the first screen, and is circulated back into a well.

There are a variety of known drilling fluid processing systems, shale shakers, and methods for recovery of lost circulation material; including, for example, but not limited to, those in U.S. Pat. Nos. 6,868,972; 6,669,027; 6,662,952; 6,352,159; 6,510,947; 5,861,362; 5,392,925; 5,229,018; 4,696,353; 4,459,207; 4,495,065; 4,446,022; 4,306,974; 4,319,991; and 4,116,288 (all said patents incorporated by reference herein for all purposes).

In certain prior systems, problems have been encountered with systems for screening out lost circulation material when undesirable material of the same size is also screened out.

In the drilling of an oil or gas well, cracks may exist in the wall of the wellbore. Such cracks in the formation may propagate, which could cause structural problems in the wall of the wellbore and/or allow drilling fluids to escape therethorough into the formation. Furthermore, if substantial amounts of drilling fluids are lost, the pressure in the drilling fluid in the wellbore may drop, which could cause collapse of the wellbore. Accordingly, Wellbore Strengthening Materials may be added to circulated drilling fluid. The Wellbore Strengthening Materials comprise sized particles. When the drilling fluid is circulated around the wellbore wall with cracks therein, the sized particles wedge themselves in the cracks, which reduces the likelihood of the cracks propagating. It is beneficial to recover these sized particles and reuse them in circulated drilling mud. Shale shakers have thus been modified to size solids in solids laden drilling fluid. Such a shale shaker is disclosed in U.S. Ser. No. 12/490,492. A range of sizes of solids can be extracted using such a shale shaker and re-circulated as Wellbore Strengthening Material in fresh drilling fluid.

It is preferable to remove fine solids from the solids laden drilling fluid. These fine solids can be very invasive and increase rates of wear in parts that make up the well bore and the drill string.

BRIEF SUMMARY OF THE INVENTION

The present invention discloses, in certain aspects, According to the present invention, there is provided a shale shaker for separating solids from solids laden drilling fluid, the shale shaker comprising a basket having at least one first screen deck and at least one second screen deck and at least one first duct and at least one second duct, wherein the basket further comprises a flow tray having at least one first duct opening for the at least one first duct and at least one second duct opening for the at least one second duct, the at least one first duct for directing solids laden drilling fluid to the at least one first screen deck and the at least one second duct for directing solids laden drilling fluid to the at least one second screen deck.

Preferably, the solids laden drilling fluid flows along the flow tray in a flow direction the flow tray having a flow tray width substantially transverse to the flow direction, the at least one first duct opening arranged across a first portion of the flow tray width and the second duct opening arranged across a second portion of the flow tray width, the first portion not overlapping the second portion.

Advantageously, the at least one first duct opening is a plurality of first duct openings, and the at least one second duct opening is a plurality of second duct openings. Preferably, the solids laden drilling fluid flows along the flow tray in a flow direction, the plurality of first duct openings interleaved with the plurality of second duct openings, the plurality of first and second duct openings arranged substantially perpendicularly to the flow direction.

Advantageously, the flow tray has a feed end and a discharge end, the first and second duct openings arranged at the discharge end of the flow tray. Preferably, the flow tray has a floor and at least one of the first and second duct openings is planar with the floor of the flow tray. Advantageously, the other of the first and second ducts has a duct opening planar with a floor of the flow tray. The solids laden drilling fluid thus does not pass over a weir and the solids laden drilling fluid is split across the first and second screen decks with an even consistency. An overflow from a weir tends to contain more fluid and low density solids and the fluid left in behind the weir tends to contain high density solids, which tend to be sharp and aggressive which wear screening material out quickly. It is advantageous for the screen assemblies to wear evenly, so that all screens can be changed at one time, which reduces downtime of the shale shaker. Preferably, the duct opening is in the form of a planar opening a floor of the flow tray. Advantageously, the duct opening is perpendicular to the floor of the flow tray, the duct opening defined by a perimeter. Preferably, at least a portion of the perimeter is planar with the floor of the flow tray, so that all of the solids laden drilling fluid passes through the duct openings and noen gets trapped on the flow tray. Advantageously, the flow tray further comprises a valve for directing the solids laden drilling fluid to one of the at least one first screen deck and the at least first and second duct openings. Preferably, the flow tray has at least one gate opening therein and the valve is a gate valve comprising a gate tray slide-able from closed position closing off the gate opening to a position closing the gate opening.

Preferably, the shale shaker further comprises a scalping screen for removing large solids from the solids laden drilling fluid, the solids laden drilling fluid flowing therefrom on to the flow tray and the large solids passing over the scalping screen. Advantageously, the large solids pass over the scalping screen into one of a: skip; and ditch. Preferably, the ditch comprises an auger which moves the solids into a hopper of a solids conveying apparatus, such a positive pressure pneumatic conveying apparatus. Preferably, the at least one first screen deck has a screened fluid flow tray thereunder for collecting and guiding the screened drilling fluid. Advantageously, the at least one second screen deck has a screened fluid flow tray thereunder for collecting and guiding the screened drilling fluid. Preferably, the basket further comprises at least one discharge duct for directing the screened drilling fluid from the screened fluid flow tray to a sump arranged beneath the basket.

Preferably, the at least one first screen deck is an upper screen deck and the at least one second screen deck is a lower screen deck, the lower screen deck at least part of which is arranged beneath the upper screen deck. Advantageously, the at least one first screen deck is an upper screen deck and the at least one second screen deck is a lower screen deck, the lower screen deck wholly arranged beneath the upper screen deck.

Preferably, the basket further comprises a trough, wherein the at least one first screen deck has a solids discharge end and the trough is arranged thereunder to receive solids. Preferably the trough is made from a composite material, although it may be made from a sheet steel or other metal or plastics material. Preferably, the shale shaker further comprises a sump arranged below the basket, the tough arranged to feed solids into the sump. Advantageously, the basket further comprising a jetting nozzle arranged to jet screened drilling fluid into the trough to facilitate flow of solids therethrough.

Preferably, the basket further comprises a flexible duct, solids flowing through the trough into the flexible duct and into the sump. The flexible duct preferably leads from a side wall of the basket to a sump arranged therebelow, the flexible duct allowing the basket to isolate the basket from the base to inhibit vibrations passing to the base.

Preferably, the basket further comprises a trough and a diverter plate, wherein the at least one first screen deck has a solids discharge end and the trough is arranged thereunder, the diverter plate to guide solids into the trough. Advantageously, the basket further comprises a trough and a diverter cap, wherein the at least one first screen deck has a solids discharge end and the trough is arranged thereunder, the diverter cap to inhibit solids flowing into the trough. Preferably, the shale shaker further comprises one of a skip and ditch, wherein the diverter cap guides solids into the one of the skip and the ditch.

Preferably, the at least one first screen deck comprises a left-hand first screen deck and a right-hand first screen deck. Advantageously, the at least one second screen deck comprises a left-hand and a right-hand screen deck.

Advantageously, the basket has a feed end and a solids discharge end, the at least one first screen deck arranged at an uphill angle from horizontal from the feed end of the basket to the solids discharge end. Preferably, the first and second screen decks are arranged at an uphill angle of between three and twelve degrees and most preferably seven degrees. Advantageously, the basket angle can be adjusted to alter the angle of the at least one first and second screen decks. Alternatively, the at least one first and second screen decks are arranged to be horizontal.

Preferably, the shale shaker further comprises at least one first screen assembly in the at least one first screen deck and at least one second screen assembly in the second screen deck. Advantageously, the first screen assembly has screening material thereon and the second screen assembly has screening material thereon, wherein the screening material of the first screen assembly is the same as the screening material of the second screen assembly to provide the same cut point. The shale shaker is most likely to be operating in parallel mode with this arrangement. Parallel mode tends to be used when large volumes of drilling fluid are required in a drilling operation, such as when boring a large diameter hole, which normally occurs when drilling the top first portion of the well.

Alternatively, the first screen assembly has screening material thereon and the second screen assembly has screening material thereon, wherein the screening material of the second screen assembly is finer than the screening material of the first screen assembly to provide the different cut points. The shale shaker is most likely to be operating in series mode with this arrangement.

Preferably, the shale shaker further comprises a fixed base, the basket suspended from the base on at least one spring, the basket further comprising a vibrating apparatus for vibrating the basket and the at least one first and second screen decks arranged therein. The present invention also provides a method for separating solids from solids laden drilling fluid using a shale shaker comprising a basket having a flow tray with at least first and second duct openings, at least first and second ducts, at least one first screen deck and at least one second screen deck, the method comprising the steps of flowing solids laden drilling fluid over the flow tray, through the at least first and second duct openings into the at least first and second ducts, the at least one first duct directing solids laden drilling fluid to the at least one first screen deck and the at least one second duct directing solids laden drilling fluid to the second screen deck.

The present invention also provides a shale shaker for separating solids from solids laden drilling fluid, the shale shaker comprising a basket having a scalping screen deck, at least one first screen deck and at least one second screen deck, wherein the basket further comprises a flow tray arranged between the scalping screen deck and the at least one first screen deck, and a plurality of first ducts and a plurality of second ducts, the plurality of first ducts for directing solids laden drilling fluid to the at least one first screen deck and the second plurality of second ducts for directing solids laden drilling fluid to the second screen deck.

Preferably, the flow tray has at least one gate opening therein and a gate valve comprising a gate tray slideable from a closed position closing off the gate opening to an open position opening the gate opening allowing solids laden drilling mud to flow therethrough. Preferably, the gate opening is arranged upstream of the plurality of first and second ducts, such that no or only a little solids laden drilling fluid would reach the plurality of first and second ducts.

Advantageously, the basket further comprises a screened fluid flow tray arranged under the at least one first screen deck, the screened fluid flow tray having a selector opening therein and a selector gate valve for selectively opening and closing the selector opening to selectively allow screened drilling fluid to flow therethrough on to the at least one second screen deck.

The present invention also provides a shale shaker for separating solids from solids laden drilling fluid, the shale shaker comprising a base, a basket isolated from the base, the basket comprising a scalping deck, at least one first deck and at least one second deck, the at least one first deck having a feed end and a solids discharge end, a trough arranged in the basket at the discharge end of the at least one first deck and a diverter plate for selectively inhibiting and allowing solids discharged from the discharge end of the at least one first deck into the trough.

Preferably, the shale shaker further comprises a flexible duct leading from the trough into a sump arranged beneath the basket for collecting screened drilling fluid.

The present invention also provides a method for separating solids laden drilling fluid with a shale shaker, the shale shaker comprising a base, a basket isolated from the base, the basket comprising a scalping deck having a scalping screen, at least one first deck having a screen assembly and at least one second deck having a fine screen screen assembly, the at least one first deck having a feed end and a solids discharge end, a trough arranged in the basket at the discharge end of the at least one first deck and a diverter plate the method comprising the steps of flowing solids laden drilling mud on to the scalping screen large solids passing over the scalping screen and solids laden drilling fluid passing through the scalping deck to the screen assembly of the at least one first screen deck sized solids passing over the screen assembly into the trough guided by the diverter plate into the trough.

Preferably, the method further comprises the step of flowing the sized solids from the trough into a sump under the basket, the sump also collecting screened drilling fluid screened by the fine mesh screens of the at least one second screen deck. Advantageously, flowing of the sized solids is facilitated by a jet of drilling fluid. The present invention discloses, in certain aspects, methods and systems for processing drilling fluid to recover components thereof and, in one particular aspect to multiBurnett, screen shale shakers in which fluid flow paths can be selectively changed from series to parallel, and vice versa.

In certain particular aspects, such methods and systems employs a novel shale shaker according to the present invention with screening apparatus including multiple screens and conversion apparatus for changing a first separation mode from material flowing from one screen to another in series to a second separation made in which fluid flows to multiple screens in parallel.

The present invention discloses, in certain aspects, a system for processing a mixture of drilling fluid and solid material to separate at least one component of the mixture by size from the mixture, the system including: a vibratable basket for receiving an input flow of drilling fluid with solids therein; a plurality of spaced-apart screen assemblies including a first screen assembly and a second screen assembly positioned below the first screen assembly; the screen assemblies mounted in the vibratable basket and vibratable therewith; conversion apparatus associated with the screen assemblies for selectively controlling the input flow to select one of series flow and parallel flow to the screen assemblies; drilling fluid flowable through the first screen assembly; and drilling fluid flowable through the second screen assembly and flowable down therefrom.

A vibratory separator or shale shaker, in one embodiment according to the present invention has a screen or screens at separate levels as described herein according to the present invention. In one particular aspect, two lowermost screens receive flow from a higher screen. Conversion apparatus permits this flow to be selectively changed from parallel to series, or vice-versa. The present invention, in certain embodiments, includes a vibratory separator or shale shaker with a base or frame; a "basket" or screen mounting apparatus on or in the base or frame; multiple screens at different, spaced apart distinct levels according to the present invention; vibrating apparatus; mode conversion apparatus; and a collection tank or receptacle. Such a shale shaker can treat drilling fluid with solids therein, e.g. cuttings, debris, etc.; and drilling fluid with lost circulation material therein.

The present invention discloses, in certain aspects, a conversion apparatus for a system for processing a mixture of drilling fluid and solid material to separate at least one component of the mixture from the mixture, the system including a vibratable basket for receiving an input flow of drilling fluid with solids therein, a plurality of spaced apart screen assemblies including a first screen assembly and a second screen assembly positioned below the first screen assembly, the screen assemblies mounted in the vibratable basket and vibratable therewith, drilling fluid flowable through the first screen assembly and the second screen assembly down therefrom, the conversion apparatus associated with the screen assemblies for selectively controlling the input flow to select one of series flow and parallel flow, the conversion apparatus including: a body, a first flow channel through the body for effecting system parallel flow to the screen assemblies, and a second flow channel through the body for effecting system series flow to the screen assemblies.

In certain particular aspects, an insert between screens is a movable gate structure between screens provides the mode conversion feature. In other aspects inserts adjacent screens, appropriate flow channelling, and appropriately located flow-back barriers provide this mode conversion feature.

The present invention discloses, in certain aspects, a method for treating a flow of drilling fluid with solids, the method including introducing the flow of drilling fluid with solids to a system for separating at least one component from the flow, the system as any herein according to the present invention, the method further including selecting one of a system series flow to the screen assemblies or a system parallel flow to the screen assemblies using a conversion apparatus, flowing drilling fluid with solids to the screen assemblies, and screening the flow to each screening assembly.

The present invention discloses, in certain aspects, methods and systems for processing drilling fluid to recover components thereof and, in one particular aspect for separating lost circulation material (or lost circulation material along with solids of similar size) from used drilling fluid. In certain aspects, the separated lost circulation material is recovered and used.

In certain particular aspects, such methods and systems employs a novel shale shaker according to the present invention with screening apparatus below an initial scalper screen apparatus for separating lost circulation material (and/or material of similar size) from used drilling fluid.

A vibratory separator or shale shaker, in one embodiment according to the present invention has a screen or screens at separate levels as described herein according to the present invention. In one particular aspect, two lowermost screens can receive flow from a higher screen in parallel or in series. The present invention, in certain embodiments, includes a vibratory separator or shale shaker with a base or frame; a "basket" or screen mounting apparatus on or in the base or frame; screens at three or four different, spaced-apart distinct levels according to the present invention; vibrating apparatus; and a collection tank or receptacle. Such a shale shaker can treat drilling fluid contaminated with solids, e.g. cuttings, debris, etc.; and drilling fluid with lost circulation material (and/or material of similar size) therein. Such a shale shaker, in certain aspects, provides a separate exit stream from a second screening level which is primarily lost circulation material (and/or material of similar size).

Accordingly, the present invention includes features and advantages which are believed to enable it to advance the processing of drilling fluid with lost circulation material (and/or material of similar size) therein. Characteristics and advantages of the present invention described above and additional features and benefits will be readily apparent to those skilled in the art upon consideration of the following detailed description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide the embodiments and aspects listed above and: New, useful, unique, efficient, non-obvious drilling fluid processing systems; shale shakers; and methods of the use of these systems and shakers;

Such shale shakers with screens at multiple levels and mode conversion apparatus so that material is screenable by multiple screens in series or in parallel selectively as desired; Such shale shakers with screens at four levels according to the present invention with the last two screens operating in series or in parallel; and new, useful, unique, efficient, non-obvious drilling fluid processing systems and shale shakers; and methods of their use for separating and recovering lost circulation material (and/or material of similar size) from spent drilling fluid. The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements. The Abstract that is part hereof is neither intended to define the invention, which is done by the claims, nor is it intended to be limiting of the scope of the invention or of the claims in any way.

It will be understood that the various embodiments of the present invention may include one, some, or all of the disclosed, described, and/or enumerated improvements and/or technical advantages and/or elements in claims to this invention. Certain aspects, certain embodiments, and certain preferable features of the invention are set out herein. Any combination of aspects or features shown in any aspect or embodiment can be used except where such aspects or features are mutually exclusive.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1A is a perspective view of a shale shaker according to the present invention.

FIG. 5A" is a continuation of FIG. 5A'.

FIG. 8A is a side cross-sectional view of a shale shaker according to the present invention.

FIG. 8B is a side cross-sectional view of a shale shaker according to the present invention.

Figure 1:
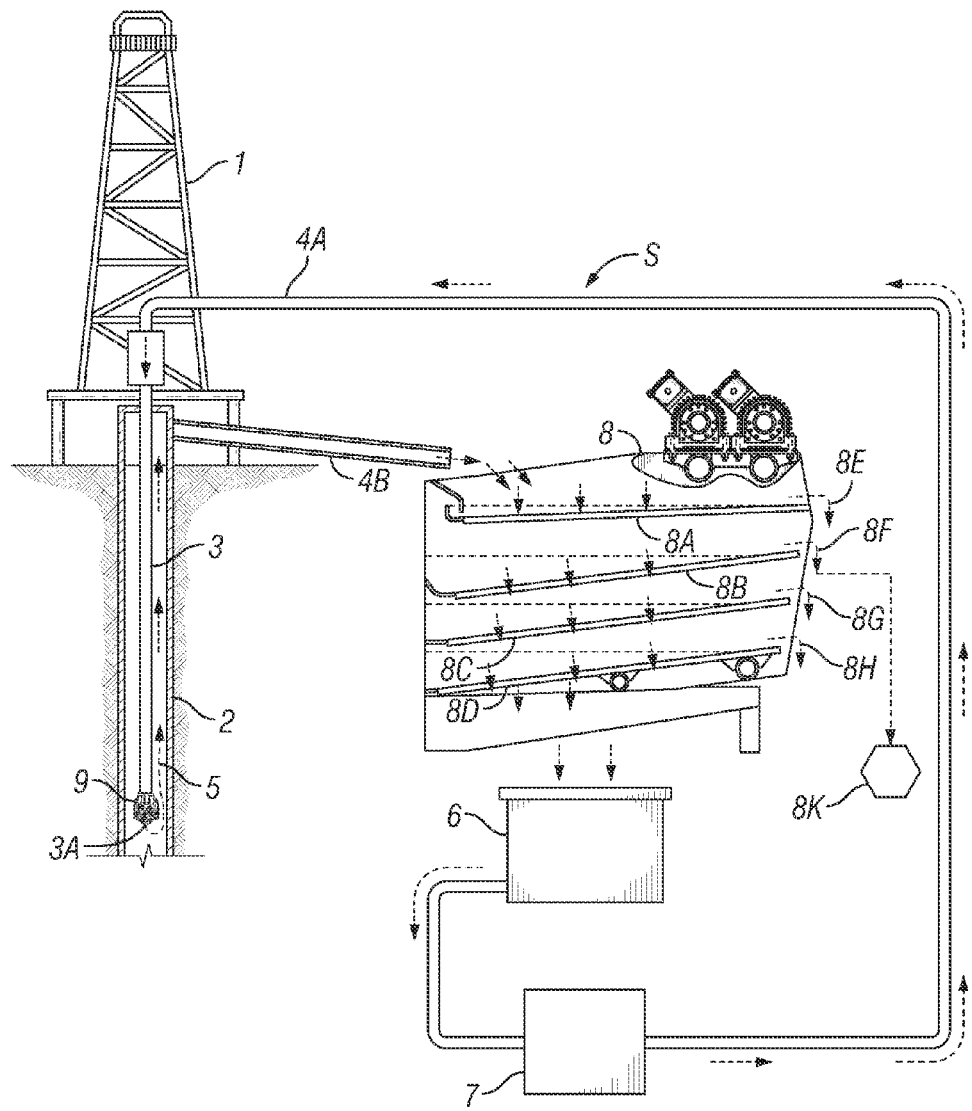
FIG. 1 is a schematic view of a system according to the present invention.

Presently preferred embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive.

It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiment, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein.

DETAILED DESCRIPTION OF THE INVENTION

FIG. 1 illustrates a system S according to the present invention which includes a derrick 1 that extends vertically over a wellbore 2. A tubular work string 3 extends into the wellbore 2, and extends from the earth's surface to a desired depth within the wellbore. A flow line 4a is connected to the tubular work string 3. A flow line 4b is connected to annular space 5 formed between the outer surface of tubular work string 3 and the inner surface of wellbore 2. Drilling fluid (or "mud") for the system in a mud pit 6 is circulated through the overall mud system via a mud pump 7. During typical drilling operations, fluid is pumped into the tubular work string 3 by the mud pump 7 through the flow line 4a, circulated out a bottom end 3a of the tubular work string 3 (e.g., but not limited to, out from a drill bit 9), up an annulus 5 of the wellbore 2, and out of the annulus 5 via the flow line 4b.

Spent (or used) fluid mud exiting the wellbore annulus 5 through the flow line 4b includes drilling fluid, drill cuttings, lost circulation material (and/or material of similar size), and other debris encountered in the wellbore 2. Accordingly, the spent drill cuttings mixture leaving the well is directed to a separation device, such as one or more shale shakers 8 according to the present invention. The combined mixture of drilling fluid, added material (e.g. solids and/or lost circulation material, etc.), debris, and drilled cuttings are directed to the shale shakers 8. Liquid drilling fluid passes through screens at the same or at different levels of the shaker, e.g. screens 8a, 8b, 8c, 8d which are at four different levels of the shale shakers 8 and is directed into the mud pit 6 (or the two lowermost screens are at the same level each receiving a portion of flow from the screen 8b). Drill cuttings and other solids pass over the screens 8a-8d of the shale shakers 8 and are discharged (arrows 8e, 8f, 8g, 8h). With the proper selection of screen mesh for the screen 8b, lost circulation material (with some material of similar size, if present) is separated by and discharged from the top of the screen 8b (see arrow 8f). The recovered lost circulation material (and/or material of similar size) flows and/or is pumped to a mud pit, a reservoir, or to a further processing apparatus 8k. Optionally, the shale shakers 8 are like any other shale shaker disclosed herein according to the present invention. One, two, or more screens in series may separate selected material (e.g., but not limited to, lost circulation material) that flows and/or is pumped to a reservoir or to the further processing apparatus 8k.

Referring now to FIG. 1A, a shale shaker H according to the present invention has screens A1, A2, A3, A4, each of which is, according to the present invention, at one of four different levels (with screen or screening cloth or mesh as desired). The screens are mounted on vibratable screen mounting apparatus or "basket" B. The screens A1, A2, A3, A4, according to the present invention, may be any suitable known screen or screens, with the screen A2 (or the screens A2 and A3) used to separate lost circulation material (and/or material of similar size). The basket B is mounted on springs C (only two shown; two as shown are on the opposite side) which are supported from a frame D. The basket B is vibrated by a motor and interconnected vibrating apparatus E which is mounted on the basket B for vibrating the basket and the screens. Elevator apparatus F provides for raising and lowering of the basket end. Fluid passing through the screens A1, A2, A3, and A4 flows into a receptacle R beneath the bottom screen A4. In certain aspects screen A1 has the coarsest mesh of all the screens and acts as a scalping screen and the screens A3 and A4 provide fine screening. The exit feeds from the top sides of the screens A1, A3, A4 may go to disposal or may be directed as described below for any embodiment of the present invention. The lost circulation material recovered from the top of the screen A2 (or, optionally, from the tops of the screens A2 and A3) may be flowed, processed and treated as described for any embodiment of the present invention. As shown, the screens A3, A4 operate in series, i.e., the underflow from the screen A3 flows down to the screen A4. Optionally, the screens A3, A4 may be operated in parallel with each receiving a portion of screen A2's underflow.

Figure 2A:
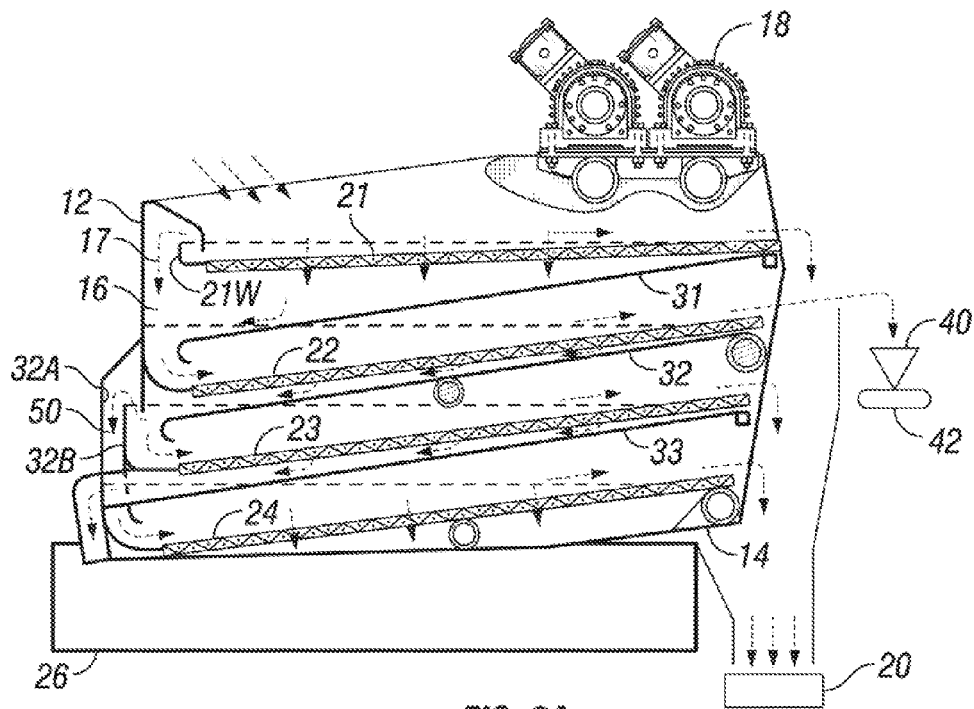
FIG. 2A is a side view, partially in cross-section, of a shale shaker according to the present invention.
Figure 2B:
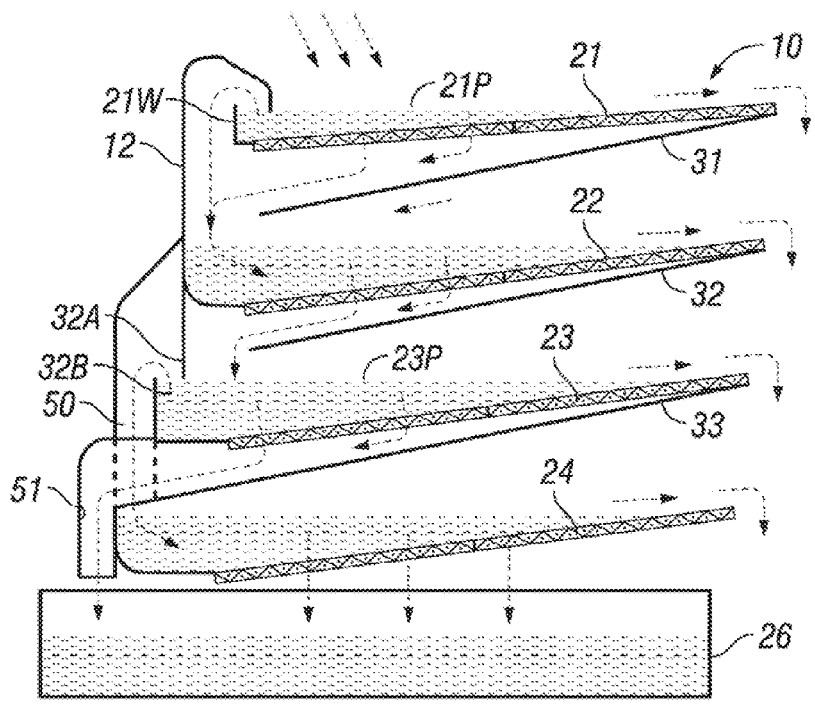
FIG. 2B is a cross-sectional view of the screens and related structure of the shale shaker of FIG. 2A.

FIGS. 2A and 2B show a system according to the present invention which includes a shale shaker 12 with a base 14 and a screen-supporting basket 16. A vibrator apparatus 18 vibrates the basket 16 and screens mounted in it. Four spaced-apart screens 21-24 are mounted in the basket 16 at different levels (e.g. spaced-apart six to eight inches) or put another way, at four different heights in the basket. In one particular embodiment the screen 21 is a scalping screen which, in one particular aspect removes relatively large pieces of material, e.g. with mesh sized so that pieces ⅛" and ¹⁄₆₄" are used. In one aspect, the screen 21 has a mesh size such that pieces greater than ¹⁄₁₆" are removed (and pieces of, among other things, solids and/or lost circulation material that are ¹⁄₁₆" or smaller in largest dimension pass through the screen 21 (e.g., but not limited to graphite ball lost circulation material that are ¹⁄₁₆" in largest dimension or slightly smaller).

The screen 22 has a mesh size as chosen for removing material of a certain largest dimension or larger, including, but not limited to solids, debris, drilled cuttings, desirable additives, and/or lost circulation material. In one aspect the mesh size is chosen in cooperation with the mesh size of the screen 21 so that the screen 22 removes lost circulation material (and solids or pieces of similar size) and, in one particular aspect the mesh size is chosen so that lost circulation material of a largest dimension of ¹⁄₁₆" or greater does not pass through the screen 22 and flows from the top thereof. In one aspect such lost circulation material is graphite balls.

The screens 23 and 24 further filter out solids from the flow through the screen 22 and, in certain aspects, the screens 23 and 24 act as typical standard fine screening screens used to process a mixture of drilling fluid and solids.

The exit streams from screens 21, 23, and 24 exit from the tops of their respective screens and flow down to a container, system or apparatus 20 for storage and/or further processing.

Drilling fluid flowing through the screens flows down to a sump or container 26 and from there to a reservoir or, in one aspect, back to an active rig mud system. The exit stream from the screen 22, in particular aspects, has wet lost circulation material (or wet lost circulation material along with solids of similar size) of at least 50% by volume; and in one particular aspect at least 75% lost circulation material by volume (in one example, the output is 50% lost circulation material and 50% solids of similar size). In certain aspects, screen mesh size is chosen so that a relatively large percentage of the flow off the top of the screen is lost circulation material, e.g. by volume, up to 50%, 75%, or up to 90%.

Fluid with some solids therein (including the lost circulation material of a certain size, if present) that flows through the screen 21 is directed to the screen 22 by a flow-back barrier (or plate) 31. Optionally, the flow-back barrier 31 is eliminated. The material (including lost circulation material of a certain size, if present) that exits from the top of the screen 22 is transferred to a reclamation system 40 (which, in one aspect, is, has or includes an auger apparatus 42 for moving solids to and/or from the reclamation apparatus) or flushed to a mud pit.

Fluid with solids that flows through the screen 22 is directed to the screens 23 and 24 by a flow-back barrier or plate 32, a flow channel 32a, and a weir 32b. Fluid with solids that flows through the screen 23 is directed to the sump 26 through a channel 51 by a flow-back barrier 33 and a channel 33a. When the level of fluid (with material therein) exceeds the height of the weir 32b, part of the flow from the screen 22 flows into the flow channel 50 bypassing the screen 23 and flowing to the screen 24 (thus, the screens 23, 24 in this manner operate in parallel). Fluid flowing through the screen 24 flows into the sump 26. Optionally, the screen 21 includes an end weir 21w and fluid and material on top of the screen 21 in a pool 21p that exceeds the height of the weir 21w bypasses the screen 21 and flows to the screen 22 via a channel 17. The flow-back barriers extend under substantially all of the surface of the particular screens under which they are located. Any one, two, or three of the flow-back barriers can, optionally, be eliminated.

The screens 21-24 are at typical screen tilt angles, e.g. between 6 degrees to 12 degrees from the horizontal and in certain aspects, at about 7 degrees or about 8 degrees.

Figure 2C:
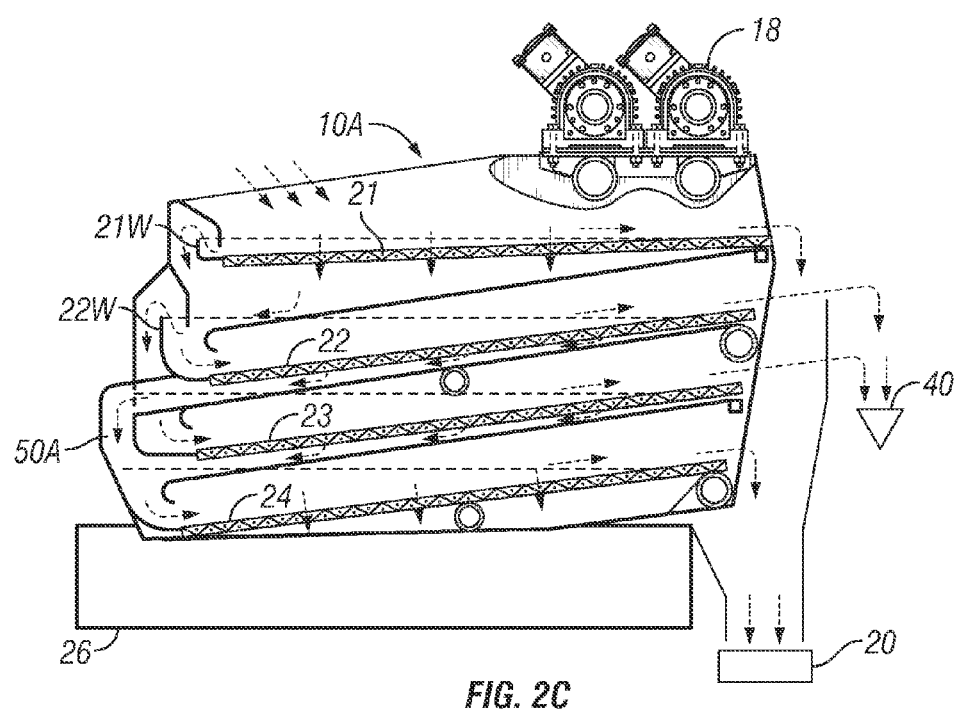
FIG. 2C is a cross-sectional view of a shale shaker according to the present invention.

A shale shaker 10a shown in FIG. 2C is like the system 10, FIG. 2A (and like numerals 25 indicate like parts). Two screens, the screens 22 and 23, are used in the shale shaker 10a to remove LCM material (and/or material of similar size). The two screens 22, 23 act in parallel with flow from the upper screen 21 flowing both to the screen 22 and, over a weir 22w, to the screen 23. Fluid flowing through the screen 22 flows to a channel 50a and then down to the screen 24 as does fluid flowing through the screen 23.

Figure 3A:
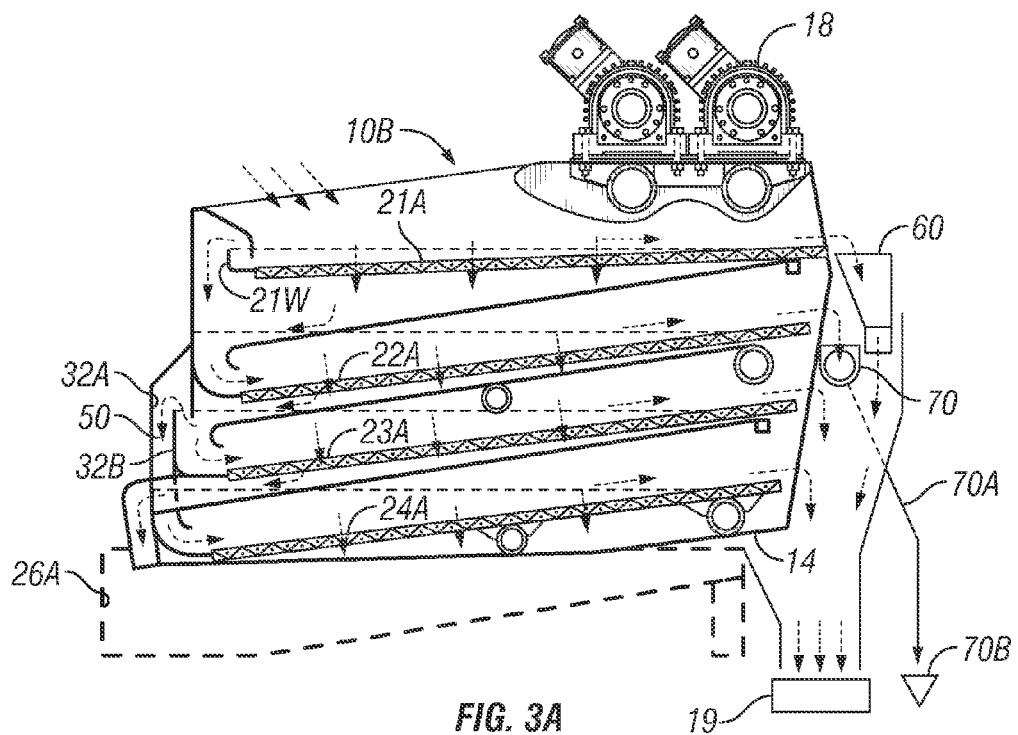
FIG. 3A is a side cutaway view of a shale shaker according to the present invention.
Figure 3B:
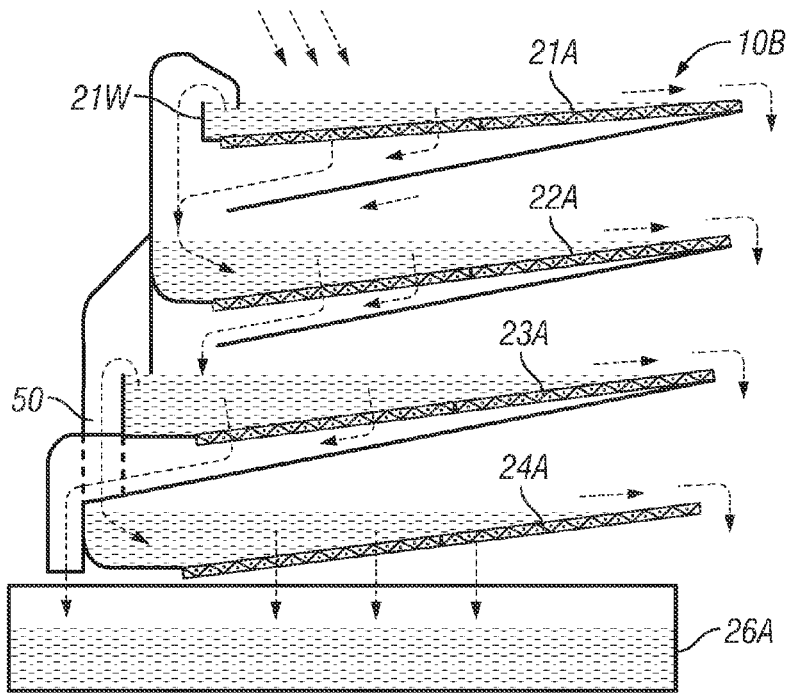
FIG. 3B is a side cutaway view of a shale shaker according to the present invention.

FIGS. 3A and 3B show a shaker system 10b like the system 10, FIG. 2A (like numerals 5 indicate like parts). The shaker 10b has a collection chute 60 which receives material from top of a screen 21a (like the screen 21, FIG. 2A) and from which the material flows down to a cuttings ditch, pit, or collector 19. An auger system 70 receives material from the top of a screen 22a (like the screen 22) and augers the material into a conduit 70a from which it flows to storage or further processing apparatus 70b or is 10 flushed to a mud pit. The flows from the tops of screens 23a (like screen 23) and 24a (like screen 24), flow to the cuttings ditch (etc.) 19. Fluid flowing through the screens flows to a sump 26a (like the sump 26). In one aspect, the screen 22a is used to recover LCM (and/or material of similar size). Optionally, as in FIG. 2C, both screens 22a and 23a are used to recover LCM (and/or material of similar size).

Material recovered from the top of a second screen in systems according to the present invention (e.g. from the top of the screen 8b, 21 or 21a) can, according to the present invention, be sent to additional treatment apparatus for further processing; including, but not limited to, a sprinkle-wash system for solids recovery, centrifuge(s), hydrocyclone(s), and/or magnetic separation apparatus. This material from the tops of these screens is, in one aspect, lost circulation material. In one aspect, considering the totality (100%) of the lost circulation material in a drilling fluid mixture fed to a top scalping screen of a system according to the present invention, about 97% of this lost circulation material flows to the second screen and about 95% (95% of the original totality of the material) is recovered from the top of the second screen; or optionally, a combination of similar sized material, including both LCM and other material is recovered.

Figure 4A:
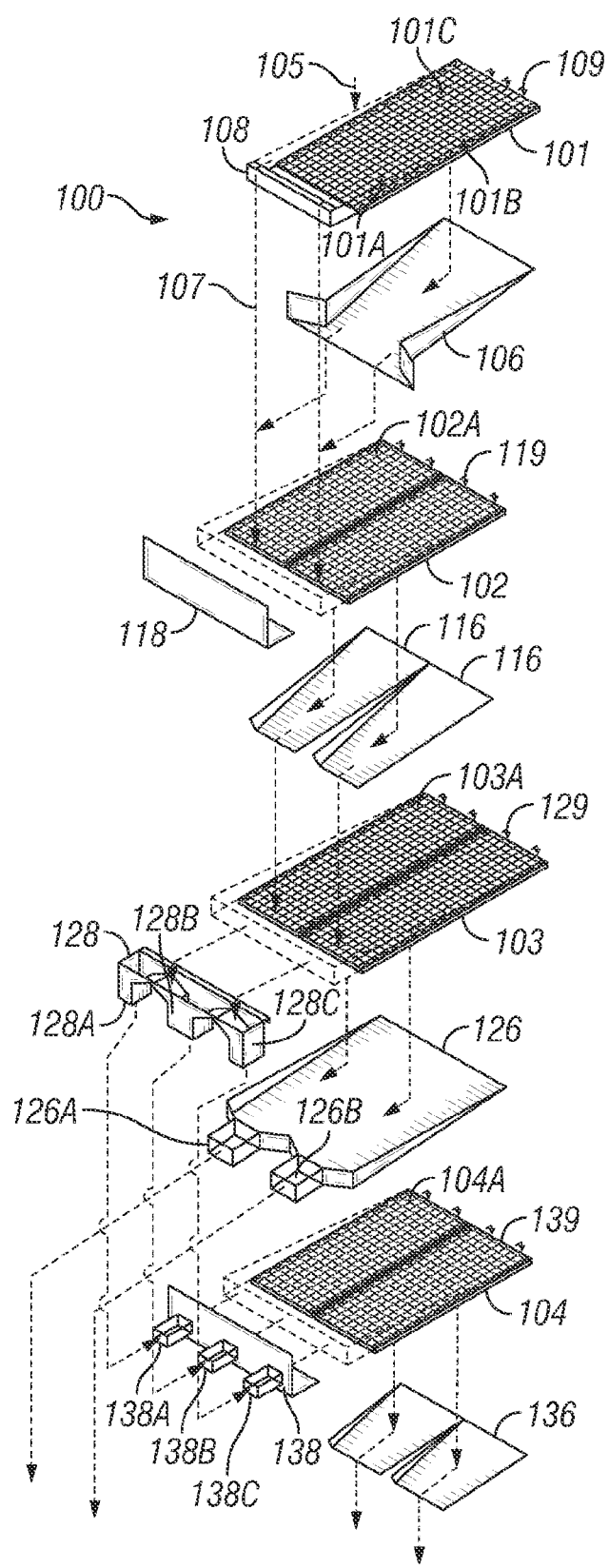
FIG. 4A is a perspective exploded view of a system according to the present invention.
Figure 4B:
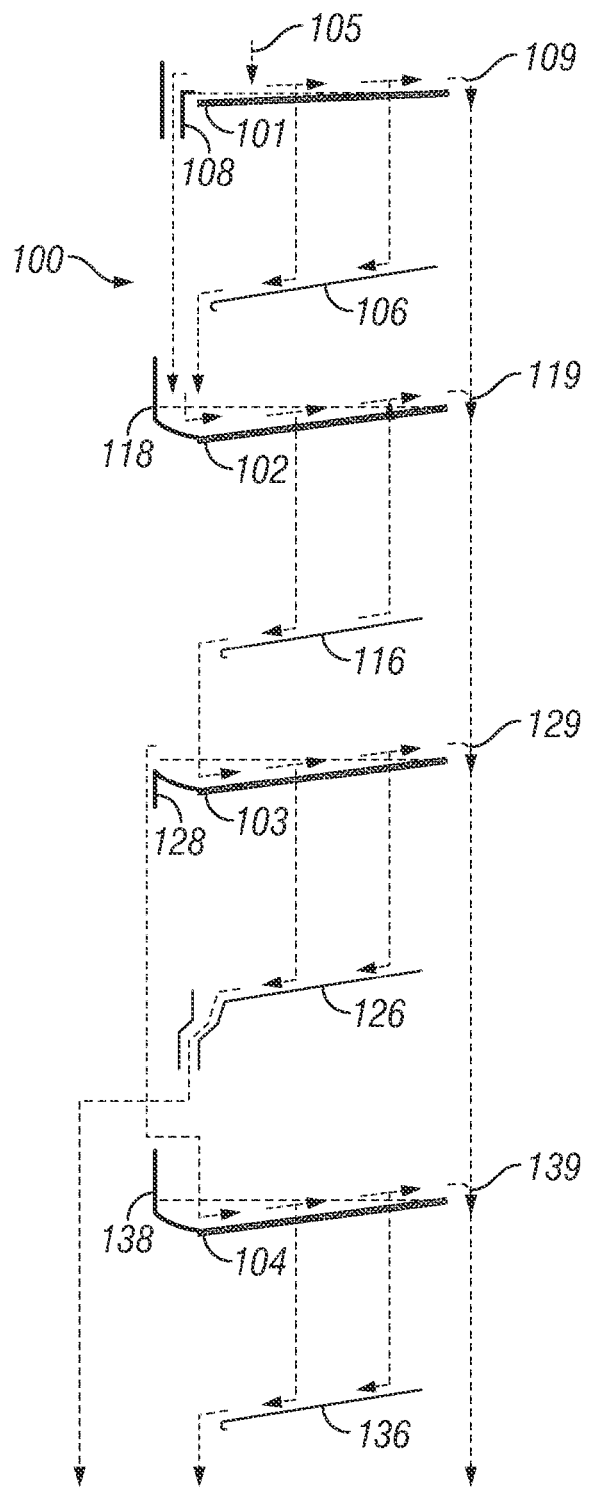
FIG. 4B is a schematic side view of the system of FIG. 4A.

FIGS. 4A and 4B illustrate a quad-tier system 100 according to the present invention which has screen decks 101, 102, 103, and 104. A feed 105 of a drilling fluid mixture is fed onto a first deck 101 with a plurality of screens 101a, 101b, 101c (may be any suitable number of screens). Drilling fluid (with some solids) flowing through the screens 101a-101c flows to a chute 106 and from there down to the deck 102. Overflow 107 from the deck 101 flows over a weir 108 (of a predetermined height) down to the deck 102. Oversized material 109 flows off the top of the screen 101c. Drilling fluid with some solids flowing through screens 102a (four shown; may be any suitable number of screens) flows to chutes 116 and from there to the deck 103. Oversize material 119 flows off the tops of screens 102a. A weir 118 prevents any overflow from the top of the screens 102a from flowing down to the deck 103.

Drilling fluid with some solids flowing through screens 103a (size shown; may be any number) of the deck 103 flows to a diverter 126 and from there to a collection structure, e.g. a tank, sump or receptacle. Overflow from the top of the screens 103a flows to a channel apparatus 128 and from there to a channel apparatus 138 which directs this flow to the top of the deck 104. Oversized material 129 flows off the tops of end screens 103a. Drilling fluid flowing through screens 104a (four shown; any number may be used) flows down to chutes 136 and then to the tank, sump, or receptacle. Oversized material 139 flows off tops of end screens 104a.

The oversized material flows, 109, 119, 129 and 139 flow to typical collection sump, pit tank, or receptacle or storage apparatus and/or to subsequent processing apparatus. In one particular aspect of the system 100, the deck 101 is a coarse screening deck (e.g. but not limited to the screen 8a, screen A1, screen 21 or screen 21a); the deck 102 is a medium mesh screening deck (e.g. but not limited to, like the screen 8b, screen A2, screen 22, or screen 22a); the deck 103 is a medium or fine screening deck (e.g., but not limited to, like the screen 8c, screen A3, screen 23 or screen 23a); and the deck 104 is a fine screening deck (e.g., but not limited to, like the screen 8d, screen A4, screen 24 or screen 24a).

Figure 5A:
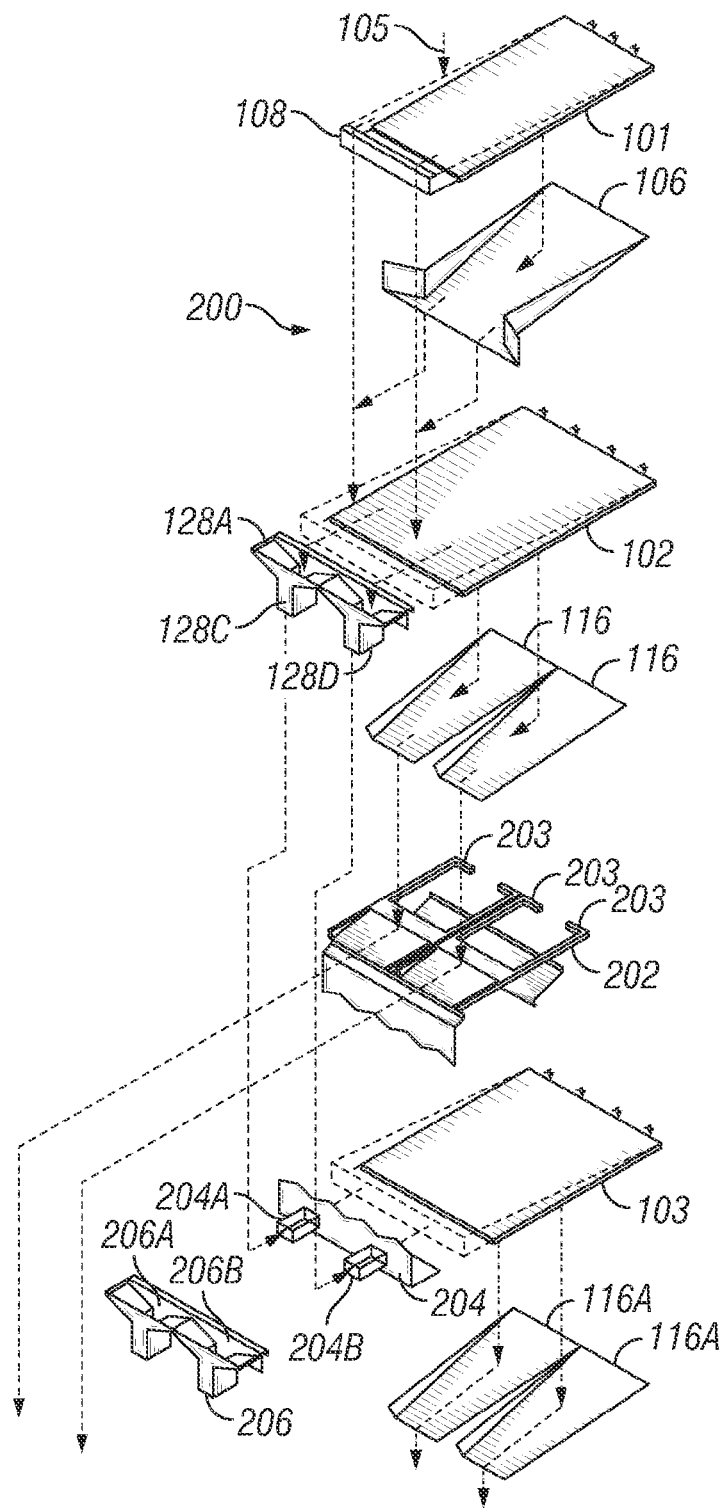
FIG. 5A' is a perspective exploded view of a system according to the present invention.
Figure 5A:
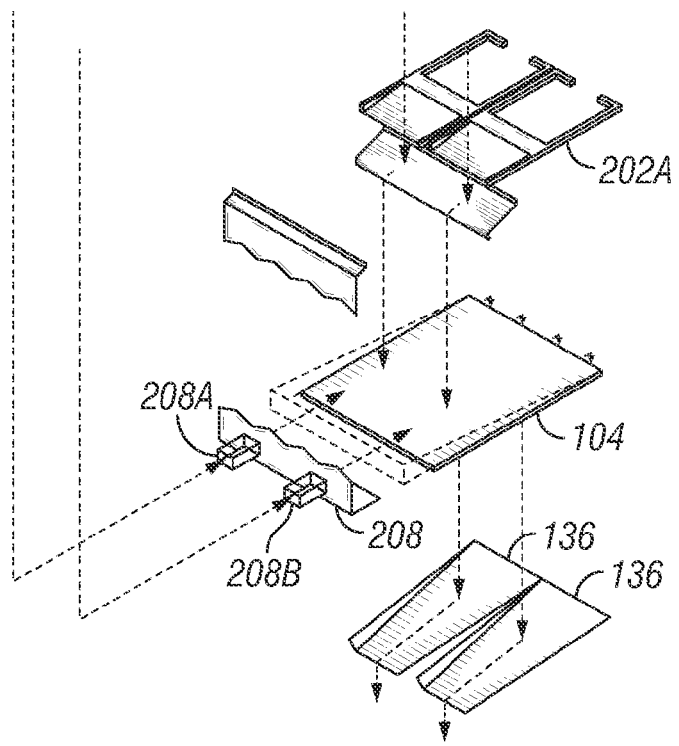
Figure 5B:
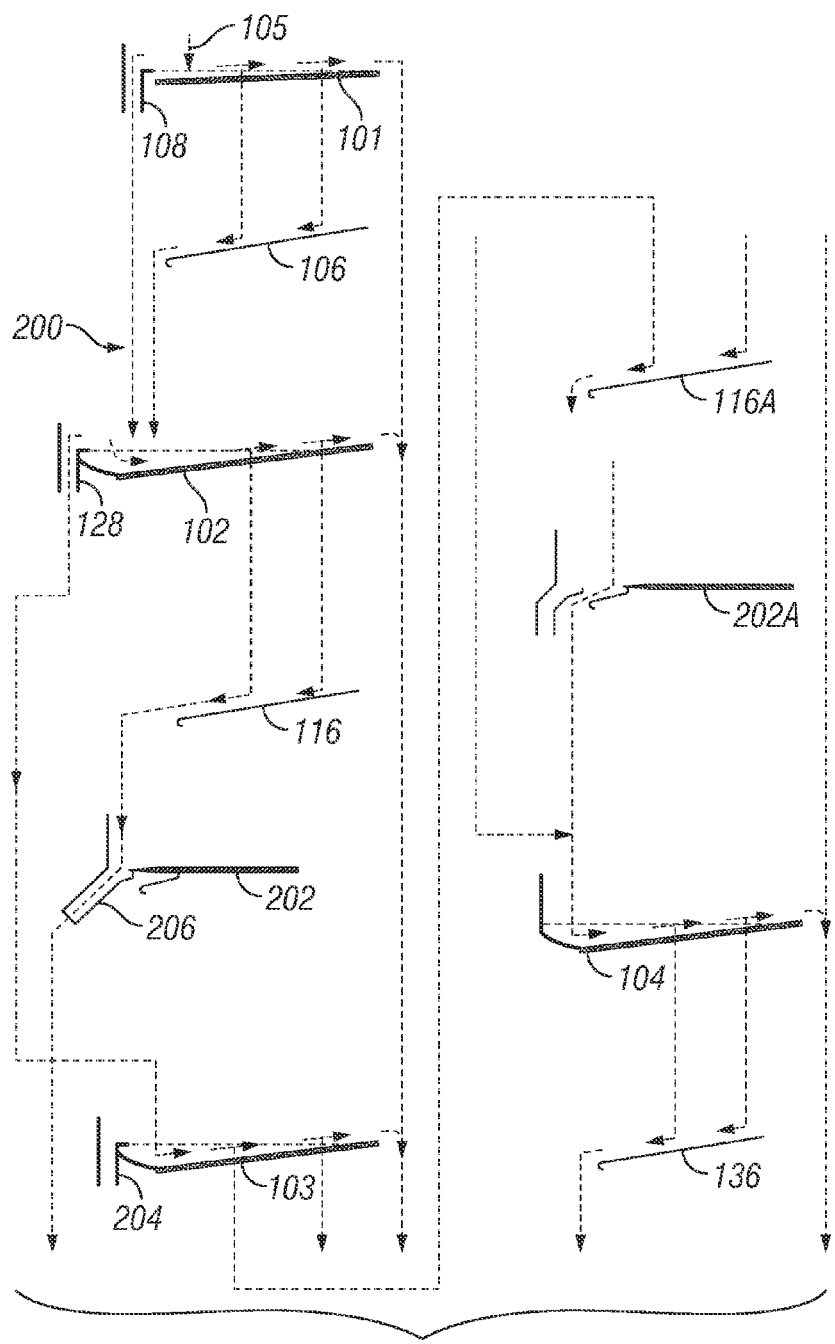
FIG. 5B is a schematic side view of the system of FIG. 5A.

FIGS. 5A', 5A", and 5B illustrate a system 200 according to the present invention which is, in some ways, like the system 100, FIG. 4A. In the system of FIG. 4A underflow from the deck 102 flows to both the deck 103 and the deck 104. In the system 200 flow from the deck 101 flows to both the deck 102 and the deck 103, with underflow from both of these decks flowing to the deck 104.

Drilling fluid with some solids (underflow from the deck 101) flows from the deck 101 down to the deck 102. Overflow from the deck 102 flows via the channel apparatus 128a and channel apparatus 204 to the deck 103. Underflow from the deck 102 flows to the chutes 116 and is diverted to the deck 104 by a diverter 202 (with handles 203) and via a channel apparatus 206 and a channel apparatus 208 to the deck 104. In one 20 aspect the diverter 202 is connected to the channel apparatus 204 (indicated by the wavy lines on both). Underflow having passed through the deck 103 and chutes 116a (like the chutes 116) is diverted by a diverter 202a (like the diverter 202) to the deck 104. Underflow having passed through the deck 104, flows to the chutes 136 and then to collection, storage, tank, or receptacle.

The various chutes, diverters, and channel apparatuses in the systems 100 and 200 are interchangeable, in one aspect, so that series or parallel flow to and from one or more selected decks is facilitated. In certain aspects, the chutes, diverters and channel apparatuses are made of metal, plastic, or composite material.

In the system 100, FIG. 4A, the channel apparatus 128 has three flow passages 128a, 128b, 128c. The diverter 126 has two flow passages 126a, 126b. The channel apparatus 138 has flow passages 138a, 138b, 138c. In the system 200, FIG. 5A, the channel apparatus 128a has flow channels 128c, 128d. The channel apparatus 204 has 10 flow passage 204a, 204b. The channel apparatus 206 has flow passages 206a, 206b. The channel apparatus 208 has flow passages 208a, 208b. The present invention, therefore, provides in at least certain embodiments, a system for processing a mixture of drilling fluid and solid material to separate at least one component of the mixture by size from the mixture, the system including a vibratable basket; a sump at a bottom of the basket; a plurality of spaced-apart screens including a first screen deck, a second screen deck positioned below the first screen, a third screen deck positioned below the second screen deck, and a fourth screen deck positioned below the third screen; the screens mounted in the vibratable basket and vibratable therewith; the first screen deck having screen mesh of a first size to remove from a top of the first screen deck solids from the mixture with a largest dimension equal to and larger than a first dimension so that material with a largest dimension smaller than the first dimension is passable down through the first screen deck; the second screen deck having screen mesh of a second size to remove from a top of the second screen solids from the mixture passing to the second screen deck from the first screen deck which have a largest dimension equal to or larger than the second size so that material with a largest dimension smaller than the second size is passable down through the second screen deck, material and fluid passing through the second screen deck comprising a secondary flow; diversion apparatus connected to the basket positioned for providing at least a portion of the secondary flow to the third screen deck and, selectively, a portion of the secondary flow to the fourth screen deck; the third screen deck having screen mesh of a third size, and the fourth screen deck having screen mesh of a fourth size for removing solids from the secondary flow on the top of the third screen deck and from the top of the fourth screen deck; and drilling fluid flowing through the first screen deck, the second screen deck and one of the third screen deck and fourth screen deck flowing down into the sump. Such a system may have one or some, in any possible combination, of the features and aspects described above for any system according to the present invention. The present invention, therefore, provides in at least certain embodiments, a system for processing a mixture of drilling fluid and solid material to separate at least one component of the mixture by size from the mixture, the system including: a vibratable basket; a sump at a bottom of the basket; a plurality of spaced-apart screens including a first screen deck, a second screen deck positioned below the first screen, a third screen deck positioned below the second screen deck, and a fourth screen deck positioned below the third screen; the screens mounted in the vibratable basket and vibratable therewith; the first screen deck having screen mesh of a first size to remove from a top of the first screen solids from the mixture with a largest dimension equal to and larger than a first dimension so that material with a largest dimension smaller than the first dimension is passable down through the first screen deck; the second screen deck having screen mesh of a second size to remove from a top of the second screen solids from the mixture passing to the second screen deck from the first screen deck which have a largest dimension equal to or larger than the second size so that material with a largest dimension smaller than the second size is passable down through the second screen deck, material and fluid passing through the second screen deck comprising a secondary flow; diversion apparatus connected to the basket positioned for providing at least a portion of the secondary flow to the third screen deck and, selectively, a portion of the secondary flow to the fourth screen deck; the third screen deck having screen mesh of a third size, and the fourth screen deck having screen mesh of a fourth size for removing solids from the secondary flow on the top of the third screen deck and from the top of the fourth screen deck; drilling fluid flowing through the first screen deck, the second screen deck and one of the third screen deck and fourth screen deck flowing down into the sump; wherein the first screen deck is a scalping deck; wherein the screen mesh of a second size is suitable for removing solids the size of lost circulation material, said solids including pieces of lost circulation material and pieces of material other than lost circulation material; the drilling fluid mixture introduced to the system to be treated by the system includes a first amount of lost circulation material; the second deck is able to remove a second amount of lost circulation material; the second amount at least 75% of the first amount; and reclamation apparatus for receiving the lost circulation material.

The present invention, therefore, provides in at least certain embodiments, a method for treating a mixture of drilling fluid and solid material to separate at least one component of the mixture by size from the mixture, the method including: feeding the mixture to a vibratable basket of a system, the system as any described herein according to the present invention, and the method further including flowing drilling fluid through a first screen deck, a second screen deck and one of a third screen deck and a fourth screen deck of the system down into a sump; or flowing drilling fluid through a first screen deck, and one of a second screen deck and a third screen deck flowing down into a sump.

FIGS. 6A-6D show a shale shaker 310 according to the present invention which has a basket 312 vibrated by vibratory apparatus 314 and a lower sump 316 which receives fluid (or fluid and some solids) that passes through three screens 318a, 318b, 318c which are mounted to the basket 312 at different levels. Fluid from the screen 318a flows down to a flow-back barrier 317a, through an opening 328, and then onto the screen 318b. As this fluid builds up into a pool 315a on the screen 318b, it rises to a level equal to and then greater than a top 313a of a weir 313.

Fluid then flows over the top 313a of the weir 313 through a channel 311 to the lower screen 318c. The opening 328 is defined by the weir 313 and an end of the flow-back barrier 317a. Fluid that flows through the screen 318b flows down a flow-back barrier 317b, over an end of a diverter 320, and down to the sump 316 via a channel 316a. The diverter 320 is selectively movable in holding structure 320a and, as in FIG.

6A, blocks an opening 322 of a channel 324 formed by spaced-apart members 325, 326.

Figure 6A:
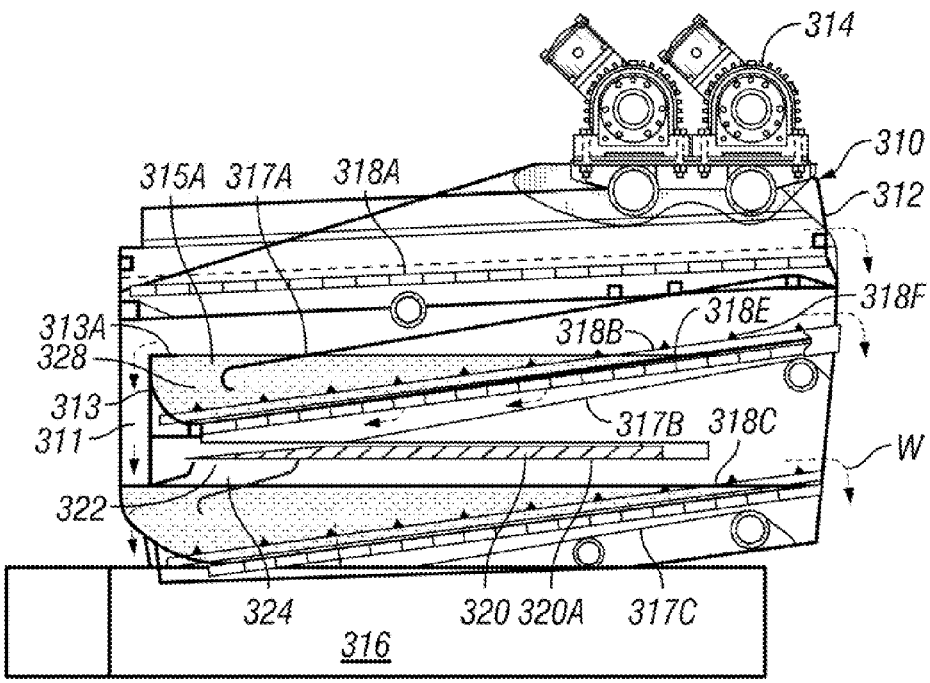
FIG. 6A is a side cross-sectional view of a shale shaker according to the present invention.
Figure 6B:
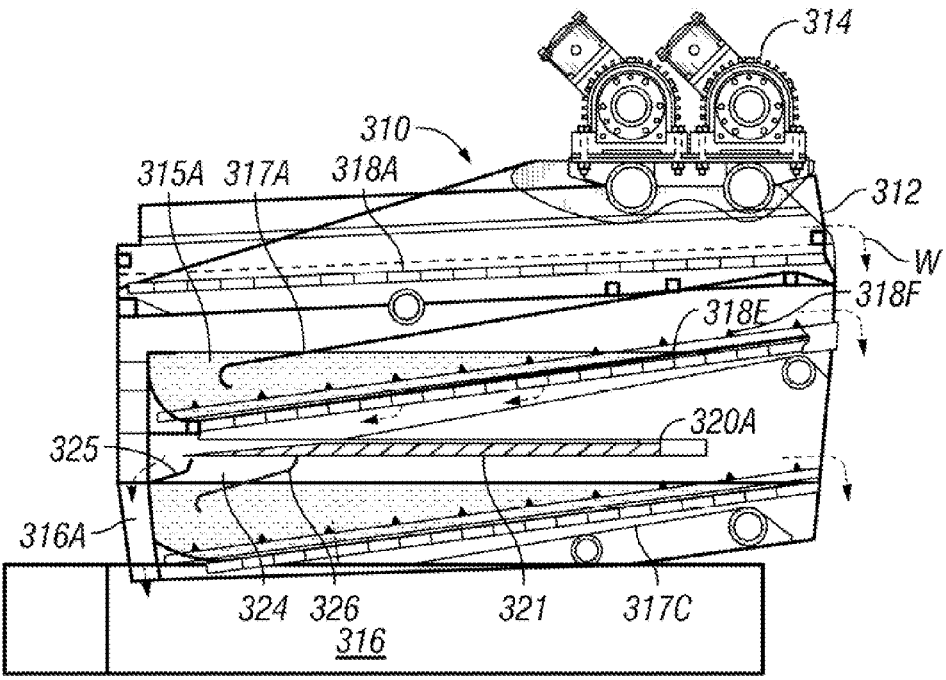
FIG. 6B is a side cross-sectional view of the shale shaker of FIG. 6A.
Figure 6C:
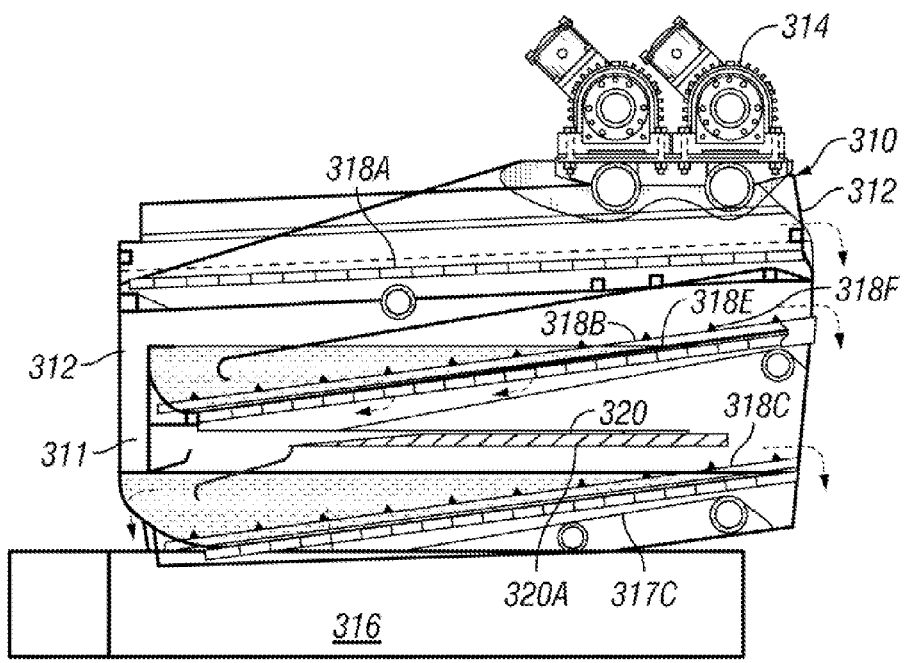
FIG. 6C is a side cross-sectional view of a shale shaker according to the present invention.
Figure 6D:
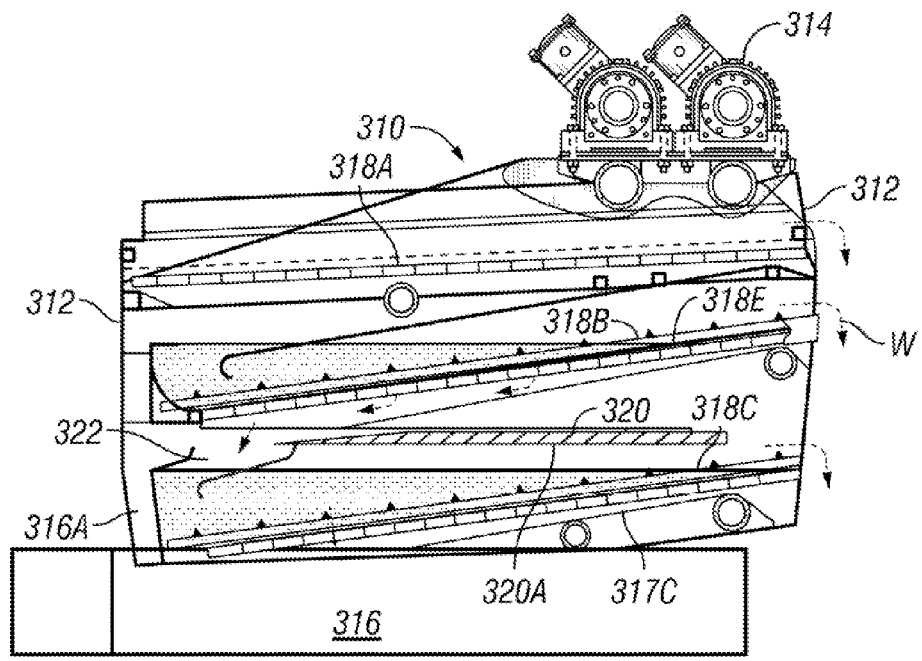
FIG. 6D is a side cross-sectional view of the shale shaker of FIG. 6C.

As shown in FIG. 6B, the diverter 320 prevents fluid that has exited from the bottom of the screen 318b from flowing onto the screen 318c. This fluid flows past the opening 322 into the channel 316a. FIGS. 6A and 6B illustrate a parallel fluid flow path. As shown in FIGS. 6C and 6D, the diverter 320 has been moved so that fluid is flowable down onto the screen 318c which has exited through the bottom of the screen 318b. This is an "in series" flow path—from the screen 318a to the screen 318b to the screen 318c—for fluid down to the sump 316.

Figure 6E:
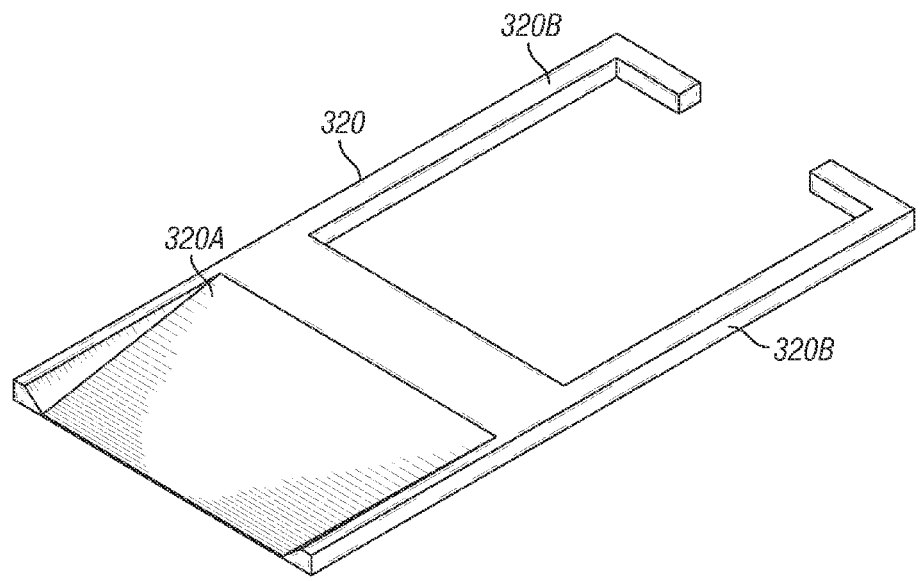
FIG. 6E is a perspective view of a diverter according to the present invention.
Figure 6G:
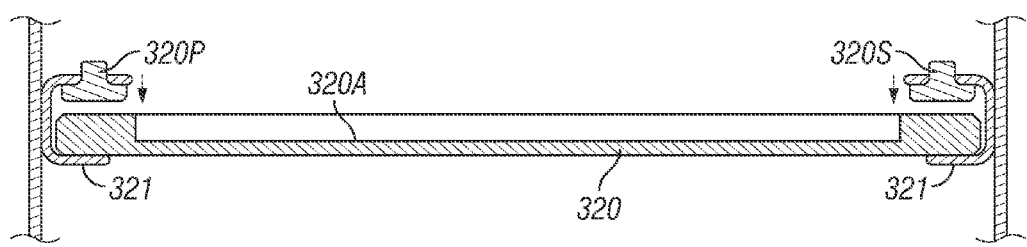
FIG. 6G is a cross-section view of the diverter of FIG. 6E in the shaker of FIG. 6A.
Figure 6F:
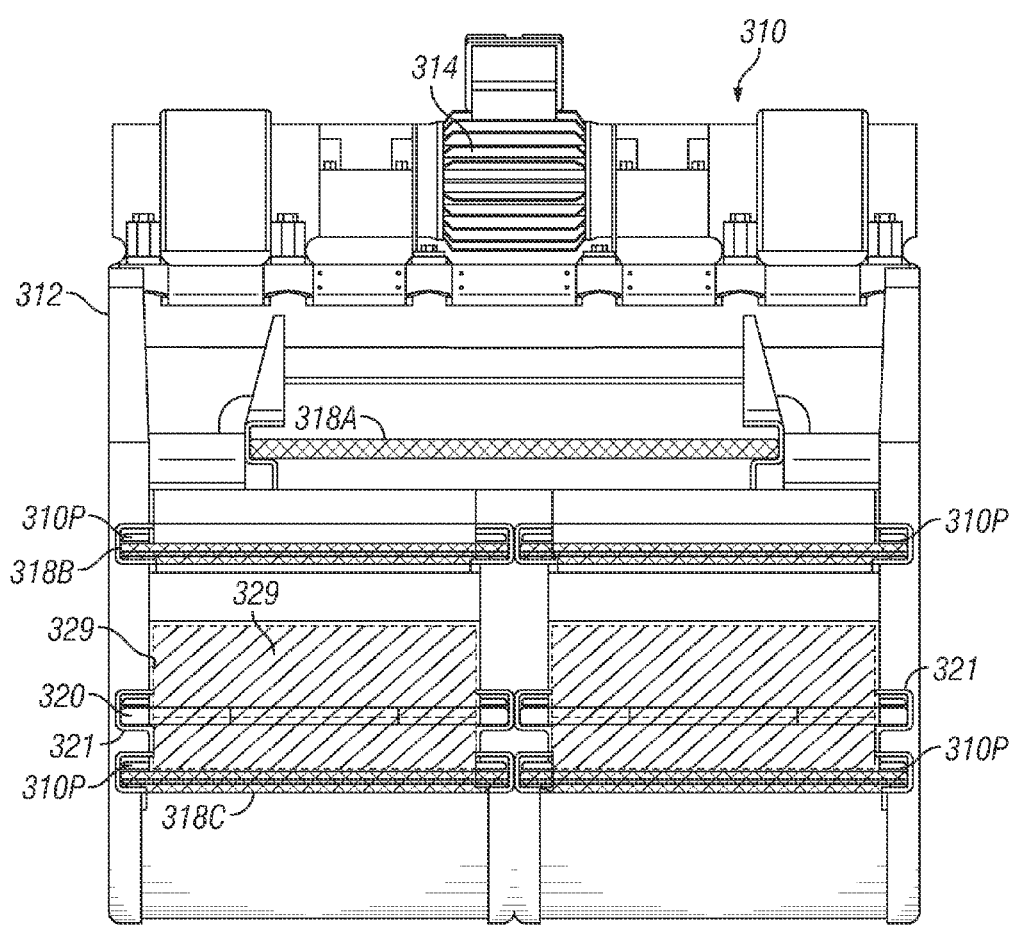
FIG. 6F is a front view of the shaker of FIG. 6A.

The diverter 320 can be manipulated and moved through an open end access area 329 (FIG. 6F) of the basket 312. As shown in FIG. 6E, the diverter 320 has a solid chute portion 320a for facilitating fluid flow and two handles 320b projecting from the chute portion 320a.

The angle from the horizontal of the screen 318b coupled with the height of the weir 313 determines the depth of the pool 315a and of a lower edge 318e of a beach area 318f on the screen 318b (e.g., see FIG. 6C).

Fluid flowing through the screen 318c flows down a flowback barrier 317c into the sump 316. Solids (wet to some degree) flow off the ends of the screens as indicated by the arrows W. The diverter 320 is mounted between rails 321 of the holding structure 320a (see, e.g. FIG. 6G) and clamping apparatuses 320p, 320s are used to hold the diverter 320 in place. Any suitable clamping apparatus may be used including, without limitation, pneumoseal apparatuses. Clamping apparatuses 310p hold the screens in place.

Figure 7A:
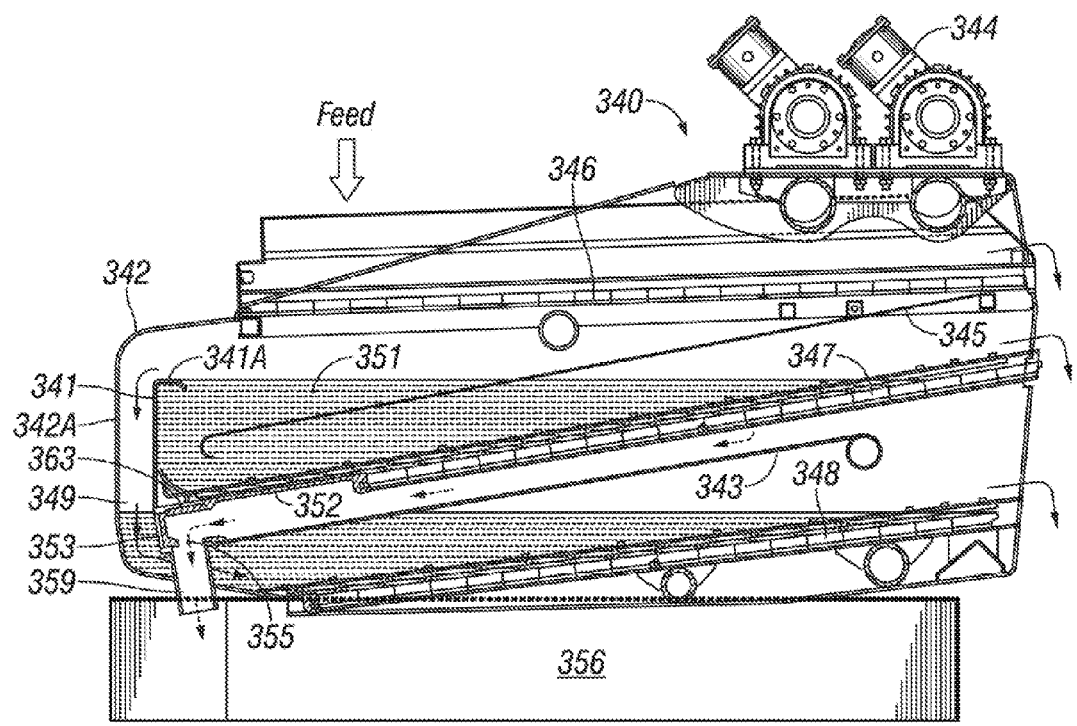
FIG. 7A is a side cross-sectional view of a shale shaker according to the present invention.
Figure 7B:
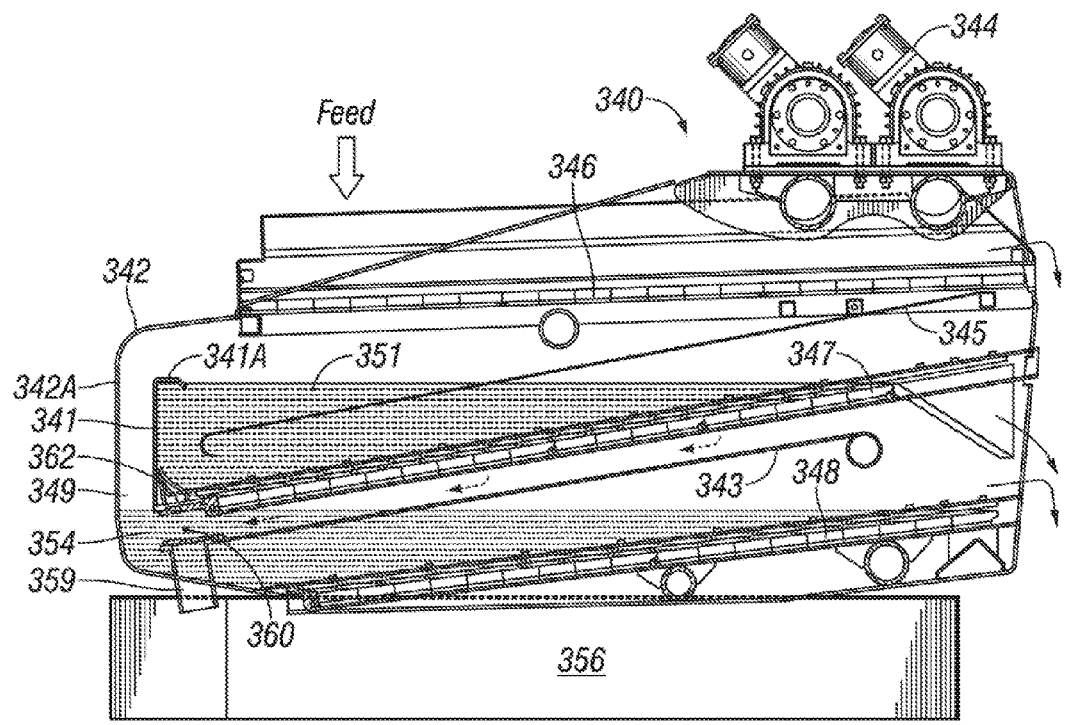
FIG. 7B is a side cross-sectional view of a shale shaker according to the present invention.

FIGS. 7A and 7B show a shale shaker 340, according to the present invention, with a basket 342 vibrated by vibratory apparatus 344. Screens 346, 347, 348 are mounted in the basket with a flow-back barrier 345 beneath the screen 346 and flow-back barrier 343 beneath the screen 347. A weir 341 with a top end 341a defines (with an end 342a of the basket 342) a flow channel 349 for fluid flowing over the top 341a of the weir 341 from a pool 351 of fluid on the screen 347. Fluid flowing down in the channel 349 flows to the lowermost screen 348. Fluid flowing through the screen 348 flows into a sump 356. The screen 347 has flow barrier 352 (see FIG. 7C) connected therebelow with an end 353 which, in the position shown in FIG. 7A, blocks an opening 354 (see, FIG. 7B) so that fluid flowing in the channel 349 cannot flow into a channel 359. Also, with the opening 354 blocked, fluid flowing down through the screen 347 flows along the flowback barrier 343 to the opening 354, into the channel 359, and then into the sump 356. Thus the flow mode for the screens 347 and 348 as shown in FIG. 7A is parallel—fluid flowing through the screen 347 does not flow to the screen 348.

As shown in FIG. 7B, the screen 347 does not have the flow barrier 352 below it and the channel 359 is closed to fluid flow by a flow barrier 362. With the channel 359 closed by the flow barrier 362 and with the end 353 removed from the opening 354, fluid flowing through the screen 347 flows onto the screen 348 and thus the flow mode, as shown in FIG. 7B, is in series for the screens 347, 348.

Figure 7C:
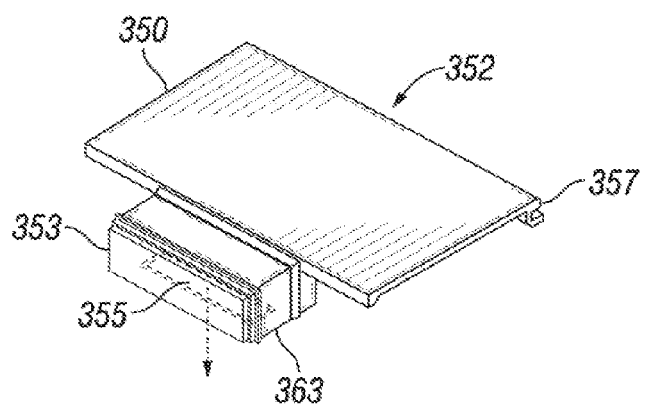
FIG. 7C is a perspective view of a flow barrier according to the present invention.
Figure 7D:
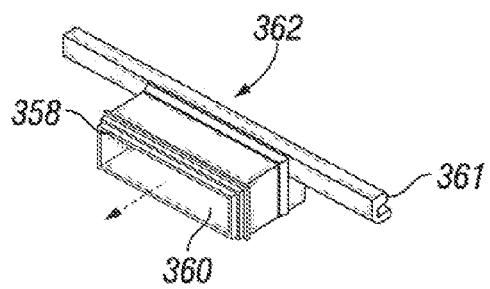
FIG. 7D is a perspective view of a flow barrier according to the present invention.

As shown in FIG. 7C, for parallel flow, the flow barrier 352 has a body 363 with a flow channel 355 therethrough; a solid portion 350; and an end connection 357 for connection to the screen 347. As shown in FIG. 7D the flow barrier 362 has a body 358 with a flow channel 360 therethrough and a connection 361 for connection to the screen 347. FIG. 7D illustrates the flow path for series flow.

Figure 8C:
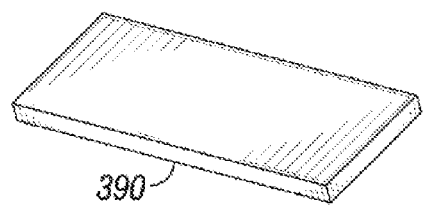
FIG. 8C is a perspective view of an insert according to the present invention.

FIGS. 8A and 8B show a shale shaker 370 according to the present invention with a basket 372 vibrated by vibratory apparatus 374. Screens 376, 377, 378 are mounted in the basket with a flow-back barrier 375 beneath the screen 376 and flow-back barrier 373 beneath the screen 377.

A weir 371 with a top end 371a defines (with an end 372a of the basket 372) a flow channel 379 for fluid flowing over the top 371a of the weir 371 from a pool 381 of fluid on the screen 377. Fluid flowing down (FIG. 8A) in the channel 379 flows to the lowermost screen 378. Fluid flowing through the screen 378 flows along a flowback barrier 394 into a sump 386.

Figure 8D:
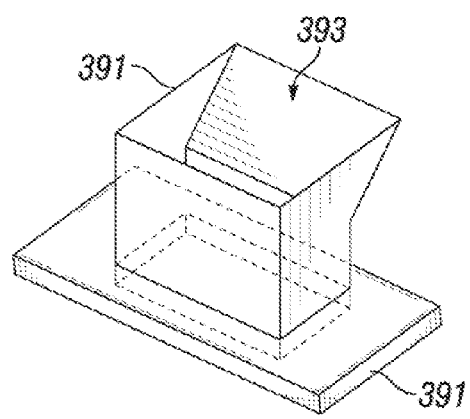
FIG. 8D is a perspective view of a channel apparatus according to the present invention.

The screen 377 has an insert 390 at an end 377a which is in the position shown in FIG. 8A. Fluid flowing through the screen 377 flows into a flow channel 393 of a channel apparatus 391 (see FIG. 8D) positioned in an opening 397 at an end 378a of the screen 378 and then into the sump 386. Pneumoseal apparatus 389p, 389s facilitates the clamping in place of the screens and inserts, and the maintenance of the screens and inserts in a desired position.

Fluid from the pool 381 flowing over the top 371a of the weir 371 flows in the channel 379 down to the screen 378. Fluid flowing through the screen 378 flows into the sump 386. Thus the flow from the screen 376 to and through the screens 377, 378 is in a 10 parallel flow mode.

Figure 8E:
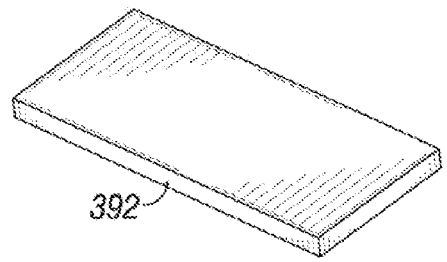
FIG. 8E is a perspective view of an insert according to the present invention.

As shown in FIG. 8B, the insert 390 and the channel apparatus 391 have been removed, and the screen 377 has been moved down so that the end 377a now occupies the position of the insert 390. Fluid flowing through the screen 376 flows down to the screen 377. Then fluid flowing through the screen 377 flows down to the screen 378 through an opening 374. An insert 392, FIG. 8E, replaces the channel apparatus 391 at the lower end 378a of the screen 378 and blocks flow through the opening 397 (see FIG. 8A).

FIGS. 9A-9D show a shaker 400 with a sump 416 and basket 402 vibrated by vibratory apparatus 404. Screens 411, 412, and 413 are mounted in the basket 402. A flowback barrier 401 is below the screen 411, a flowback barrier 414 is below the screen 412, and a flowback barrier 415 is below the screen 413. A weir 405 having a top end 405a with an end portion 402a of the basket 402 defines a channel 409 through which flows fluid coming over the top end 405a of the weir 405 from a pool 406 of fluid on the screen 412. Fluid flows down and out of the channel 409 to contact and flow through an insert 417 positioned at an end 412a of the screen 412. Fluid flows through a passageway 418 in the insert 417 (see FIGS. 9E-9F) to a channel 419 and down to the screen 413. Thus fluid flows from the screen 411 to both the screens 412 and 413 in a parallel flow mode. Fluid flowing through the screen 412 flows to and through channels 417a, 417b in the insert 417, from there into a channel 410, and down to the sump 416.

Figure 9A:
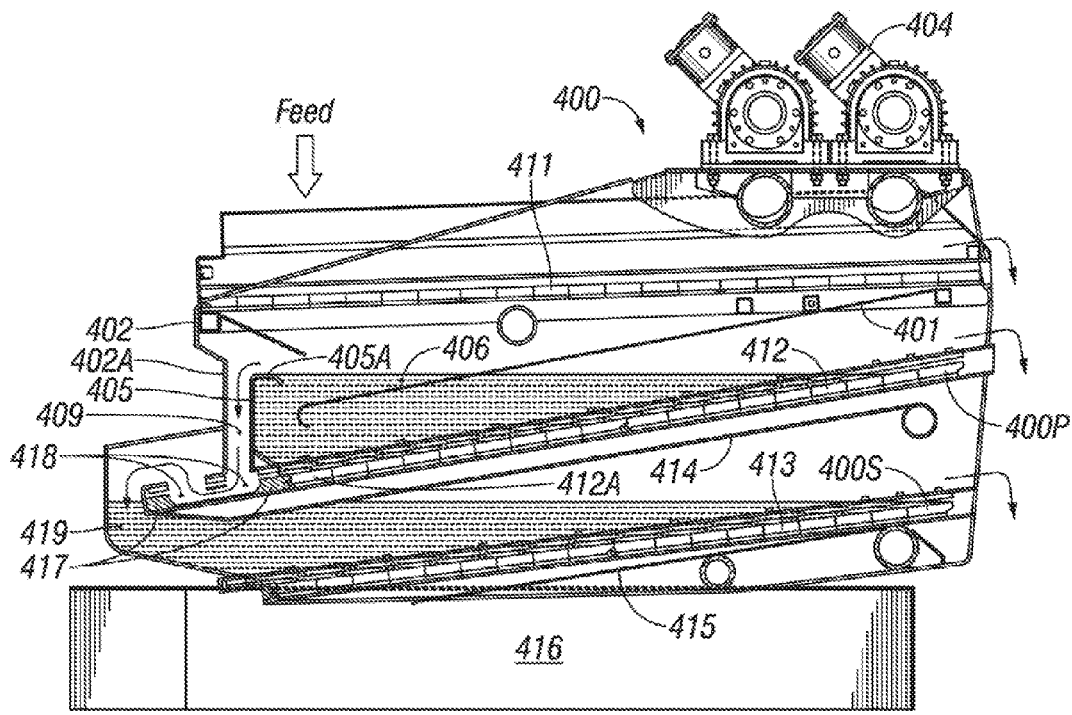
FIG. 9A is a side cross-sectional view of a shale shaker according to the present invention.
Figure 9B:
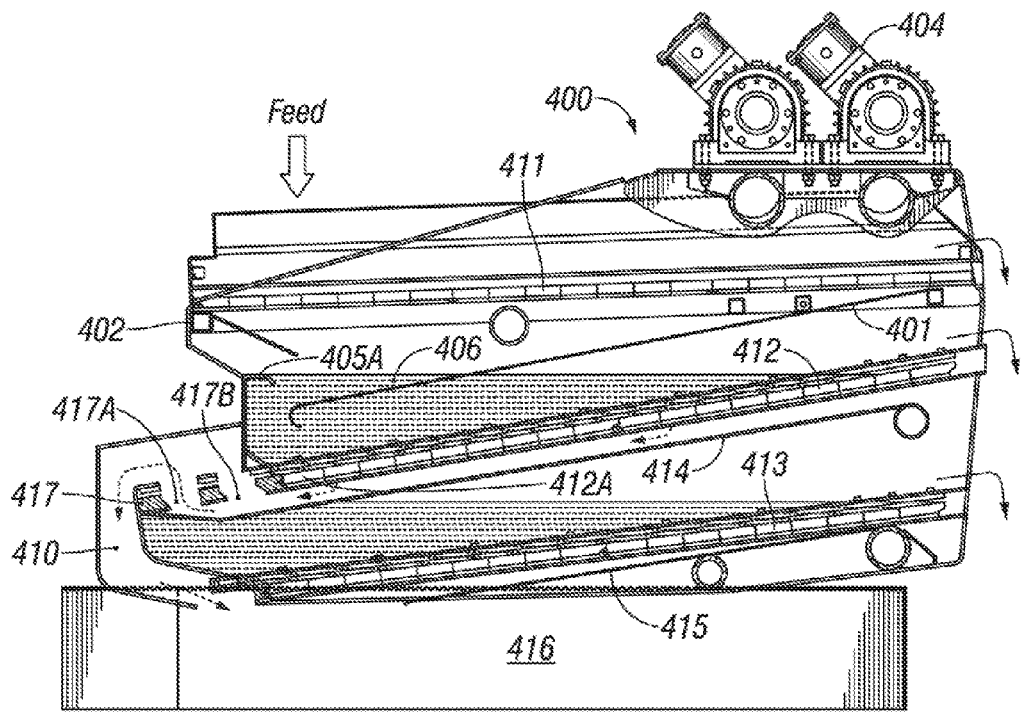
FIG. 9B is a side cross-sectional view of the shale shaker of FIG. 9A.
Figure 9C:
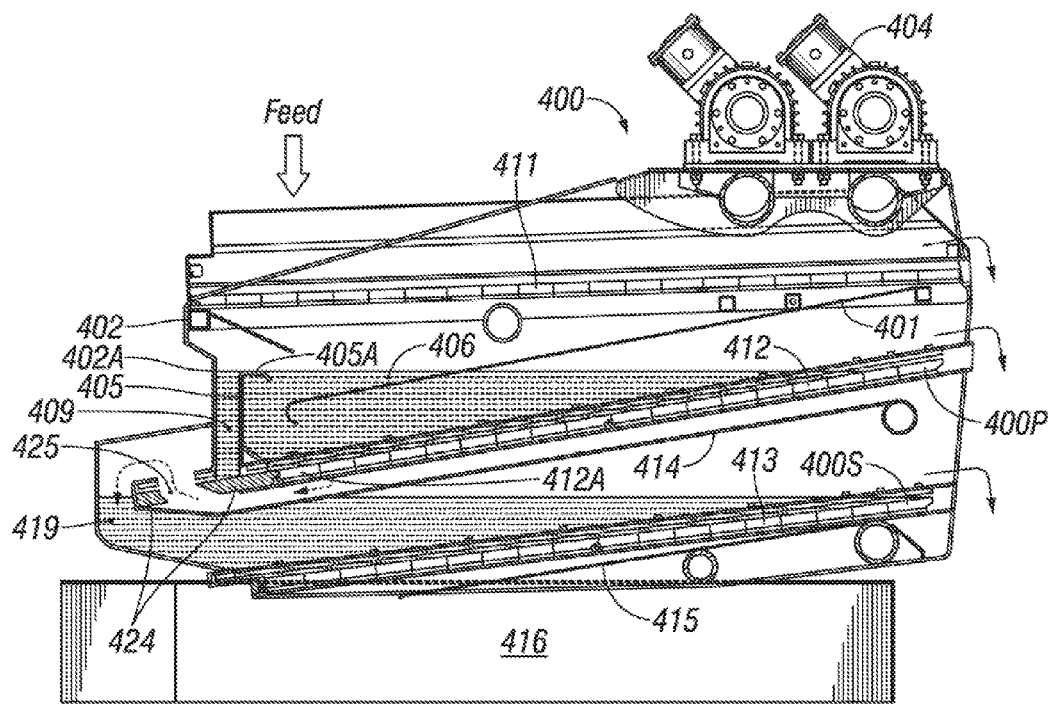
FIG. 9C is a side cross-sectional view of a shale shaker according to the present invention.
Figure 9D:
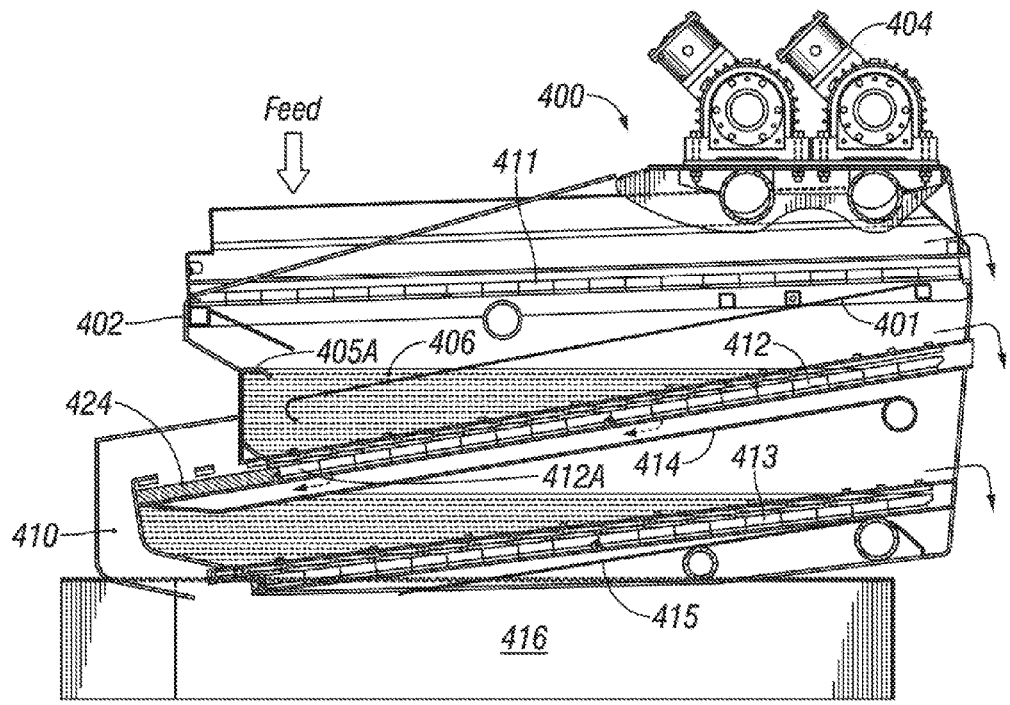
FIG. 9D is a side cross-sectional view of the shale shaker of FIG. 9C.
Figure 9E:
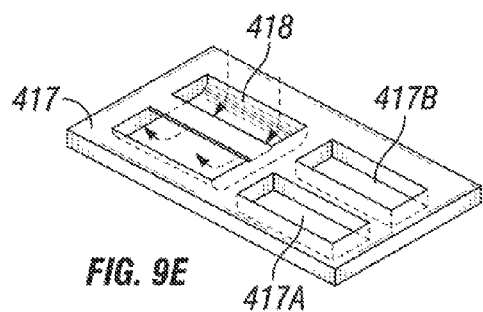
FIG. 9E is a perspective view of an insert according to the present invention.
Figure 9F:
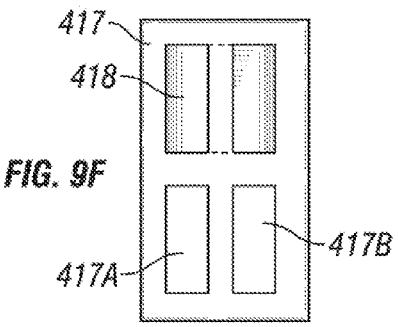
FIG. 9F is a top view of the insert of FIG. 9E.
Figure 9G:
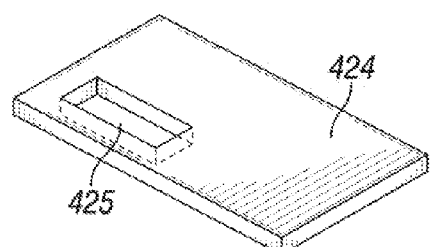
FIG. 9G is a is a perspective view of another insert according to the present invention.
Figure 9H:
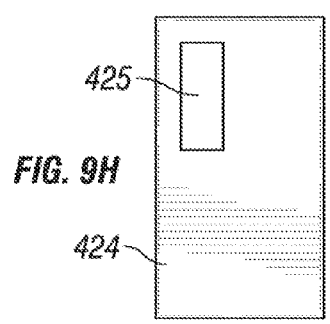
FIG. 9H is a is a top view of the insert of FIG. 9G.

FIGS. 9C and 9D show the shaker 400 in a series flow mode. As shown in FIGS. 9C and 9D, an insert 424 (see FIGS. 9G and 9H) is positioned at the end 412a of the screen 412, replacing the insert 417. Insert 424 blocks the flow of any fluid that may overflow the top end 405a of the weir 405 and enter the channel 409. Fluid flowing from the screen 412 flows down the flowback barrier 414 therebelow, passes through a channel 425 in the insert 424 and then down, via the channel 419 onto the screen 413. As in FIGS. 9A and 9B, pneumoseal apparatuses 400p, 400s hold screens and inserts in place.

Figure 10A:
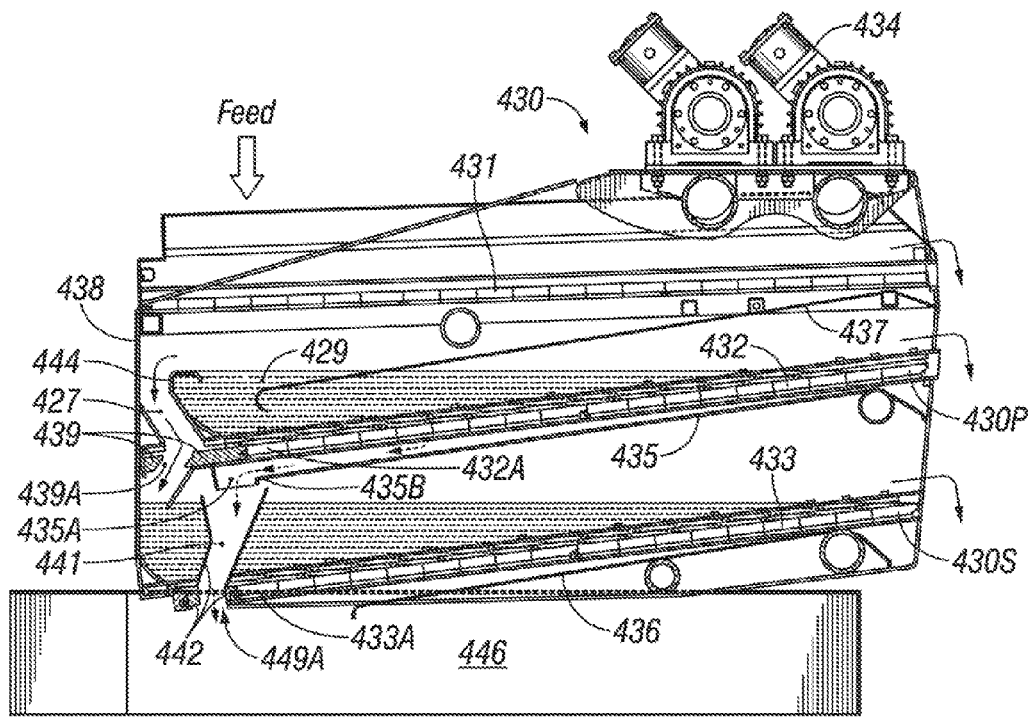
FIG. 10A is a side cross-sectional view of a shale shaker according to the present invention.
Figure 10B:
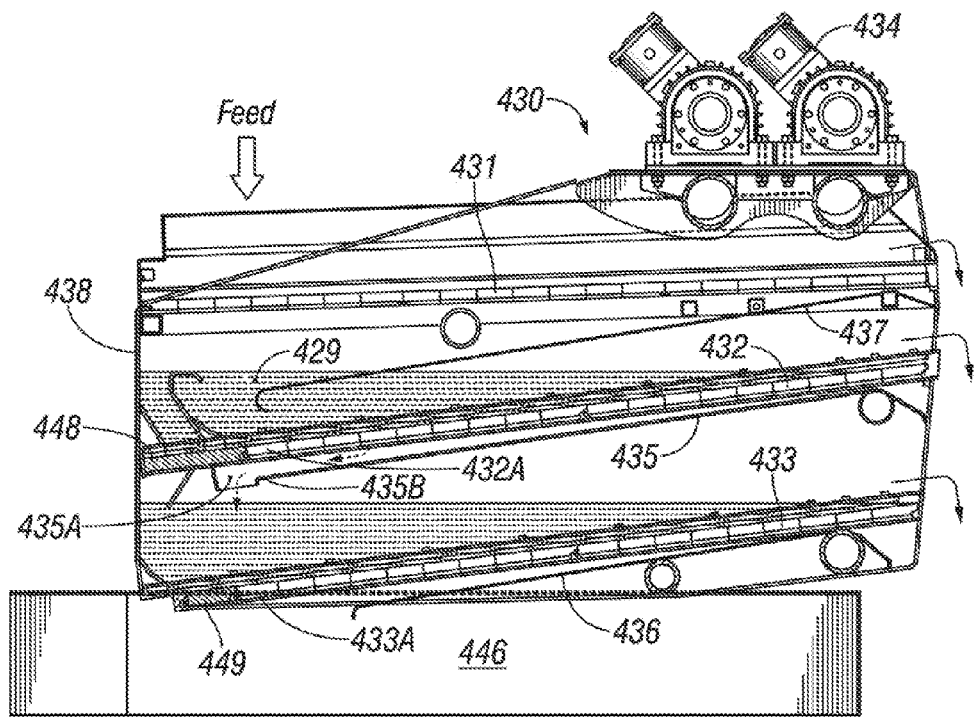
FIG. 10B is a side cross-sectional view of a shale shaker according to the present invention.

FIGS. 10A and 10B show a shale shaker 430, in parallel flow mode in FIG. 10A and in series flow mode in FIG. 10B. The shale shaker 430 has a basket 438 vibrated by a vibratory apparatus 434. A flowback barrier 437 is below a screen 431; a flowback barrier 435 is below a screen 432; and a flowback barrier 436 is below a screen 433. The flowback barrier 435 has a channel 435a in an end 435b. Pneumoseal apparatuses

Figure 10C:
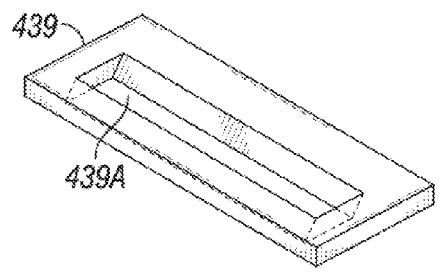
FIG. 10C is a perspective view of an insert according to the present invention.
Figure 10D:
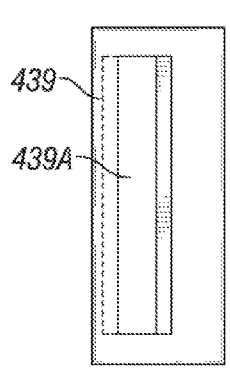
FIG. 10D is a top view of the insert of FIG. 10C.
Figure 10E:
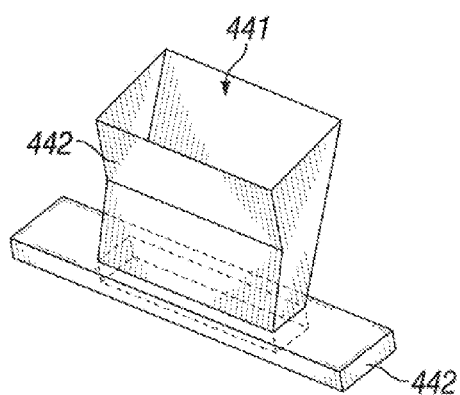
FIG. 10E is a perspective view of a channel apparatus according to the present invention.

430p, 430s hold screens and inserts in place. Fluid flowing through the screen 431 flows to both the screen 432 and to the screen 433 from a pool 429 on the screen 432, over a weir 444, through a channel 427, and through an opening 439a in an insert 439 (see FIGS. 10C, 10D) positioned at an end 432a of the screen 432. Fluid flowing through the screen 432 flows to a channel 441 of a channel apparatus 442 (see FIG. 10E) positioned at an end 433a of the screen 433 and then to a sump 446. Fluid flowing through the screen 433 flows down to the sump 446.

Figure 10F:
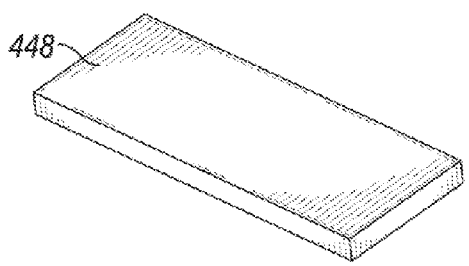
FIG. 10F is a perspective view of an insert according to the present invention.
Figure 10G:
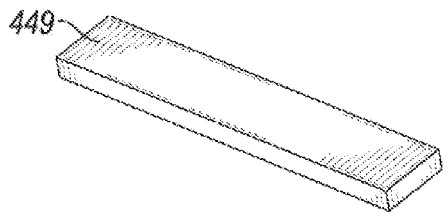
FIG. 10G is a perspective view of an insert according to the present invention.

As shown in FIG. 10B, an insert 448 (see FIG. 10F) is positioned at the end 432a of the screen 432, replacing the insert 439, and blocks flow through the channel 427. Additionally, an insert 449 (see FIG. 10G) is positioned at the end 433a of the screen 433, replacing the channel apparatus 442, and blocks flow through an opening 449a (see FIG. 10A) so that all fluid flowing from the screen 431 flows to the screen 432. Via the opening 435a, all fluid flowing from the screen 432 flows to the screen 433.

Figure 11A:
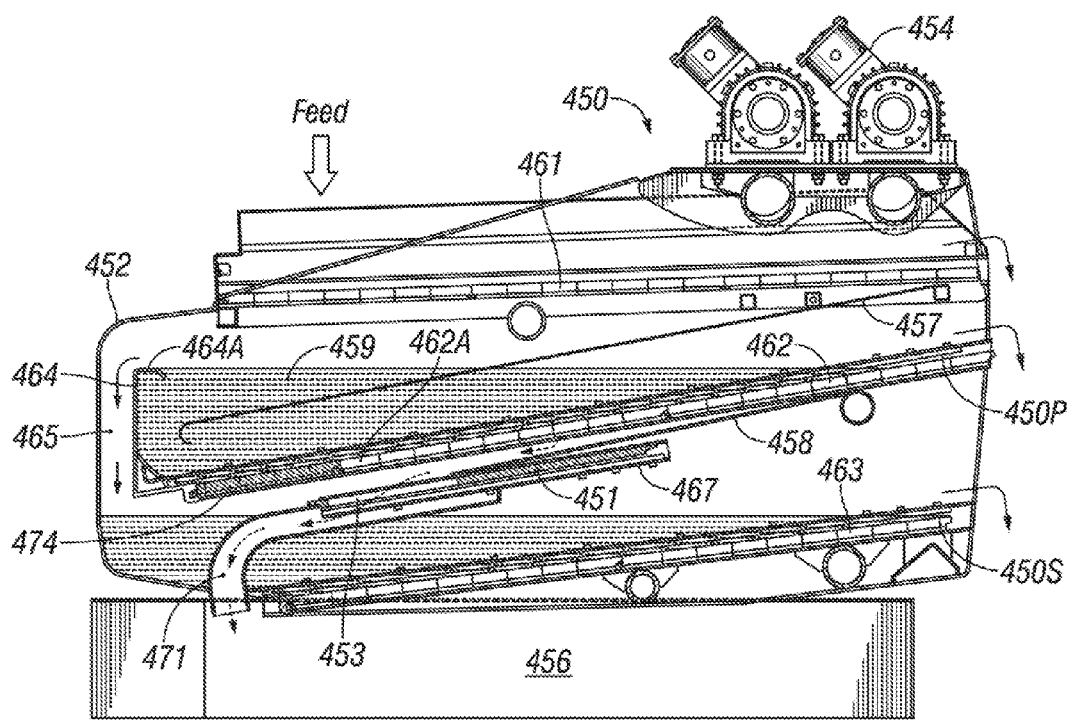
FIG. 11A is a side cross-sectional view of a shale shaker according to the present invention.
Figure 11B:
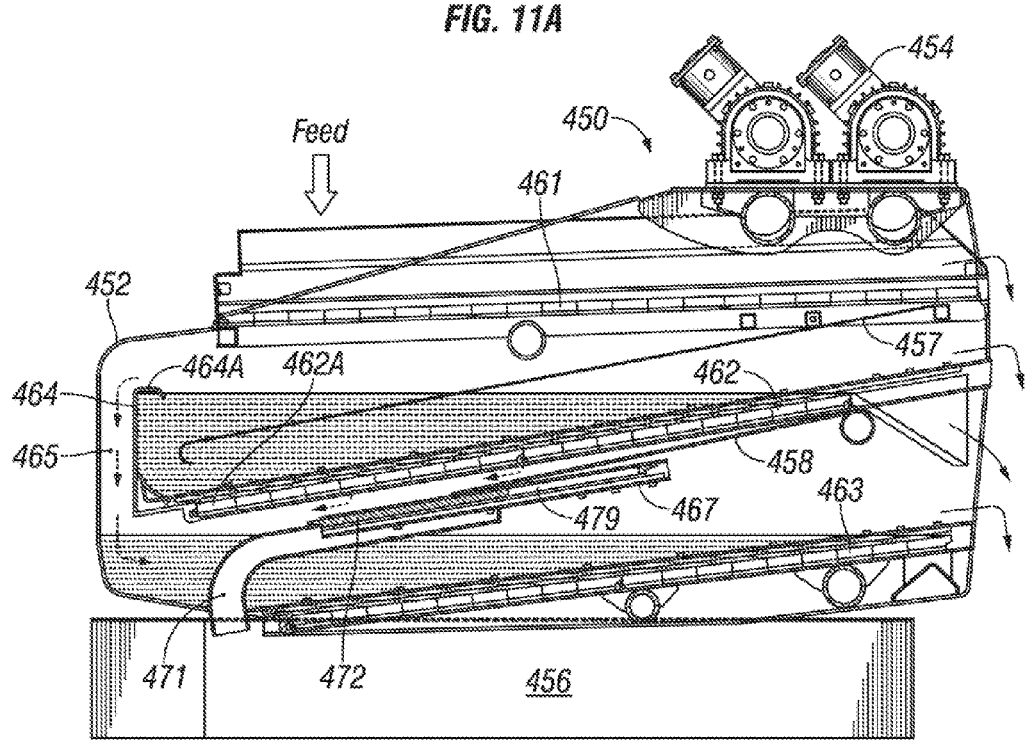
FIG. 11B is a side cross-sectional view of a shale shaker according to the present invention.

FIGS. 11A and 11B show a shale shaker 450 with a basket 452 vibrated by a vibratory apparatus 454. A flowback barrier 457 is beneath a screen 461 and a flowback barrier 458 is beneath a screen 462. Fluid flowing through a screen 463 flows into a sump 456. Pneumoseal apparatuses 450p, 450s hold screens and inserts in place.

Figure 11C:
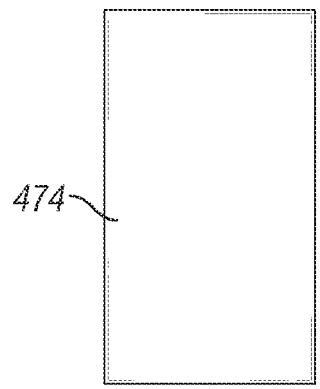
FIG. 11C is a top view of an insert according to the present invention.
Figure 11D:
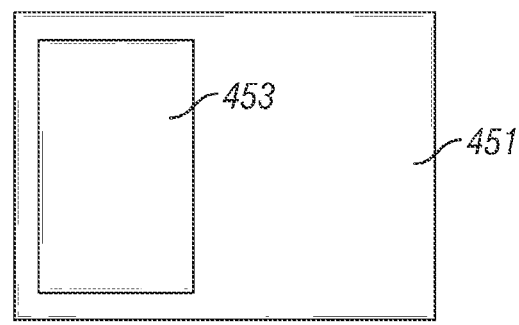
FIG. 11D is a top view of an insert according to the present invention.

Fluid from a pool 459 on the screen 462 overflows a top end 464a of a weir 464, through a channel 465, onto the screen 463 (as shown in FIG. 11A). Fluid flowing through the screen 462 flows through a channel 453 in an insert 451 (see FIG. 11D) and then into the sump 456 (not onto the screen 463). The insert 451 is mounted in a mount 467 and the channel 453 is in fluid communication with a flow channel 471, permitting the fluid flowing through the screen 462 to flow into the channel 471. Thus, the fluid flowing through and then down from the screen 461 flows both to the screen 462 and (over the weir 464) to the screen 463, i.e. in a parallel flow mode. An insert 474 (see FIG. 11C) at the end 462a of the screen 462 holds the screen 462 in such a position that height of the pool 459 makes possible the flow of fluid over the weir 464, so that series or parallel flow can be achieved.

Figure 11E:
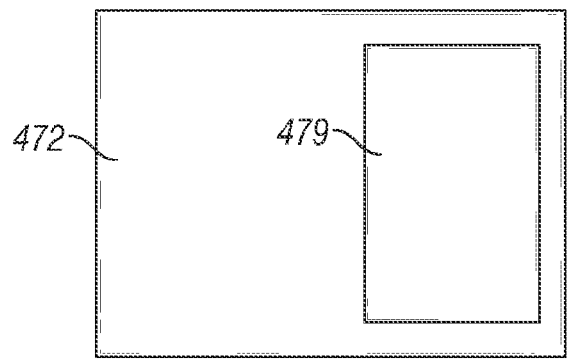
FIG. 11E is a top view of an insert according to the present invention.

FIG. 11B illustrates a series flow mode for the shaker 450. An insert 472 now replaces the insert 451 in the mount 467, and blocks the opening to the channel 471 so that fluid flowing through the screen 462 flows down onto the screen 463 (not directly into the sump 456 through the channel 471). Additionally, the insert 474 has been removed and the screen 462 has been moved down so that the end 462a now occupies the position of the insert 474. Some overflow, if any, from the pond on the screen 462 could flow over the weir 464 down to the screen 463. Optionally a cut-out portion 479 of the insert 472 provides a handle (see FIG. 11E). Furthermore, in other embodiments, the insert 451 may be designed so that when changing the shaker 450 from a parallel flow mode to a series flow mode, the insert 451 may be removed, reversed, and reinstalled so that the channel 453 is no longer positioned above the flow channel 471, and therefore no longer provides fluid communication thereto. Instead, the insert 451 may be designed so as to block the opening to the channel 471, thereby facilitating series flow from the screen 462 to the screen 463, as described above.

Figure 12E:
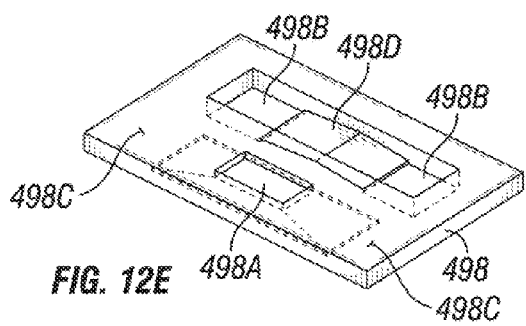
FIG. 12E is a perspective view of an insert according to the present invention.
Figure 12F:
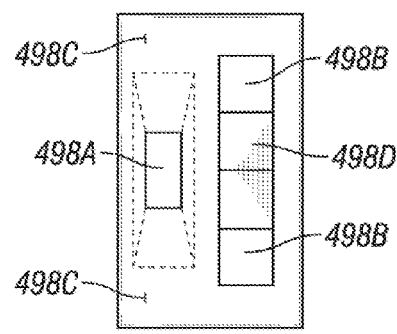
FIG. 12F is a top view of the insert of FIG. 12E.
Figure 12G:
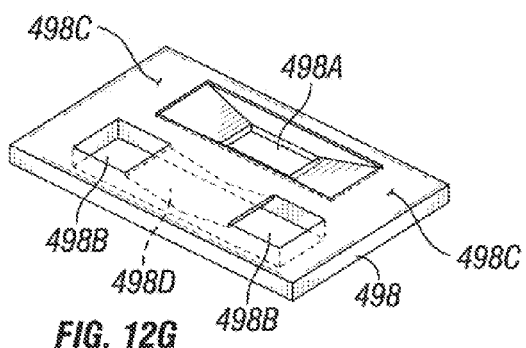
FIG. 12G is another perspective view of the insert of FIG. 12E when viewed from an opposite side of the insert.
Figure 12A:
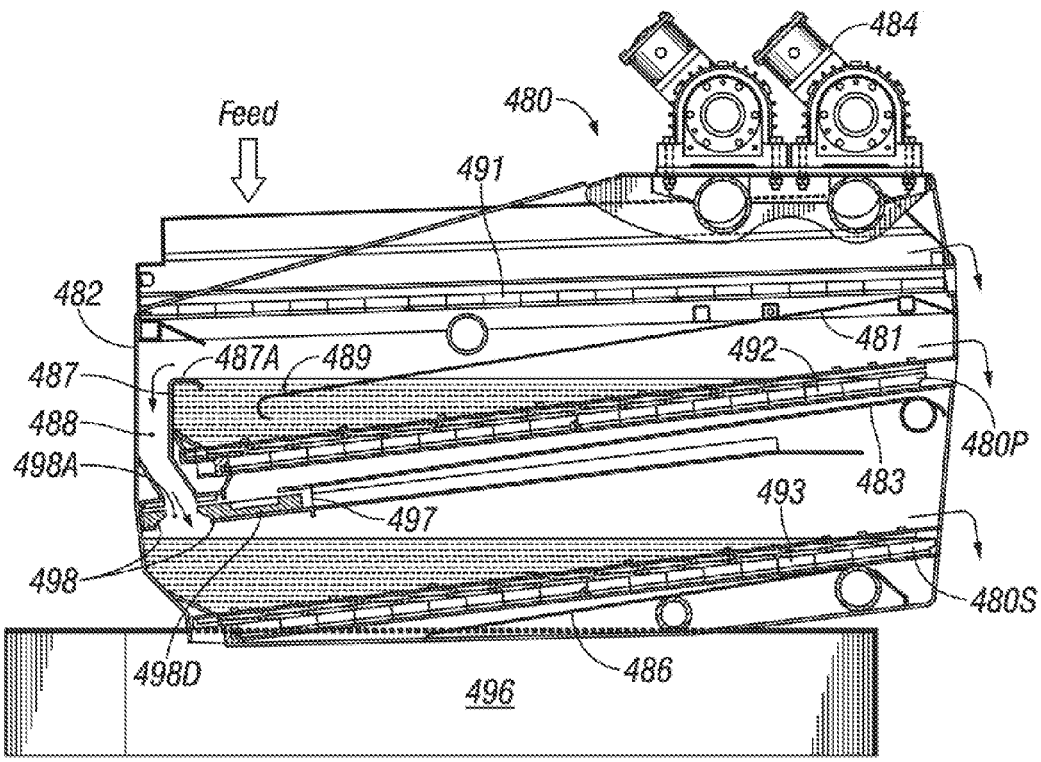
FIG. 12A is a side cross-sectional view of a shale shaker according to the present invention.
Figure 12B:
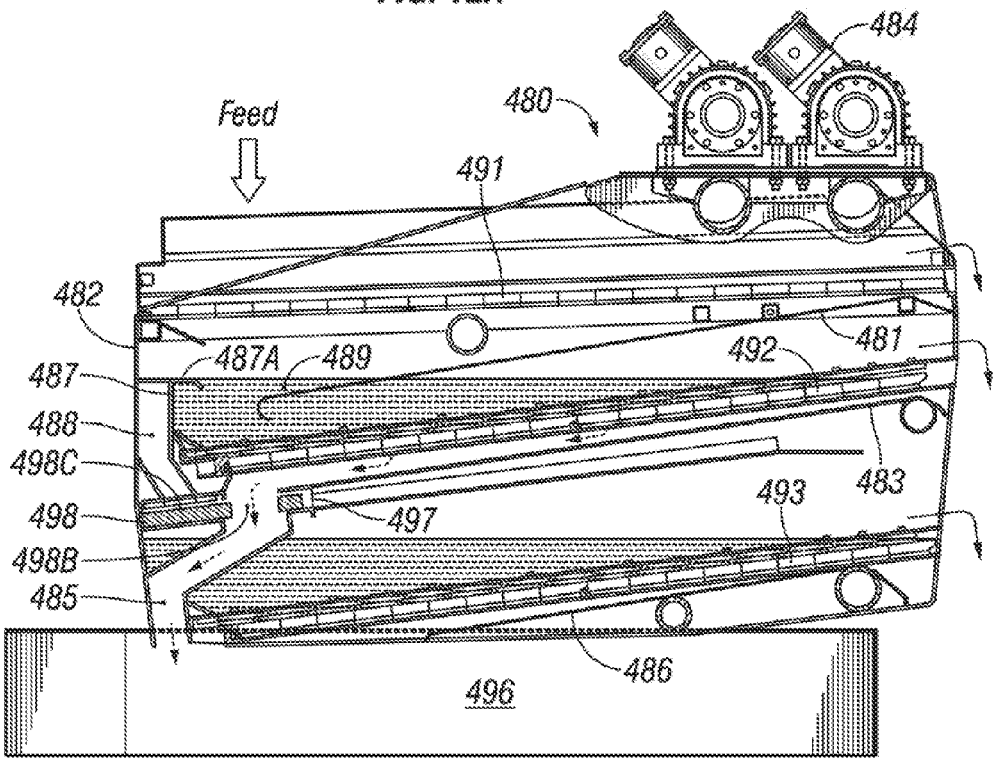
FIG. 12B is a side cross-sectional view of the shale shaker of FIG. 12A.

FIGS. 12A and 12B show the shale shaker 480 with a basket 482 vibrated by vibratory apparatus 484. Fluid flowing through a lowermost screen 493 flows into a sump 496. A flow-back barrier 481 is beneath a top screen 491 and a flow-back barrier 483 is beneath a middle screen 492. A flow-back barrier 486 is beneath the screen 493. Pneumoseal apparatuses 480p, 480s hold screens and inserts in place. In a parallel flow mode as illustrated in FIGS. 12A, 12B, fluid flowing through the screen 491 flows to both the screen 492 and from a pool 489 on the screen 492 over a top end 487a of a weir 487 via a flow channel 488 down to the screen 493. An insert 498 (see FIGS. 12E, 12F) in a mount 497 has an opening 498a through which fluid from the channel 488 flows to the screen 493. At the same time, fluid from the screen 492 is deflected by a plate portion 498d of the insert 498 and flows through openings 498b to a channel 485 and to the sump 496.

Figure 12C:
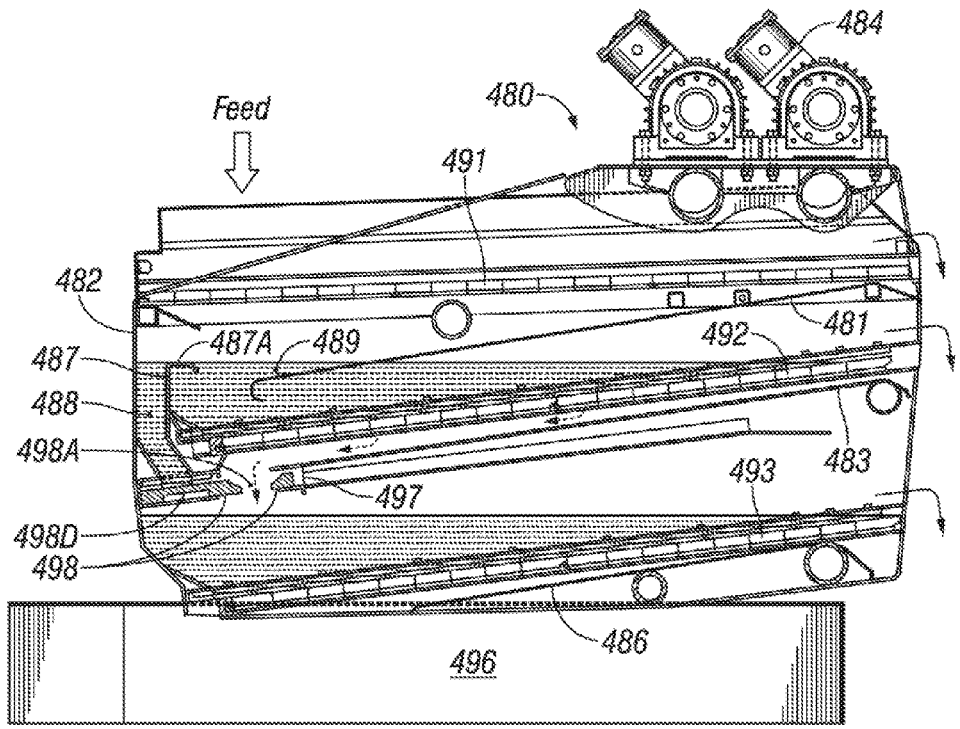
FIG. 12C is a side cross-sectional view of a shale shaker according to the present invention.
Figure 12D:
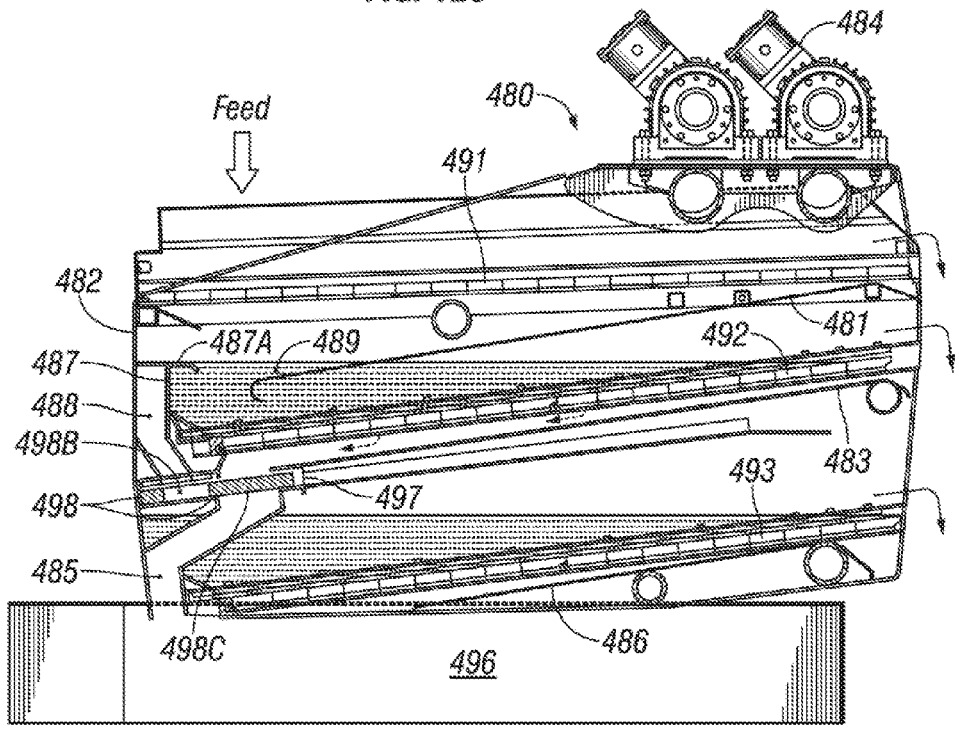
FIG. 12D is a side cross-sectional view of the shale shaker of FIG. 12C.

FIGS. 12C and 12D show the shale shaker 480 in series flow mode. As shown in FIG. 12C, fluid has flowed through the screen 491 down to the screen 492, and the insert 498 has been flipped and rotated in the mount 497 (as shown in FIG. 12G) so that the positions of the openings 498a and 498b relative to the flow channels 488 and 485, respectively, have been reversed. Fluid flowing through the screen 492 flows to the opening 498a in the insert 498 and then down to the screen 493. In the reversed installation of the insert 498 shown in FIG. 12C, plate portions 498c on either side of the opening 498a in the insert 498 (see FIG. 12G) can block fluid flow through the channel 485. Similarly, as shown in FIG. 12D, the plate portion 498d between the two openings 498b in the insert 498 can also block fluid flow from the channel 488.

Figure 13E:
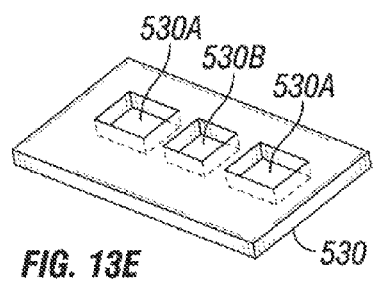
FIG. 13E is a perspective view of an insert according to the present invention.
Figure 13A:
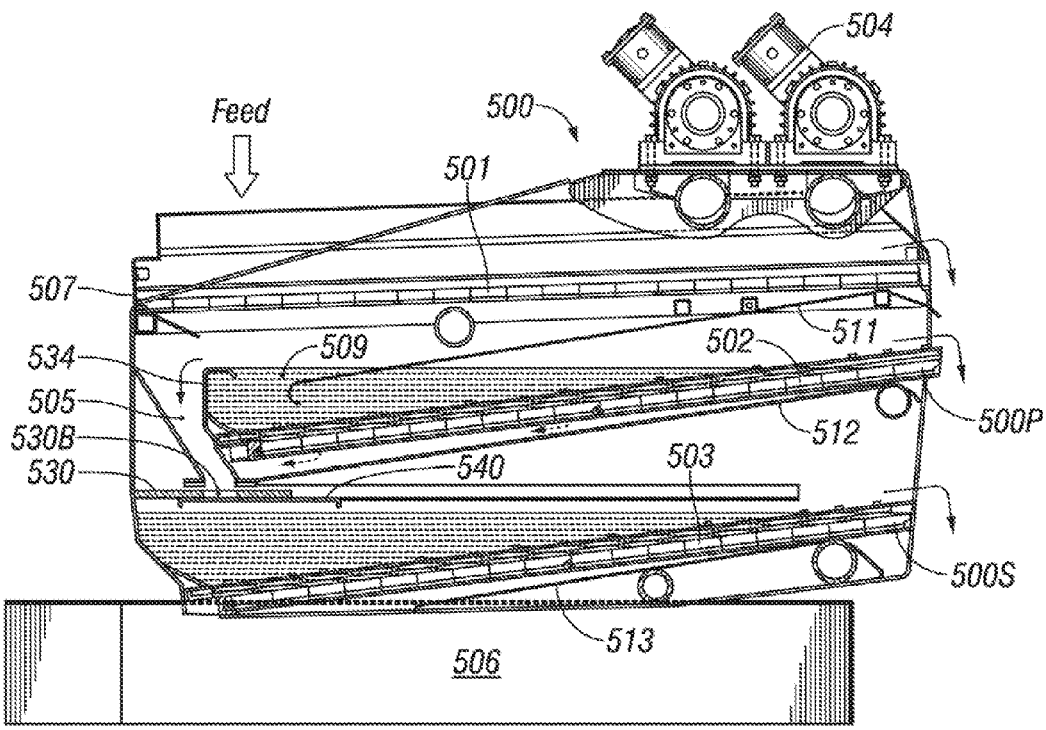
FIG. 13A is a side cross-sectional view of a shale shaker according to the present invention.
Figure 13B:
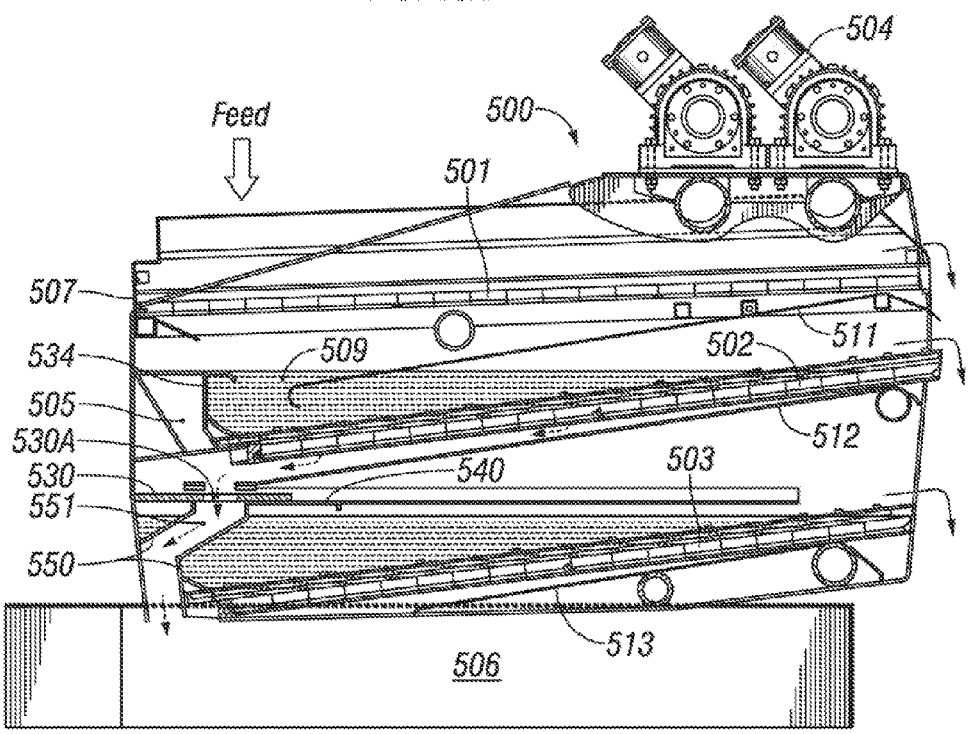
FIG. 13B is a side cross-sectional view of the shale shaker of FIG. 13A.

FIGS. 13A and 13B show a shale shaker 500 in a parallel flow mode. The shaker 500 has a basket 507 and screens 501-503 vibrated by a vibratory apparatus 504. Flowback barriers 511-513 are, respectively, located under the screens 501-503. An insert 530 in a mount 540 is used to change operational mode from series to parallel and vice-versa. Pneumoseal apparatuses 500p, 500s hold screens in place.

As shown in FIG. 13A fluid from the screen 501 flows both to the screen 502 and to the screen 503 (from a pool 509 on the screen 502, over a weir 534, through a channel 505, and through an opening 530b in the insert 530). As shown in FIG. 13B fluid from the screen 502 flows to the sump 506 (down the flowback barrier 512, through openings 530a in the insert 530, to a channel 551 of a channel apparatus 550, and to the sump 506). Fluid from the screen 503 flows down the flowback barrier 513 to the sump 506.

Figure 13C:
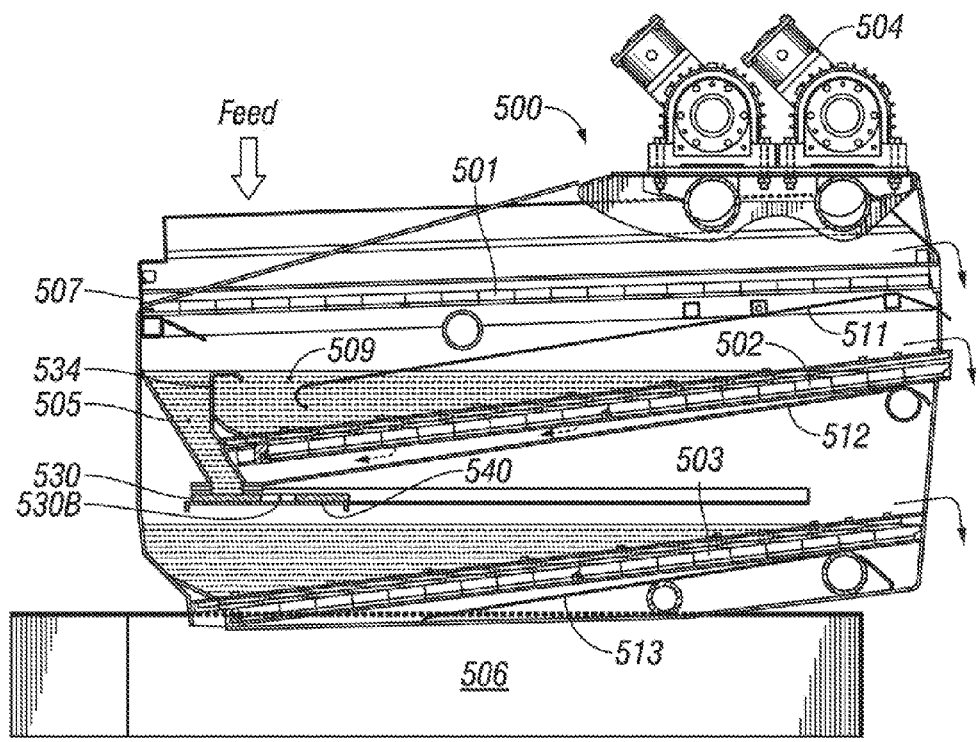
FIG. 13C is a side cross-sectional view of a shale shaker according to the present invention.
Figure 13D:
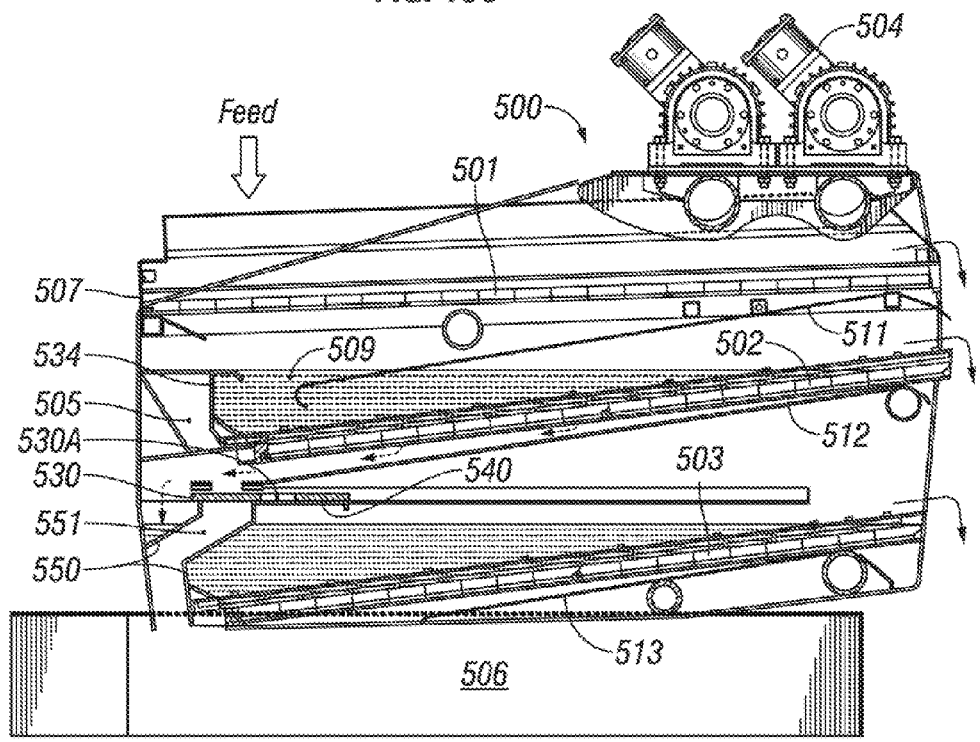
FIG. 13D is a side cross-sectional view of the shale shaker of FIG. 13C.

FIGS. 13C and 13D illustrate the shaker 500 in a series flow mode. As shown in FIG. 13C, the insert 530 (turned around) has been moved forward in the mount 540 so that the opening 530b is no longer aligned with the channel 505, and the openings 530a are no longer aligned with the channel 551. In this position, the insert 530 blocks fluid flow from the channel 505 so that only the screen 502 receives the fluid flowing from the screen 501. The insert 530 also blocks fluid flow through the channel 551 so that all the fluid flowing from the screen 502 flows to the screen 503. As shown in FIG. 13E, the insert 530 has openings 530a (for flow from screen 502 to the channel 551) and an opening 530b (for flow from the pool 509 through the channel 505) to facilitate operation of the shale shaker 500 in a parallel flow mode.

As shown in FIG. 13E, the insert 530 has fluid flow channels 530c. Any screen assembly, any diverter, any pair of screen assemblies, and/or any insert according to the present invention (including, without limitation those of FIGS. 6A-13E) may be used with any shaker or system according to the present invention disclosed herein. The present invention, therefore, provides in at least certain embodiments, a system for processing a mixture of drilling fluid and solid material to separate at least one component of the mixture by size from the mixture, the system including: a vibratable basket for receiving an input flow of drilling fluid with solids therein; a plurality of spaced-apart screen assemblies including a first screen assembly and a second screen assembly positioned below the first screen assembly; the screen assemblies mounted in the vibratable basket and vibratable therewith; conversion apparatus associated with the screen assemblies for selectively controlling the input flow to select one of series flow and parallel flow to the screen assemblies; drilling fluid flowable through the first screen assembly; and drilling fluid flowable through the second screen assembly and flowable down therefrom. Such a system may one or some, in any possible combination, of the following: a system flow channel between the first screen assembly and the second screen assembly, the conversion apparatus including holding structure above the second screen assembly, a diverter held by the holding structure, the diverter having a diverter channel therethrough through which fluid is flowable from the first screen assembly through the system flow channel down to the second screen assembly for series flow of the input flow from the first screen assembly to the second screen assembly, a weir adjacent the first screen assembly forming a barrier to facilitate maintenance of a pool of drilling fluid and solids on the first screen assembly, and the diverter having a blocking portion, the diverter movable to block flow through the system channel so that the pool rises and drilling fluid with solids bypasses the first screen assembly and flows to the second screen assembly for parallel flow of the input flow to both screen assemblies; the holding structure having spaced-apart rails and having an end opening, and the diverter located between the rails and having handle apparatus at the end opening, the handle apparatus accessible for moving the diverter with respect to the system flow channel; flow-back apparatus beneath the first screen assembly for directing flow passing through the first screen assembly to the system flow channel; a sump beneath the second screen assembly for receiving flow passing through the screen assemblies; a parallel flow channel adjacent the screen assemblies for directing flow from the pool to the second screen assembly bypassing the first screen assembly during parallel flow of the system; holding structure above the second screen assembly, and clamping apparatus for holding the diverter in the holding structure; wherein the first screen assembly includes a scalping screen; wherein the second screen assembly includes a screen with second screen mesh of a size suitable for removing solids the size of lost circulation material; a system flow channel between the first screen assembly and the second screen assembly through which fluid is flowable from the first screen assembly to the second screen assembly, the conversion apparatus having a body, the body having a blocking portion for blocking flow to the system flow channel to effect system parallel flow of the input flow to both screen assemblies, and the body having a flow duct for receiving flow from the first screen assembly which is flowable through the duct to the second screen assembly for system series flow to the screen assemblies; a duct blocker for blocking flow through the duct; and/or the conversion apparatus having a body, a first flow channel through the body for effecting system parallel flow to the screen assemblies, and a second flow channel through the body for effecting system series flow to the screen assemblies.

The present invention, therefore, provides in at least certain embodiments, a system for processing a mixture of drilling fluid and solid material to separate at least one component of the mixture by size from the mixture, the system including: a vibratable basket for receiving an input flow of drilling fluid with solids therein; a plurality of spaced-apart screen assemblies including a first screen assembly and a second screen assembly positioned below the first screen assembly; the screen assemblies mounted in the vibratable basket and vibratable therewith; conversion apparatus associated with the screen assemblies for selectively controlling the input flow to select one of series flow and parallel flow to the screen assemblies; drilling fluid flowable through the first screen assembly and drilling fluid flowable through the second screen assembly and down therefrom; a system flow channel between the first screen assembly and the second screen assembly; the conversion apparatus having a body, a first flow channel through the body for effecting system parallel flow to the screen assemblies, a second flow channel through the body for effecting system series flow to the screen assemblies; flow-back apparatus beneath the first screen assembly for directing flow passing through the first screen assembly to the system flow channel; a sump beneath the second screen assembly for receiving flow passing through the screen assemblies; and a parallel flow channel adjacent the screen assemblies for directing flow from the pool to the second screen assembly bypassing the first screen assembly during parallel flow to the screen assemblies The present invention, therefore, provides in at least certain embodiments, a conversion apparatus for a system for processing a mixture of drilling fluid and solid material to separate at least one component of the mixture from the mixture, the system including a vibratable basket for receiving an input flow of drilling fluid with solids therein, a plurality of spaced-apart screen assemblies including a first screen assembly and a second screen assembly positioned below the first screen assembly, the screen assemblies mounted in the vibratable basket and vibratable therewith, drilling fluid flowable through the first screen assembly and the second screen assembly down therefrom, the conversion apparatus associated with the screen assemblies for selectively controlling the input flow to select one of series flow and parallel flow, the conversion apparatus including: a body, a first flow channel through the body for effecting system parallel flow to the screen assemblies, and a second flow channel through the body for effecting system series flow to the screen assemblies.

The present invention, therefore, provides in at least certain embodiments, a method for treating a flow of drilling fluid with solids, the method including: introducing the flow of drilling fluid with solids to a system for separating at least one component from the flow, the system as any disclosed herein according to the present invention; the method further including: selecting one of a system series flow to screen assemblies of the system or a system parallel flow to the screen assemblies using a conversion apparatus; flowing drilling fluid with solids to the screen assemblies; and screening the flow to each screening assembly. Such a method may one or some, in any possible combination, of the following: wherein the conversion apparatus has a body, a first flow channel through the body for effecting system parallel flow to the screen assemblies, and a second flow channel through the body for effecting system series flow to the screen assemblies, the method further including selecting the first flow channel for system parallel flow or selecting the second flow channel for system series flow; wherein the system further has flow-back apparatus beneath the first screen assembly for directing flow passing through the first screen assembly to the system flow channel, the method further including directing flow from the first screen assembly to the system flow channel; wherein the system further has a sump beneath the second screen assembly, the sump receiving flow passing through the screen assemblies; wherein the system further has holding structure above the second screen assembly, and clamping apparatus for holding the diverter in the holding structure, the method further including clamping the diverter with the clamping apparatus; and/or wherein the first screen assembly includes a scalping screen, and wherein the second screen assembly includes a screen with second screen mesh of a second size suitable for removing solids the size of lost circulation material.

Figure 14:
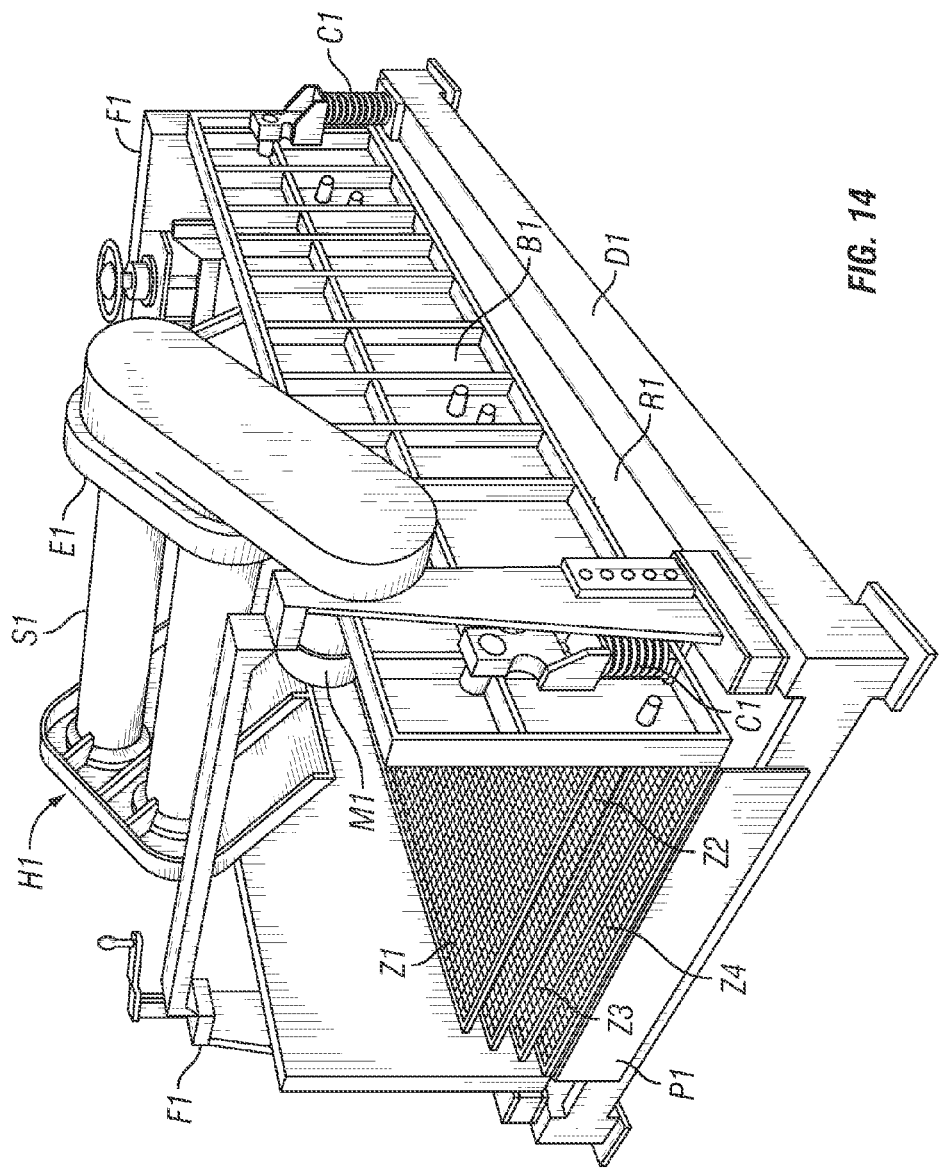
FIG. 14 shows a perspective view of an apparatus for separating solids from solids laden drilling mud.

FIG. 14 shows an apparatus for separating solids from a solids laden drilling mud, generally referred to as a shale shaker and identified herein by reference H1. The shale shaker H1 comprises a base D1 having an open bottom R1 arranged above a collection receptacle (not shown) for receiving screen drilling mud. A basket B1 is arranged on springs C1 on the base D1. A vibratory apparatus E1 is arranged on top of the basket B1. The vibratory apparatus E1 comprises an electric or hydraulic motor M1 rotating offset clump weights hidden within casing 51, which induce a motion in the basket D1. An upper, upper middle, lower middle and lower screen assemblies Z1, Z2, Z3, Z4 are arranged in the basket D1 and fixed thereto in rails (not shown) so that the motion induced in the basket is transferred to the screen assemblies Z1, Z2, Z3, Z4. Solids laden drilling fluid is fed on to the screen assemblies Z1-Z4 from a feed chamber F1 at a feed end of the apparatus. The motion induced in the screen assemblies Z1-Z4 facilitates separation of solids from drilling mud. Screened drilling mud passes through the screen assemblies into the collection receptacle (not shown) and solids climb along the screen assemblies Z1-Z4 to a discharge end P1 of the shale shaker and into a skip, ditch or other cuttings transfer apparatus (not shown).

Figure 15A:
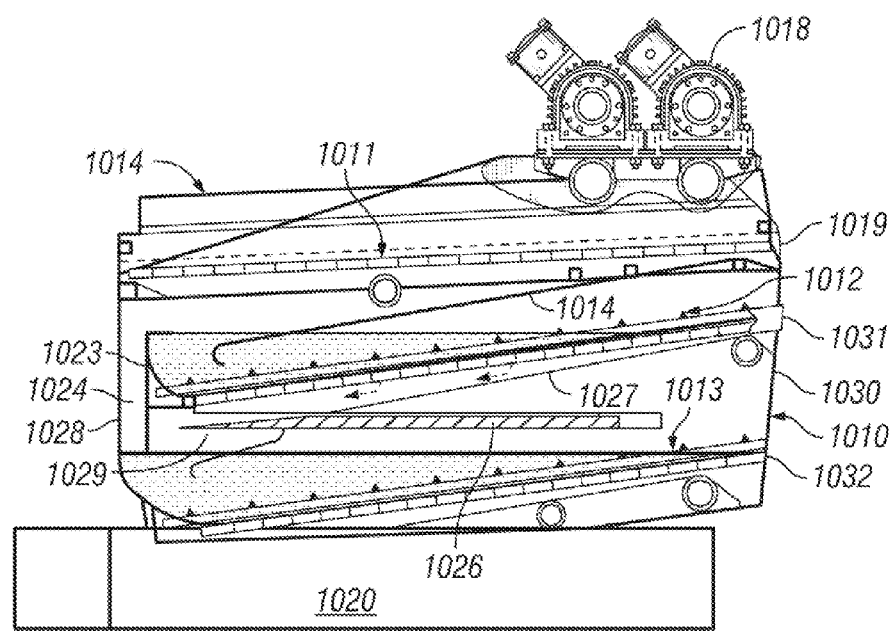
FIG. 15A is a side cross-sectional schematic view of an apparatus for separating and sizing solids from solids laden drilling mud, the apparatus comprising a base and a basket.
Figure 15B:
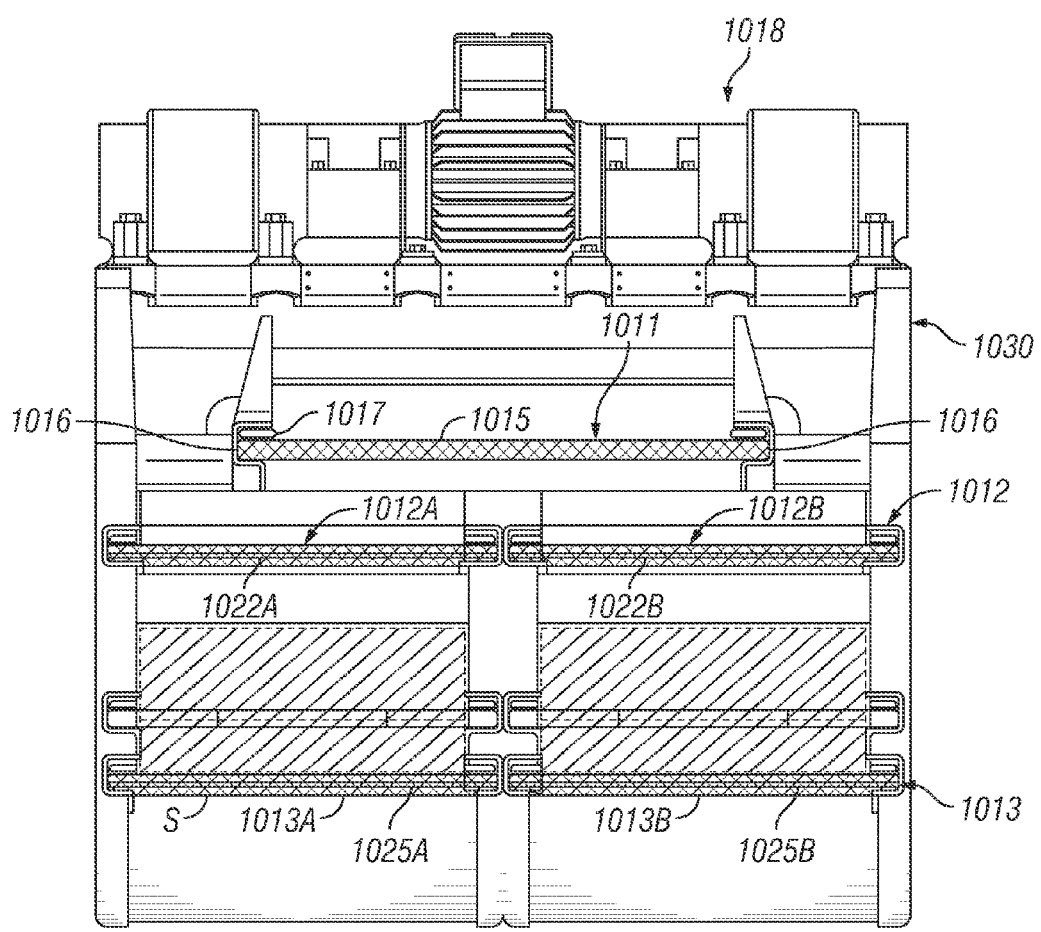
FIG. 15B is an end view of the basket shown in FIG. 15A with screen assemblies therein.

FIGS. 15A and 15B show a shale shaker 1010 having a base 1020 and a basket 1030 arranged thereon on springs (not shown). The basket 1030 comprising a scalping deck 1011, an upper primary deck 1012 and a lower primary deck 1013. The upper primary deck 1012 has a left-hand side 1012a and a right-hand side 1012b. The lower primary deck has a left-hand side 1013a and a right-hand side 1013b. Solids laden drilling fluid is introduced to a feed end 1014 of the shale shaker 1010 from a feeder (not shown) on to a scalping screen 1015 arranged in C-shaped channels 1016 of the scalping deck 1011. An expandable pneumatic bladder 1017 is arranged in a top part of the C-shaped channels 1016 to clamp the scalping screen 1015 therein. Alternatively, a wedge may be used to secure the scalping screen 1015 in the C-shaped channels 1016. The scalping screen 1015 comprises a screen having relatively large openings for inhibiting large particles from passing though on to the primary decks, but allowing some solids and drilling mud therethrough. The scalping deck 1011 and the screen 1015 thereon is arranged at an uphill tilt of approximately one degree from horizontal, although the scalping screen 1015 and scalping deck 1011 may be arranged horizontally, slightly downhill or at a slightly greater uphill angle. Vibratory apparatus 1018 fixed to the basket 1030 induces motion therein. The motion facilitates separation of large solids from the solids laden drilling mud and induces movement in the large solids along the scalping screen 1015 from the feed end 1014 to the discharge end 1019 of the shale shaker. The large solids may be caught in a ditch or on a conveying means and further processed or used in other operations. The solids laden drilling fluid which passes through the scalping screen 1015 falls on to a flow tray 1021 which directs the solids laden drilling fluid to the feed end 1014 of screen assemblies 1022a and 1022b in the upper primary deck 1012. A weir 1023 is arranged at the feed end of the primary deck 1012 to retain the solids laden drilling fluid. If the level of the solids laden drilling fluid rises beyond the height of the weir 1023, solids laden drilling fluid passes thereover into a duct 1024 and on to screen assemblies 1025a and 1025b in the lower primary screen deck 1013. The screen assemblies 1022a, 1022b and 1025a and 1025b are preferably of the same type and have the same screen mesh thereon.

A gate valve 1026 in the form of a slideable tray, is in a closed position to run the shale shaker in a parallel mode. Screened drilling mud falls through the screen assemblies 1022a and 1022b in the upper screen deck on to a flow tray 1027 and over the closed gate valve 1026, and into a duct 1028 which runs parallel to the duct 1024. However, duct 1028 leads to the bottom of the basket and directly into the collection receptacle (not shown) therebelow. Solids fall off the discharge end 1031 of upper screen deck 1012 and discharge end 1032 of the lower screen deck 1013 and into a skip or other conveying apparatus for conveying the solids for further processing or re-use. The gate valve 1026 may be retracted to allow drilling mud screened by the screen assemblies 1022a and 1022b in the upper screen deck 1012 to be further screened by screen assemblies 1025a and 1025b on the lower screen deck 1013. The shale shaker thus runs in a series mode. In this situation, it is preferable to use a finer screen mesh in the screen assemblies 1025a and 1025b than the screen mesh used in screen assemblies 1022a and 1022b. Drilling mud screened by the screen assemblies 1022a and 1022b in the upper screen deck 1012 flows in the flow tray 1027 and into a duct 1029, which directs the screened drilling mud on to the feed end 1014 of the screen assemblies 1025a and 1025b in the lower screen deck 1013. Sized solids fall off the discharge end 1031 of upper screen deck 1012 into a conveyor (not shown) to be conveyed and mixed into a fresh batch of drilling mud for re-circulation. These sized solids are used to block cracks in the formation as hereinbefore described. Solids discharged from the discharge end 1032 of the lower screen deck 1013 are conveyed in a separate conveyor or added to a skip for further processing or used for other purposes.

Figure 17:
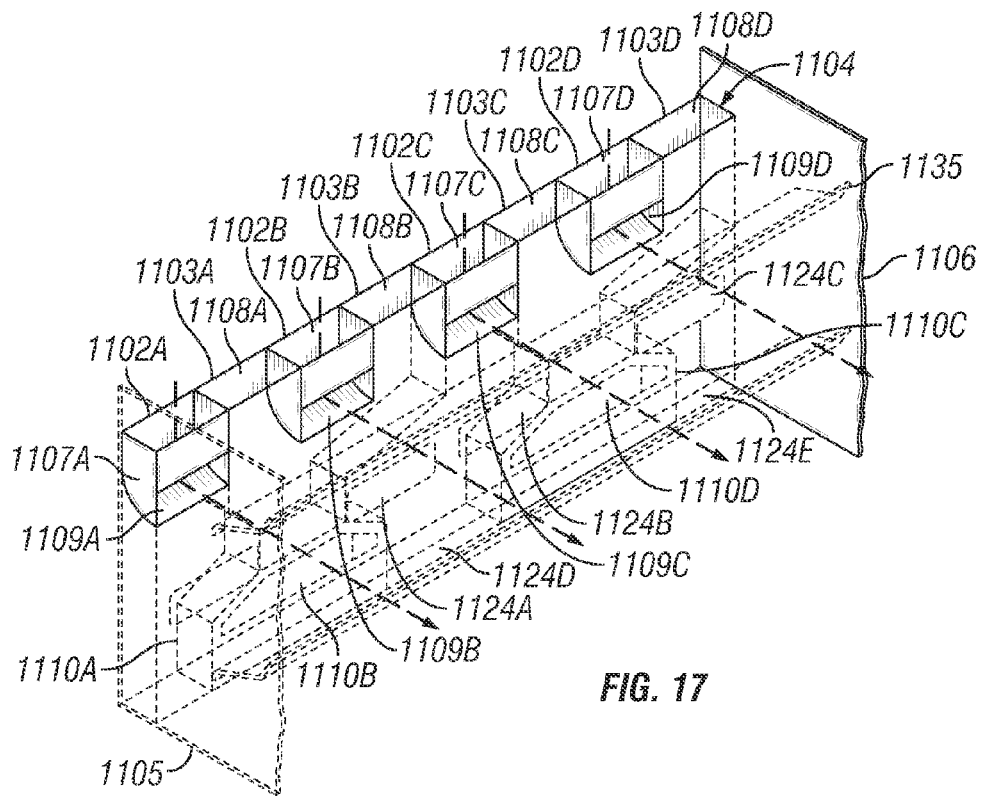
FIG. 17 is a perspective view of a part of the basket shown in FIG. 16A with hidden parts shown, in the first mode of operation indicating direction of flow of solids laden drilling mud to an upper primary screen deck.
Figure 18:
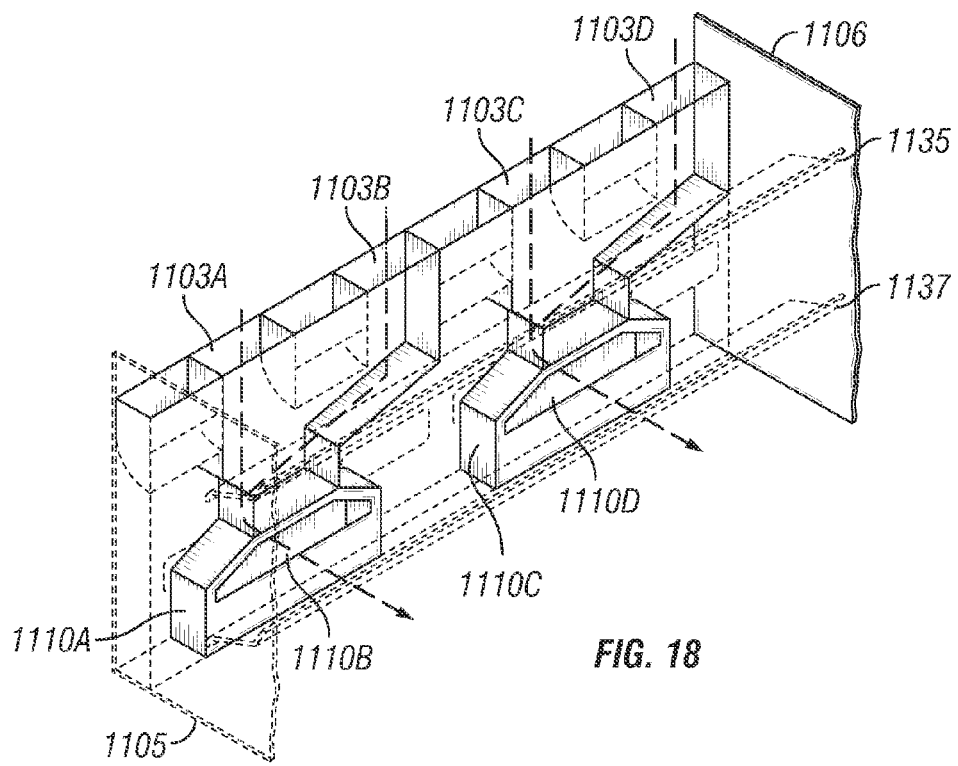
FIG. 18 is a perspective view of a part of the basket shown in FIG. 16A, with hidden parts shown, in the first mode of operation indicating direction of flow of solids laden drilling mud to a lower primary screen deck.

Referring to FIGS. 16, 16A, 16C, 17 and 18, there is shown a basket 1100 of a shale shaker. The basket 1100 comprising a scalping deck 1111, an upper primary deck 1112 and a lower primary deck 1113. The upper primary deck 1112 has a left-hand side 1112a and a right-hand side 1112b. The lower primary deck 1113 has a left-hand side 1113a and a right-hand side 1113b. Solids laden drilling fluid is introduced to a feed end of the shale shaker 1114 from a feeder (not shown) on to a scalping screen 1115 arranged in C-shaped channels 1116 of the scalping deck 1111. An expandable pneumatic bladder 1117 is arranged in a top part of the C-shaped channels 1116 to clamp the scalping screen 1115 therein. Alternatively, a wedge may be used to secure the scalping screen 1115 in the C-shaped channels 1116. The scalping screen 1115 comprises at least one layer of screen material, such as wire mesh having relatively large openings for inhibiting large particles from passing though on to the upper and lower primary decks 1112 and 1113, but allowing some solids and drilling mud therethrough. The scalping deck 1111 and the scalping screen 1115 thereon is arranged at an uphill tilt of approximately one degree from horizontal, although the scalping screen 1115 and scalping deck 1111 may be arranged horizontally, slightly downhill or at a slightly greater uphill angle. Vibratory apparatus 1118 fixed to the basket 1100 induces motion therein. The motion facilitates separation of large solids from the solids laden drilling mud and induces movement in the large solids along the scalping screen 1015 from the feed end 1114 to the discharge end 1119 of the shale shaker. The large solids may be caught in a skip, ditch or on a conveying means (not shown) and further processed or used in other operations. The solids laden drilling fluid which passes through the scalping screen 1115 falls on to a flow tray 1121 which directs the solids laden drilling fluid over a closed distribution gate valve in the form of a slideable tray distribution gate tray 1101, and as shown in FIGS. 17 and 18, through eight duct openings 1102a, 1102b, 1102c, 1102d and 1103*a*, 1103*b*, 1103*c* and 1103*d* of a manifold 1104 arranged between side walls 1105 and 1106 of the basket 1100. Preferably, the eight duct openings 1102*a*, 1102*b*, 1102*c*, 1102*d* and 1103*a*, 1103*b*, 1103*c* and 1103*d* are located flush with or slightly below the flow tray 1121 and distribution gate tray 101 tray 1101. The openings 1102*a*, 1102*b*, 1102*c*, 1102*d* and 1103*a*, 1103*b*, 1103*c* and 1103*d* may be arranged vertically in the manifold 1104, with the openings 1102*a*, 1102*b*, 1102*c*, 1102*d* and 1103*a*, 1103*b*, 1103*c* and 1103*d* each having a lower lip substantially flush with or slightly below the distribution gate tray 1101. The solids laden drilling fluid flows in approximately equal quantities through duct openings 1102*a* to 1102*d* into ducts 1107*a* to 1107*d* and through openings 1103*a* to 1103*d* into ducts 1108*a* to 1108*d*. Approximately an eighth of the flow solids laden drilling fluid passes into each opening 1102*a* to 1102*d* and 1103*a* to 1103*d*. Ducts 1107*a* and 1107*b* lead to respective discharge outlets 1109*a* and 1109*b*, discharging solids laden drilling fluid on to a feed end of screens 1122*a* of the upper primary deck 1112. Ducts 1107*c* and 1107*d* lead to respective discharge outlets 1109*c* and 1109*d*, discharging solids laden drilling fluid on to a feed end of screens 1122*b* of the upper primary deck 1112. Ducts 1108*a* and 1108*b* merge into duct 1110*a* and ducts 1108*c* and 1108*d* merge into duct 1110*c*, discharging solids laden drilling fluid through discharge opening 1110*b* and 1110*d* on to feed ends of screens 1125*a* and 1125*b* respectively of the lower primary deck 1113.

Figure 21:
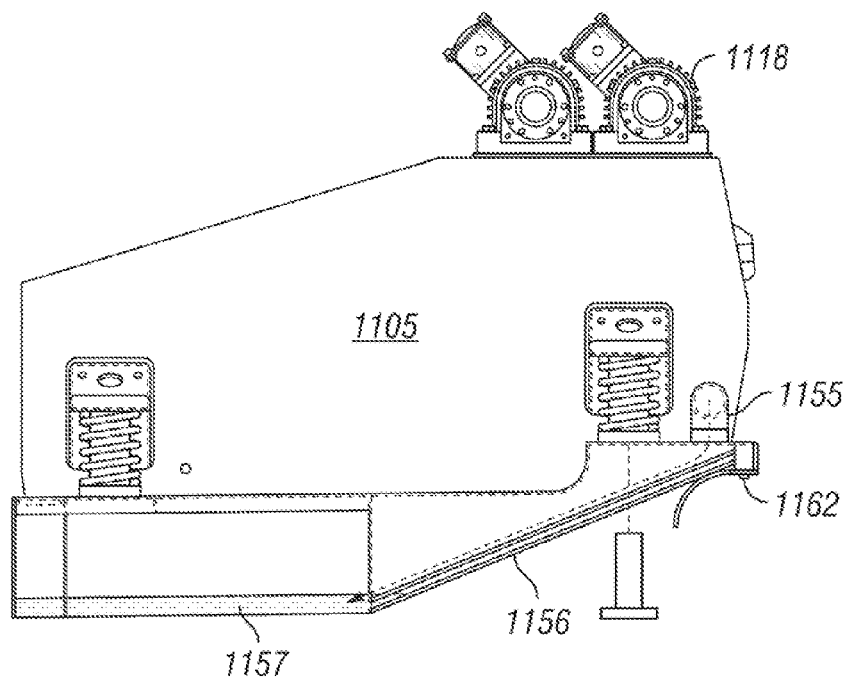
FIG. 21 is a side view of the shale shaker shown in FIG. 20 arranged over a sump, with some hidden parts shown.

Drilling mud screened by screens 1122*a* and 1122*b* falls through the screens 1122*a* and 1122*b* on to a flow tray 1127 and flows down along over selector gate trays 1126*a* and 1126*b* respectively and into fluid discharge openings 1124*a*, 1124*b* and 1124*c*. Screened drilling fluid passes through opening 1124*a* and 1124*b* into fluid discharge duct 1124*d* and is directed into a sump 1157 (see FIG. 21), screened drilling fluid also passes through opening 1124*c* and into fluid discharge duct 1124*e* which also directs screened drilling fluid into the sump 1157 (see FIG. 21) arranged below the basket 1100. Solids laden drilling fluid screened by screens 1125*a* and 1125*b* falls through the screens 1125*a* and 1125*b* on to a flow tray 1128 which discharges the screened drilling fluid through opening 1129 into the sump (not shown) or collection receptacle (not shown).

Solids screened by the screens 1122*a* and 1122*b* and screens 1125*a* and 1125*b* are discharged over solids discharge end 1130 and 1131 respectively and into a ditch, skip or other solids collection or conveying apparatus.

In this "parallel" mode of operation, both upper and lower screen decks are used to screen the same solids laden drilling fluid, which has simply had large solids removed by the scalping screen 1115. Thus, in this parallel mode, the screen assemblies 1122*a*, 1122*b* and 1125*a* and 1125*b* are preferably of the same type and have the same screen mesh thereon.

Figure 16:
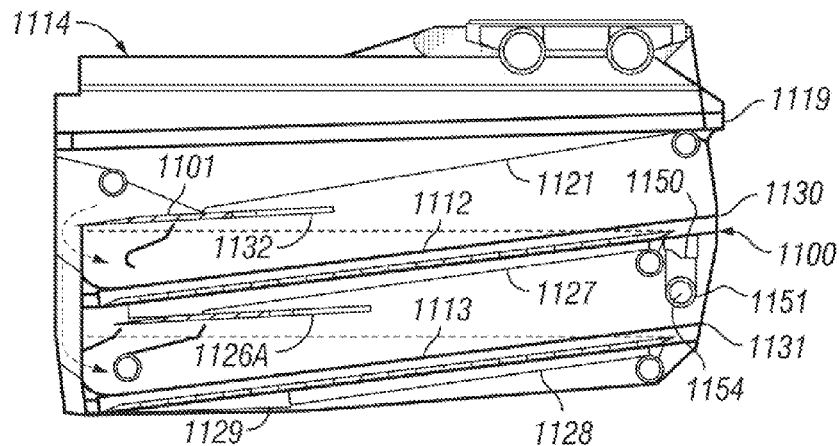
FIG. 16 is a side view in section of a basket of a shale shaker in accordance with the present invention.
Figure 16A:
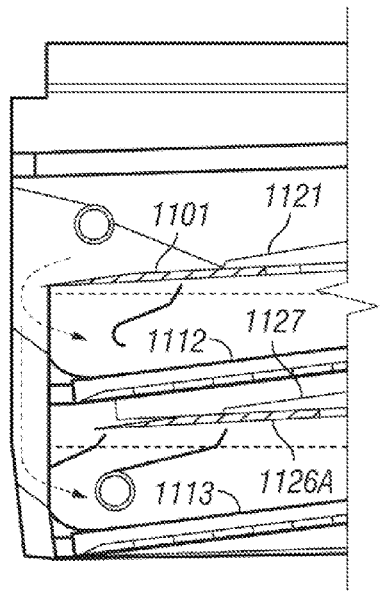
FIG. 16A is an enlarged view of part of the basket shown in FIG. 16, with parts in a first mode of operation.
Figure 16B:
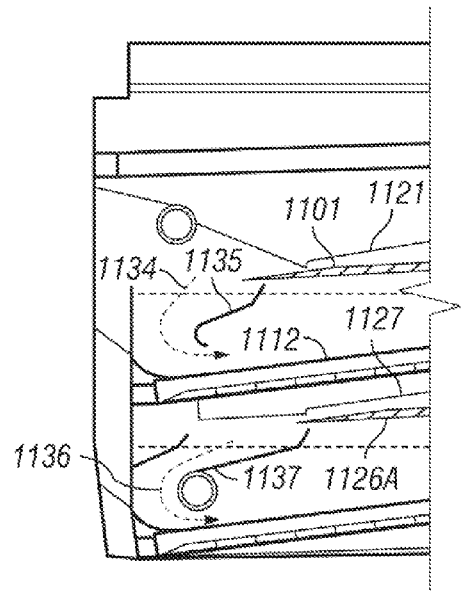
FIG. 16B is an enlarged view of part of the basket shown in FIG. 16 with parts in a second mode of operation.
Figure 16C:
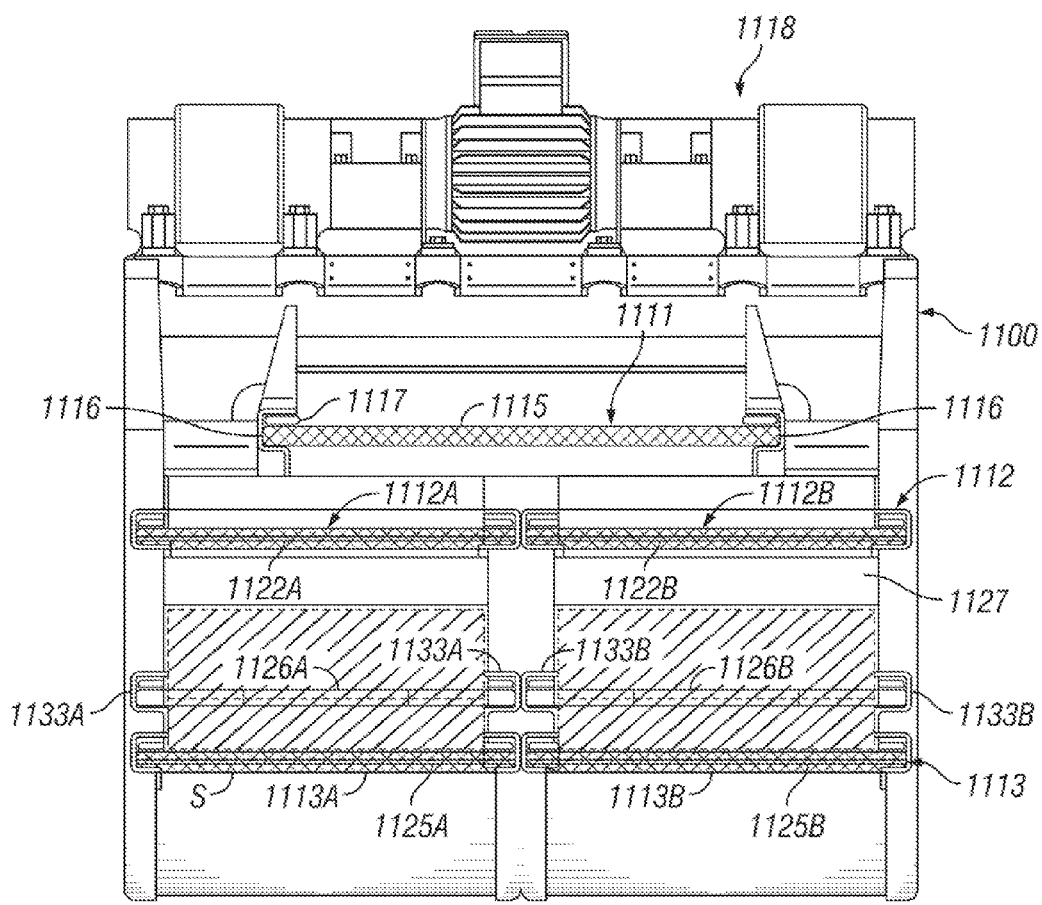
FIG. 16C is an end view of the basket shown in FIG. 16 with screen assemblies therein.

Referring to FIG. 16B, a "series" mode of operation is shown. Distribution gate tray 1101 and selector gate trays 1126*a* and 1126*b* are retracted. The distribution gate tray 1101 is arranged in a rail 1132. The distribution gate tray 1101 is retracted along the rail 1132 by activation of an actuator (not shown), which may be pneumatic, hydraulic, electric or mechanical and may be activated by a switch (not shown) on the shale shaker or by remote control from a control room. Selector gate trays 1126*a* and 1126*b* are arranged in respective sets of rails 1133*a* and 1133*b*. The selector gate trays 1126*a* and 1126*b* are retracted simultaneously along the sets of rails 1133*a* and 1133*b* by activation of an actuator (not shown), which may be pneumatic, hydraulic, electric or mechanical and may be activated by a switch (not shown) on the shale shaker or by remote control from a control room.

In this "series" mode, the distribution gate tray 1101 and selector gate trays 1126*a* and 1126*b* are retracted revealing an opening 1134. Solids laden drilling fluid flows through the opening 1134 over an upper diverter tray 1135 and on to a feed end of the screens 1122*a* and 1122*b* on the upper screen deck 1112. Screened drilling fluid flowing through the screens 1122*a* and 1122*b* flows on to the flow tray 1127 and through an opening 1136 revealed by the retracted selector gate trays 1126*a* and 1126*b* over a lower diverter tray 1137 on to a feed end of the screens 1125*a* and 1125*b* on the lower screen deck 1113.

In this "series" mode of operation, the screens 1122*a* and 1122*b* on the upper screen deck 1112 are used for the first "cut" to remove larger solids and the screens 1125*a* and 1125*b* on the lower screen deck 1113 are used to make a finer cut. Thus in series mode, the screens 1125*a* and 1125*b* will be of finer mesh size than the screens 1122*a* and 1122*b*.

The solids removed by the screens 1122*a* and 1122*b* are thus sized solids, which can be reused in the screened drilling mud. The sized solids are useful for, amongst other things, as Wellbore Strengthening Materials to lodge or block cracks in the walls of the wellbore as the drilling mud is circulated.

Figure 19A:
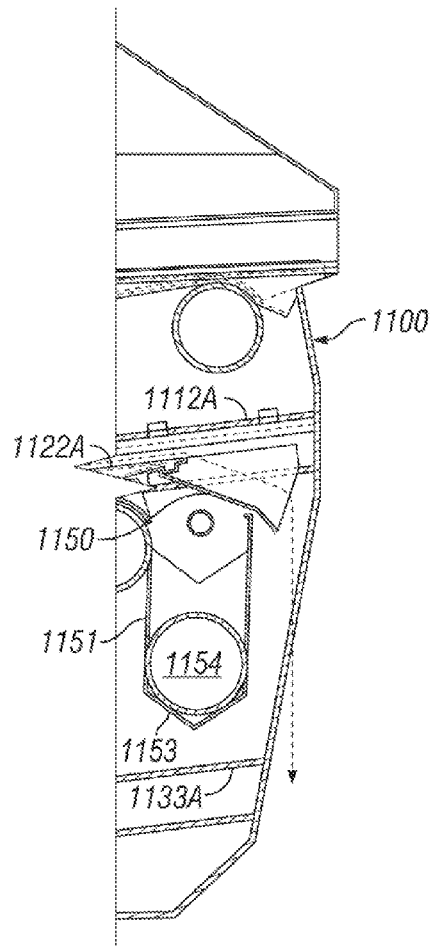
FIG. 19A is an enlarged view in cross section of a solids diverter apparatus of the basket shown in FIG. 3, in the first mode of operation.

FIG. 19A shows in cross-section the solids discharge end of the basket 1100, taken through side 1112*a*. Solids are conveyed uphill along the top surface of the screens 1122*a* and 1122*b* by the vibratory motion induced in the screens 1122*a* and 1122*b* by the vibratory apparatus 1118. The solids fall from screens 1122*a* and 1122*b* on to respective parallel diverter plates 1150 (only side 1112*a* shown) fitted over a trough 1151 and trough 1151*a*. The parallel diverter plate 1150 is angled at approximately twenty five degrees from horizontal to facilitate directing the solids out of the basket and into a skip, ditch or means for conveying the solids. The parallel diverter plate 1150 is fitted over the trough 1151 preferably when the shale shaker is in the parallel mode of operation.

Figure 19B:
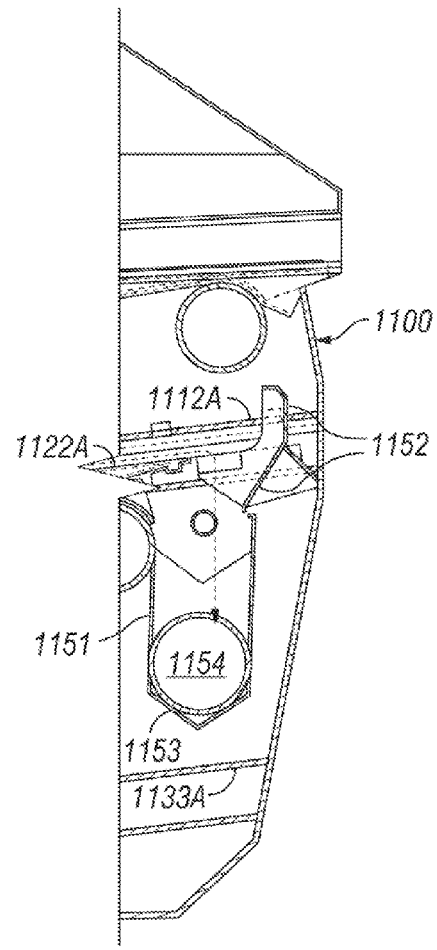
FIG. 19B is an enlarged view of a solids diverter apparatus of the basket shown in FIG. 16, in the second mode of operation.
Figure 20:
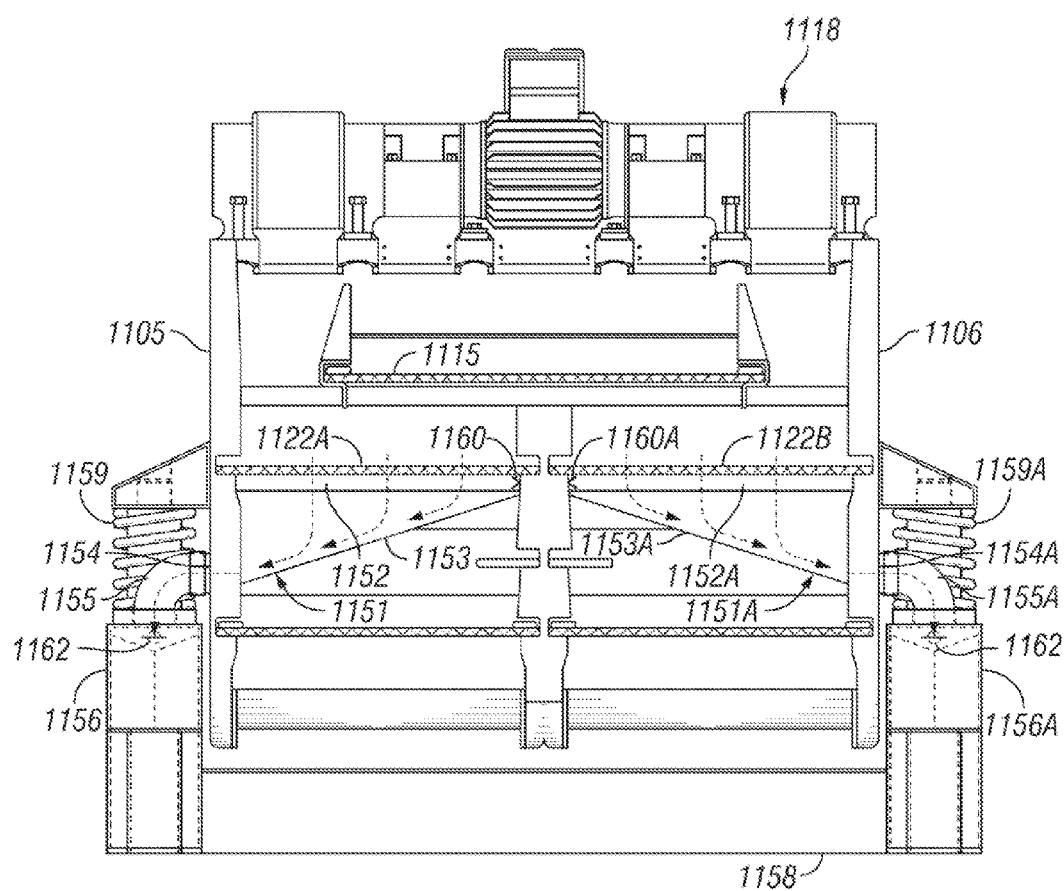
FIG. 20 is an end view in section of a shale shaker comprising the basket shown in FIG. 16, showing details of a solids diverter apparatus.

FIG. 19B shows the diverter plate 1150 removed and replaced with series diverter plates 1152 and 1152*a* installed at the end of the basket 1100. The series diverter plates 1152 and 1152*a* are fitted at the discharge end of the basket 1100 to direct solids from screens 1122*a* and 1122*b* into troughs 1151 and 1151*a*. The solids flow through the trough 1151 and 1151*a*, which have a floor 1153, 1153*a* which slope towards respective openings 1154 and 1154*a* in sides 1105 and 1106. Flexible duct connectors 1155 and 1155*a* lead from openings 1154 and 1154*a* respectively to sump channels 1156 and 1156*a* in a base 1158. The basket 1100 is isolated from the base 1158 on four springs 1159 and 1159*a* (only two shown). The sump channels 1156 and 1156*a* led into sump 1157 fsee FIG. 21) beneath the basket 1100. The generally smaller solids discharging from discharge end 1131 of the lower screen deck 1113 fall into the skip, ditch or other solids conveying apparatus to be disposed of or further processed form construction or industrial use. Thus the solids sized between the scalping deck 1111 and the upper primary deck 1112 are returned into the screened drilling mud in the sump 1157 to be re-circulated in a wellbore. The flow of solids through the troughs 1151 and 1151*a* is facilitated by fully screened drilling fluid jetted through jetting nozzles 1160 and 1160*a* respectively. The jetting nozzles are connected to drilling mud supply hoses (not shown) and a pump (not shown). Jetting nozzles 1162 are also provided in the sump channels 1156 and 1156*a* after the flexible duct connectors 1155 and 1155*a*, respectively, to facilitate flow of solids into the sump 1157.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps.

It is the express intention of the applicant not to invoke 35 U.S.C. §112, paragraph 6 for any limitations of any of the claims herein, except for those in which the claim expressly uses the words 'means for' together with an associated function. In this document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

Whereas the present invention has been described in particular relation to the drawings attached hereto, it should be understood that other and further modifications apart from those shown or suggested herein, may be made within the scope and spirit of the present invention.

What is claimed is:

1. A shale shaker for separating solids from solids laden drilling fluid, the shale shaker comprising:
   a basket;
   a first screen deck mounted in said basket;
   a second screen deck mounted in said basket and positioned below said first screen deck;
   a flow manifold comprising a plurality of first flow ducts and a plurality of second flow ducts interleaved with said first flow ducts, wherein said flow manifold is adapted to receive an unchanneled flow of solids laden drilling fluid, said plurality of first flow ducts being adapted to receive a first portion of said unchanneled flow and channel said first portion to said first screen deck, and said plurality of second flow ducts being adapted to receive a second portion of said unchanneled flow and channel said second portion to said second screen deck; and
   a non-channeled flow tray mounted in said basket and positioned above said first screen deck, wherein said non-channeled flow tray is adapted to feed said unchanneled flow to said flow manifold.

2. A shale shaker as claimed in claim 1, wherein each of said plurality of first flow ducts comprises a respective first duct opening and each of said plurality of second flow ducts comprises a respective second duct opening.

3. A shale shaker as claimed in claim 2, wherein said plurality of first duct openings are interleaved with said plurality of second duct openings, said plurality of first and second duct openings being arranged substantially perpendicularly to a flow direction of said unchanneled flow of solids laden drilling fluid.

4. A shale shaker as claimed in claim 2, wherein said non-channeled flow tray has a floor and at least one of said pluralities of first and second duct openings is substantially planar with said floor of said non-channeled flow tray.

5. A shale shaker as claimed in claim 1, wherein said non-channeled flow tray has a feed end and a discharge end, the pluralities of first and second flow ducts being arranged at said discharge end of said non-channeled flow tray.

6. A shale shaker as claimed in claim 1, wherein said non-channeled flow tray further comprises a valve for directing said unchanneled flow of solids laden drilling fluid to one of said first screen deck and said pluralities of first and second flow ducts.

7. A shale shaker as claimed in claim 6, wherein said non-channeled flow tray has at least one gate opening therein and said valve is a gate valve comprising a slidably movable gate tray that is adapted to be slidably moved between a closed position closing off said gate opening to an open position opening said gate opening.

8. A shale shaker as claimed in claim 7, wherein a level of at least one of said pluralities of first and second duct openings is positioned below a level of said slidably movable gate tray.

9. A shale shaker as claimed in claim 1, further comprising a scalping screen that is positioned above said non-channeled flow tray, said scalping screen being adapted to remove a portion of said solids from said solids laden drilling fluid, to direct said unchanneled flow of solids laden drilling fluid to said non-channeled flow tray and to direct said removed portion of said solids to a discharge end of said shale shaker.

10. A shale shaker as claimed in claim 9, wherein said scalping screen is further adapted to direct said removed portion of said solids into one of a: skip; and ditch.

11. A shale shaker as claimed in claim 1, wherein said first screen deck has a screened fluid flow tray positioned thereunder, said screened fluid flow tray being adapted for collecting and guiding drilling fluid that is screened by said first screen deck.

12. A shale shaker as claimed in claim 11, wherein said basket further comprises at least one discharge duct for directing said screened drilling fluid from said screened fluid flow tray to a sump arranged beneath said basket.

13. A shale shaker as claimed in claim 1, wherein said second screen deck has a screened fluid flow tray positioned thereunder, said screened fluid flow tray being adapted for collecting and guiding drilling fluid that is screened by said second screen deck.

14. A shale shaker as claimed in claim 1, wherein said basket further comprises a trough that is arranged under a solids discharge end of said first screen deck, said trough being adapted to receive solids discharged from said solids discharge end.

15. A shale shaker as claimed in claim 14, further comprising a sump arranged below said basket, wherein said trough is adapted to feed solids into said sump.

16. A shale shaker as claimed in claim 15, wherein the basket further comprises a flexible duct that is adapted to direct a flow of solids from said trough to said sump.

17. A shale shaker as claimed in claim 14, said basket further comprising a jetting nozzle that is adapted to jet screened drilling fluid into said trough to facilitate a flow of solids therethrough.

18. A shale shaker as claimed in claim 1, wherein said basket further comprises a trough and a diverter plate, wherein said trough is arranged under a solids discharge end of said first screen deck and said diverter plate is adapted to guide solids discharged from said solids discharge end into said trough.

19. A shale shaker as claimed in claim 1, wherein said basket further comprises a trough and a diverter plate, wherein said trough is arranged under a solids discharge end of said first screen deck and said diverter plate is adapted to inhibit solids discharged from said solids discharge end from flowing into said trough.

20. A shale shaker as claimed in claim 19, further comprising one of a skip and a ditch, wherein said diverter plate is adapted to guide solids into said one of said skip and said ditch.

21. A shale shaker as claimed in claim 1, wherein said first screen deck comprises a left-hand first screen deck and a right-hand first screen deck.

22. A shale shaker as claimed in claim 21, wherein said second screen deck comprises a left-hand second screen deck and a right-hand second screen deck.

23. The shale shaker of claim 22, wherein at least two of said plurality of first flow ducts are adapted to feed said left-hand first screen deck, at least two of said plurality of first flow ducts are adapted to feed said right-hand first screen deck, at least two of said plurality of second flow ducts are adapted to feed said left-hand second screen deck, and at least two of said plurality of second flow ducts are adapted to feed said right-hand second screen deck.

24. A shale shaker as claimed in claim 1, wherein said basket has a feed end and a solids discharge end, said first screen deck being arranged at an uphill angle relative to horizontal from said feed end of said basket to said solids discharge end.

25. A shale shaker as claimed in claim 1, further comprising a first screen assembly in said first screen deck and a second screen assembly in said second screen deck.

26. A shale shaker as claimed in claim 25, wherein said first screen assembly has first screening material thereon and said second screen assembly has second screening material thereon, wherein the mesh size of the first screening material is substantially the same as the mesh size of the second screening material.

27. A shale shaker as claimed in claim 25, wherein said first screen assembly has first screening material thereon and said second screen assembly has second screening material thereon, wherein the mesh size of the second screening material is finer than the mesh size of the first screening material.

28. A shale shaker as claimed in claim 1, further comprising a fixed base, said basket suspended from the base on at least one spring, said basket further comprising a vibrating apparatus for vibrating said basket and the first and second screen decks mounted therein.

29. A method for separating solids from solids laden drilling fluid, the method comprising:
directing an unchanneled flow of solids laden drilling fluid in a flow direction along a non-channeled flow tray, wherein said non-channeled flow tray is mounted in a basket of a shale shaker;
feeding said unchanneled flow of solids laden drilling fluid to a flow manifold of said shale shaker, said flow manifold comprising a plurality of first flow ducts and a plurality of second flow ducts interleaved with said first flow ducts;
receiving a first portion of said unchanneled flow with said plurality of first flow ducts, and channeling said first portion with said plurality of first flow ducts to a first screen deck mounted in said basket below said non-channeled flow tray; and
receiving a second portion of said unchanneled flow with said plurality of second flow ducts, and channeling said second portion with said plurality of second flow ducts to a second screen deck mounted in said basket below said first screen deck.

30. A shale shaker for separating solids from solids laden drilling fluid, the shale shaker comprising:
a basket;
a scalping screen mounted in said basket;
a non-channeled flow tray mounted in said basket and positioned below said scalping screen;
a first screen deck mounted in said basket and positioned below said non-channeled flow tray;
a second screen deck mounted in said basket and positioned below said first screen deck; and
a flow manifold comprising a plurality of first flow ducts and a plurality of second flow ducts interleaved with said first flow ducts, wherein said flow manifold is adapted to receive an unchanneled flow of solids laden drilling fluid from said non-channeled flow tray, said plurality of first flow ducts being adapted to receive a first portion of said unchanneled flow and channel said first portion to said first screen deck, and said plurality of second flow ducts being adapted to receive a second portion of said unchanneled flow and channel said second portion to said second screen deck.

31. A shale shaker as claimed in claim 30, wherein said non-channeled flow tray has at least one gate opening therein and a gate valve comprising a slidably movable gate tray that is adapted to be slidably moved between a closed position closing off said gate opening to an open position opening said gate opening and allowing solids laden drilling fluid to flow therethrough.

32. A shale shaker as claimed in claim 31, wherein said basket further comprises a screened fluid flow tray mounted therein and positioned below said first screen deck, said screened fluid flow tray having a selector opening therein and a selector gate valve that is adapted for selectively opening and closing said selector opening to selectively allow screened drilling fluid to flow therethrough and onto said second screen deck.

33. A method for separating solids laden drilling fluid with a shale shaker, the method comprising:
feeding a flow of solids laden drilling fluid to a scalping deck that is mounted in a basket of said shale shaker;
separating at least a first portion of solids material from said flow of solids laden drilling fluid by passing said at least said first portion of solids material over a scalping screen of said scalping deck to a discharge end of said scalping deck;
passing a flow of a first unseparated portion of said solids laden drilling fluid through said scalping screen to a first screen deck that is mounted in said basket and positioned below said scalping deck;
separating at least a second portion of solids material from said flow of said first unseparated portion of said solids laden drilling fluid by passing said at least said second portion of solids material over a first screen assembly of said first screen deck to a discharge end of said first screen deck; and
guiding a flow of said at least said second portion of solids material into a trough that is mounted in said basket and positioned adjacent to said discharge end of said first screen deck, wherein guiding said flow comprises guiding said flow with a diverter plate that is operatively coupled to said trough.

34. A method in accordance with claim 33, further comprising flowing said at least said second portion of solids from said trough into a sump positioned under said basket.

35. A method in accordance with claim 34, wherein flowing said at least said second portion of solids through the trough is facilitated by a jet of drilling fluid.

36. A method in accordance with claim 34, further comprising passing a flow of a second unseparated portion of said solids laden drilling fluid through said first screen assembly to a second screen deck that is mounted in said basket and positioned below said first screen deck, and separating at least a further portion of solids material from said flow of said second unseparated portion of said solids laden drilling fluid by passing said at least said further portion of solids material over a second screen assembly of said second screen deck to a discharge end of said second screen deck.

37. A method in accordance with claim 36, further comprising passing a flow of a further unseparated portion of said solids laden drilling fluid through said second screen assembly to said sump.

38. A shale shaker for separating solids from solids laden drilling fluid, the shale shaker comprising:
   a basket;
   a first screen deck mounted in said basket, wherein said first screen deck is adapted to receive a flow of said solids laden drilling fluid and separate said flow of said solids laden drilling fluid into a flow of a first solids portion and a flow of a first solids laden drilling fluid portion;
   a second screen deck mounted in said basket below said first screen deck, wherein said second screen deck is adapted to receive at least part of said flow of said first solids laden drilling fluid portion and separate said at least said part of said flow of said first solids laden drilling fluid portion into a flow of a second solids portion and a flow of a second solids laden drilling fluid portion;
   a sump positioned below said basket, wherein said sump is adapted to receive said flow of said first solids portion and said flow of said second solids laden drilling fluid portion;
   a trough arranged in said basket at a solids discharge end of said first screen deck, wherein said trough is adapted to receive said flow of said first solids portion discharged from said first screen deck and direct said flow of said first solids portion to said sump for mixing with said flow of said second solids laden drilling fluid portion; and
   a diverter plate that is adapted to selectively allow said flow of said first solids portion discharged from said first screen deck to flow into said trough.

39. A shale shaker as claimed in claim 38, further comprising a flexible duct leading from said trough to said sump.

40. A shale shaker as claimed in claim 38, further comprising a scalping deck mounted in said basket, wherein said first screen deck is adapted to receive said flow of said solids laden drilling fluid from said scalping deck.

41. A shale shaker as claimed in claim 38, further comprising a scalping deck mounted in said basket above said first screen deck, wherein said first screen deck is adapted to receive said flow of said solids laden drilling fluid from said scalping deck.

42. A shale shaker as claimed in claim 38, wherein each of said first and second screen decks are arranged in said basket at an uphill angle relative to horizontal from a respective feed end to a respective solids discharge end.

43. A method for separating solids from solids laden drilling fluid, the method comprising:
   directing a flow of said solids laden drilling fluid to a first screen deck mounted in a basket of a shale shaker;
   separating said flow of said solids laden drilling fluid with said first screen deck into a flow of a first solids portion and a flow of a first solids laden drilling fluid portion;
   discharging said flow of said first solids portion from a discharge end of said first screen deck;
   directing at least part of said flow of said first solids laden drilling fluid portion to a second screen deck mounted in said basket below said first screen deck;
   separating said at least said part of said flow of said first solids laden drilling fluid with said second screen deck into a flow of a second solids portion and a flow of a second solids laden drilling fluid portion;
   discharging said flow of said second solids portion from a discharge end of said second screen deck;
   directing said flow of said second solids laden drilling fluid portion to a sump positioned below said second screen deck;
   selectively directing said flow of said first solids portion discharged from said discharge end of said first screen deck to said sump; and
   mixing said flow of said first solids portion with said flow of said second solids laden drilling fluid portion.

\* \* \* \* \*